United States Patent [19]

Reitman et al.

[11] Patent Number: 5,185,526
[45] Date of Patent: *Feb. 9, 1993

[54] OPTICAL SCENE GENERATOR FOR TESTING INFRARED DETECTOR MODULES

[75] Inventors: William Reitman; Jeanette Kennedy, both of Santa Ana, Calif.

[73] Assignee: Grumman Aerospace Corporation, Bethpage, N.Y.

[*] Notice: The portion of the term of this patent subsequent to Dec. 29, 2009 has been disclaimed.

[21] Appl. No.: 607,993

[22] Filed: Oct. 31, 1990

[51] Int. Cl.⁵ .................................... G12B 13/00
[52] U.S. Cl. ........................... 250/332; 250/252.1; 250/495.1; 250/504 R; 364/423; 364/571.01
[58] Field of Search ............. 250/252.1, 332, 504 R, 250/495.1; 364/420, 423, 571.01, 571.03, 571.04

[56] References Cited

U.S. PATENT DOCUMENTS

| | | | |
|---|---|---|---|
| 3,083,473 | 4/1963 | Luton | 434/34 |
| 3,084,454 | 4/1963 | Schueller | 434/34 |
| 3,247,317 | 4/1966 | Saylor | 178/104 |
| 3,442,139 | 5/1969 | Munro | 73/865.6 |
| 3,694,654 | 9/1972 | Crownover | 250/339 |
| 4,106,345 | 8/1978 | Saunders et al. | 73/865.6 |
| 4,482,252 | 11/1984 | Lorenz | 356/448 |
| 4,542,299 | 9/1985 | Scholz et al. | 250/50 R |
| 4,605,232 | 8/1986 | Hundstad | 273/348.1 |
| 4,621,265 | 11/1986 | Buse et al. | 342/169 |
| 4,639,603 | 1/1987 | Pistor | 250/504 R |
| 4,859,080 | 8/1989 | Titus et al. | 374/134 |
| 4,876,453 | 10/1989 | Wirick | 250/332 |
| 4,922,116 | 5/1990 | Grinberg et al. | 250/504 R X |
| 4,958,180 | 9/1990 | Matsui et al. | 250/495.1 X |

Primary Examiner—Constantine Hannaher
Attorney, Agent, or Firm—Stetina and Brunda

[57] ABSTRACT

An optical scene test generator is provided for testing the operation of detector modules designed to be placed in earth orbit. The OSTG includes first and second sources of infrared frequency light sources. The templates may be irradiated to generate images representative of a background scene, such as the earth's surface, and an object moving in relation to the background, such as a missile. Background and object images are thereafter combined and presented upon the surface of an infrared detector element to be tested. Mechanisms are provided for selectively regulating the movement of the background and object images, with respect to each other and jointly with respect to detector modules to be tested.

11 Claims, 8 Drawing Sheets

OPTICAL SCENE GENERATOR FOR TESTING INFRARED DETECTOR MODULES

BACKGROUND OF THE INVENTION

The present invention relates to equipment for testing the operation of sensor modules designed to conduct surveillance of the earth and the surrounding atmosphere from a position in space.

Systems for monitoring activities on the earth and in the surrounding atmosphere have been constructed and deployed in space for many years. Some such systems are designed to map the surface of the earth, others monitor weather conditions and others monitor events relating to national defense. While the accuracy and resolution of such systems has continually improved over the years certain applications require still greater resolution and real time use of the data. Though precise information regarding the resolution of images returned from orbiting satellites is not publicly available, it is generally known that LANDSAT (U.S.) and SPOT-G (Fr.) satellites provide resolution sufficient to identify objects 15 meters long. More recently, the Soviet Union has offered to sell images from photographic satellites capable of identifying objects as short as 5 meters long. Because certain applications require real time processing of the images of the observed scene, photographic techniques may be inadequate to satisfy the requirements of those applications. Certain applications require that the satellite imagery be done by means of infrared detector systems electrically connected to processing circuitry. The need for high resolution, high speed processing and reliability in the extremes of the space environment has required designers to press detector and processing technology to the existing limits and beyond. Consequently, the costs of constructing such satellite surveillance systems have become enormous as has the cost of launching such a system into orbit. In view of those costs and the uncertainty associated with such advanced technology it is highly desirable to vigorously test the surveillance system component in a space-like environment in order to reduce the potential for failure in orbit.

The present invention is directed to a technique and system useful to simulate the space environment in which detector modules are deployed, and to simulate the types of images which they are intended to detect and track. The invention is useful to generate various test scenarios and measures the detector module response to each scenario. The response of the module to the various scenarios may then be evaluated to determine the operability of the various detector module components. The test information may be used to replace inoperative detector module components, to facilitate the design of new modules and related support electronics, or to develop methods of processing and prioritizing detection and communication functions associated with the module.

SUMMARY OF THE INVENTION

An optical scene test generator is provided for testing the operation of detector modules designed to be placed in earth orbit. The OSTG includes first and second sources of infrared frequency light sources. The templates may be irradiated to generate images representative of a background scene, such as the earth's surface, and an object moving in relation to the background, such as a missile. Background and object images are thereafter combined and presented upon the surface of an infrared detector element to be tested. Mechanisms are provided for selectively regulating the movement of the background and object images, with respect to each other and jointly with respect to detector modules to be tested.

The OSTG may include spectral and/or density filters for filtering the intensity and/or spectral content of the infrared signals provided to the detector module to be tested. Thus, different types of objects may be simulated, each having a discernible infrared signature and trajectory. Various combinations of relative movements, intensity and spectral content may be presented to the module, under programmable control, to test the module under a wide variety of testing scenarios.

In the preferred embodiment three direction servos are utilized to regulate the movement of images representative of the background and object. Additionally, combined servo mechanisms are provided for facilitating movement of the combined background/target image with respect to the detector module. Additionally, a toggling mechanism is provided for toggling the combined background/object image to predetermined locations on the surface of the detector module. The toggling mechanism is useful where the detector module is formed to have rows of different types of detector elements, each responsive to different portions of the infrared frequency spectrum.

DETAILED DESCRIPTION OF THE PRESENTLY PREFERRED EMBODIMENT

The detailed description set forth below is intended merely as a description of the presently preferred embodiment of the invention, and is not intended to represent the only form in which the present invention may be constructed or utilized. The description below sets forth the functions in sequence of signals that are affected by the invention in connection with the illustrated embodiment. It is to be understood, however, that the same, or equivalent functions where signal sequences may be accomplished by different embodiments that are also intended to be encompassed within the spirit and scope of the invention.

Figure 1:
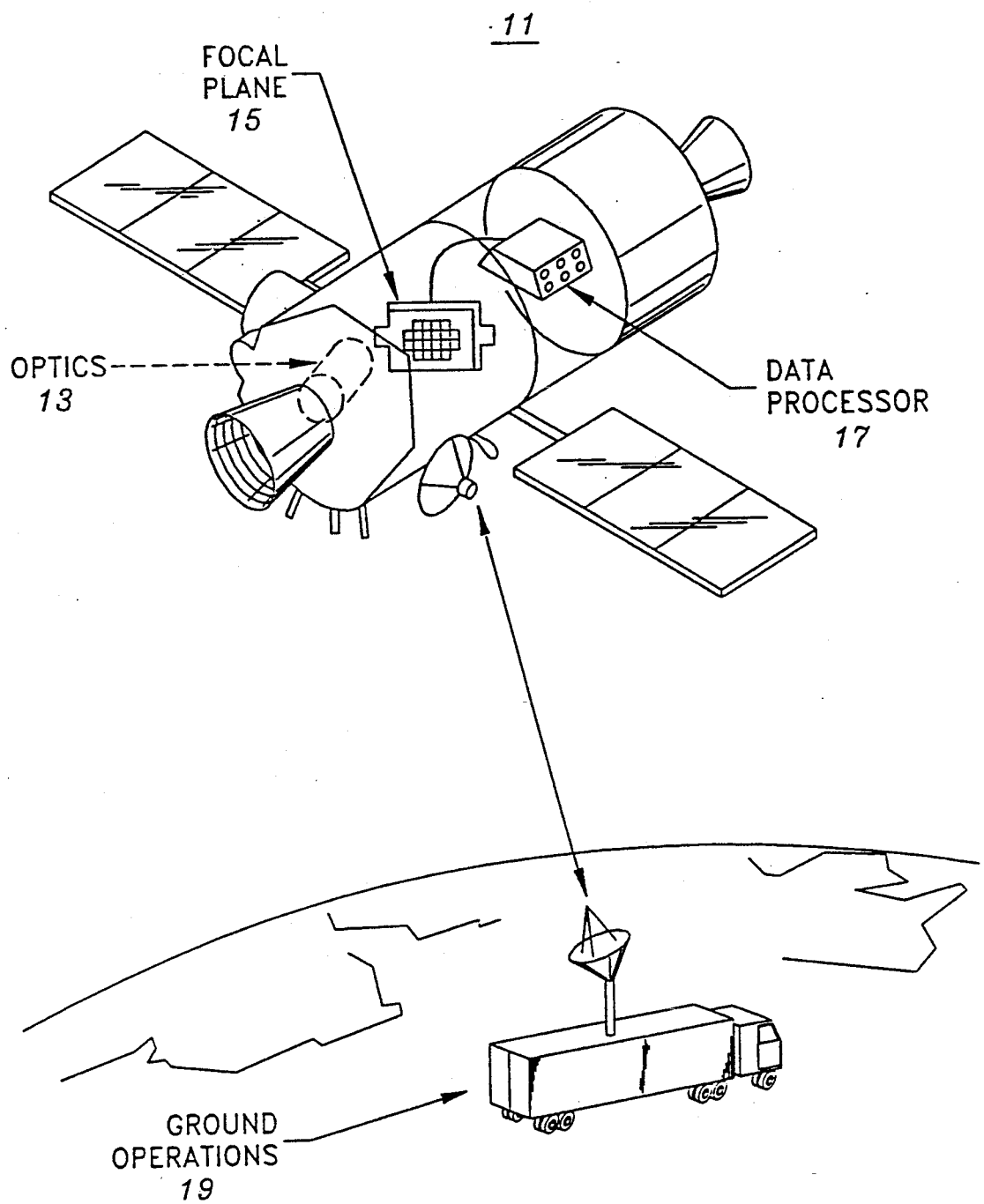
FIG. 1 is a perspective view of an exemplary satellite generally illustrating its various components.

FIG. 1 of the drawings generally illustrates an infrared detector system payload disposed within an orbiting satellite system. The satellite system generally incorporates an optical system which focuses objects within the field of view on the surface of a detector focal plane. The focal plane is formed of electro optical components adapted to detect objects within the field of view and to generate electrical signals responsive to images of those objects. By analyzing the pattern of information produced by the individual detector elements and correlating that information over time in various ways a detailed image of the area within the field of view can be generated. The precise satellite structure, the structure of the detector modules used to form the detector focal plane, and the precise manner in which the information from the detector elements is processed is not intended to be a limitation with respect to the present invention, which, in its broader aspects, has application to all types of satellite and detector systems. Thus, the reference to particular types of detector modules and electronic systems compatible with those detector modules is intended as exemplary of one manner in which the present invention may be utilized. Reference is made to the following patents which are representative of the present state of the art in relation to the construction of infrared detection systems and related support electronics having application to space surveillance systems.

| |
|---|
| 3,582,714 CARSON ET AL. |
| 3,970,990 CARSON ET AL. |
| 4,283,755 TRACY |
| 4,304,624 CARSON ET AL. |
| 4,352,715 CARSON ET AL. |
| 4,354,107 CARSON ET AL. |
| 4,103,238 CLARK |
| 4,525,921 CARSON ET AL. |
| 4,551,629 CARSON ET AL. |
| 4,592,029 ALTMAN ET AL. |
| 4,618,763 SCHMITZ |
| 4,646,128 CARSON ET AL. |
| 4,659,931 SCHMITZ |
| 4,675,532 CARSON |
| 4,672,937 CARSON ET AL. |

The teachings of the above cited references are incorporated herein by reference.

FIG. 1 generally illustrates a satellite 11 shown in Earth orbit. The portions of satellite of particular interest include an optical system 13, detector focal plane 15 and data processor 17. The optics 13 function to image objects within the satellite field of view on the surface of focal plane 15. Optics 13 may include scanning mechanisms and/or staring mechanisms, depending on the particular function of the satellite 11. The optics 13 may include various enhancements, such as means for reducing the effects of radiation from the sun, means for filtering the light frequencies passing through the optical system, and means for toggling the location of the image on the surface of focal plane 15 in order to derive certain information from the image.

As described in more detail below, the focal plane 15 may be any of a variety of constructions, utilizing a variety of different materials suitable to operate in a space environment. The focal plane 15 functions to derive electrical signals from the image focused by optical system 13 and to communicate such electrical signals to the data processor 17. Processor 17 directs interrogation of the focal plane 15 and is controlled by signals from ground operations 19.

Figure 2:
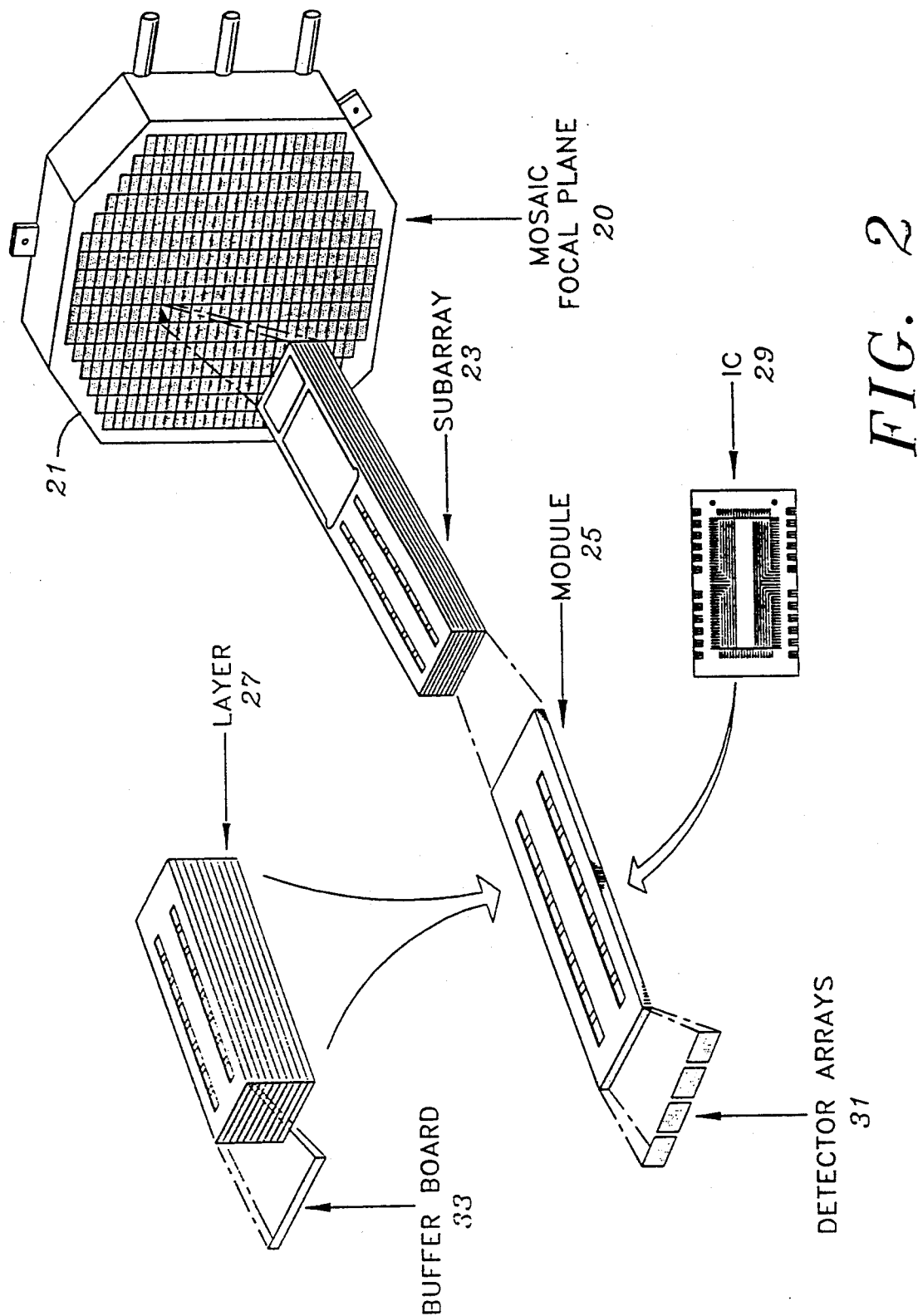
FIG. 2 is a perspective view of an exemplary detector focal plane incorporated in the satellite illustrated at FIG. 1, with portions enlarged.

Referring to FIG. 2 an exemplary focal plane useful in the application illustrated at FIG. 1 is shown in more detail. As shown at FIG. 2 the focal plane 20 is defined by a housing 21 which holds a substantial number of individual subarrays 23 disposed to have edge portions that collectively form the front face of detector focal plane 20. Each subarray 23 is comprised of a plurality of modules 25, with each module is comprised of a plurality of separate layers 27. Integrated circuits 29 may be mounted on the layers 27 to facilitate on-focal-plane processing of data and interrogation of detector elements. Detector arrays 31, each containing a plurality of detector elements are formed along a vertical edge surface of the modules and are in electrical communication with the integrated circuits via conductive paths formed on the surface of the layers 27. A buffer board 33 may be disposed intermediate the front face of module 35 and the detector arrays 31 to facilitate interconnection and to isolate the detector arrays from mechanical stress generated by expansion or contraction of the module 25. Further details describing the construction of such exemplary modules are set forth in the above cited U.S. Patents. Exemplary integrated circuits suitable for incorporation with the modules include circuits disclosed in the following mask work registrations, the substance of which is incorporated herein by reference:

| | |
|---|---|
| MW 3147 | CUSTOM INTEGRATED CIRCUIT LAYOUT FOR DETECTOR CIRCUIT INCLUDING GAIN NORMALIZATION AND ANALOG TO DIGITAL CONVERTER |
| MW 3145 | CUSTOM INTEGRATED CIRCUIT LAYOUT FOR MULTIPLEXER |
| MW 3148 | CUSTOM INTEGRATED CIRCUIT LAYOUT FOR LINEAR AMPLIFIER |
| MW 3146 | CUSTOM INTEGRATED CIRCUIT LAYOUT INCLUDING CHOPPER STABILIZED AMPLIFIER |
| MW 3150 | CUSTOM INTEGRATED CIRCUIT SCANNING CIRCUIT |
| MW 3144 | CUSTOM INTEGRATED CIRCUIT LAYOUT FOR DETECTOR CIRCUIT INCLUDING MODIFIED BANDPATHS AND GAIN CHARACTERISTICS |
| MW 3151 | CUSTOM INTEGRATED CIRCUIT LAYOUT FOR SIGNAL PROCESSOR |
| MW 3149 | CUSTOM INTEGRATED CIRCUIT LAYOUT FOR STARING CIRCUIT |

Figure 3:
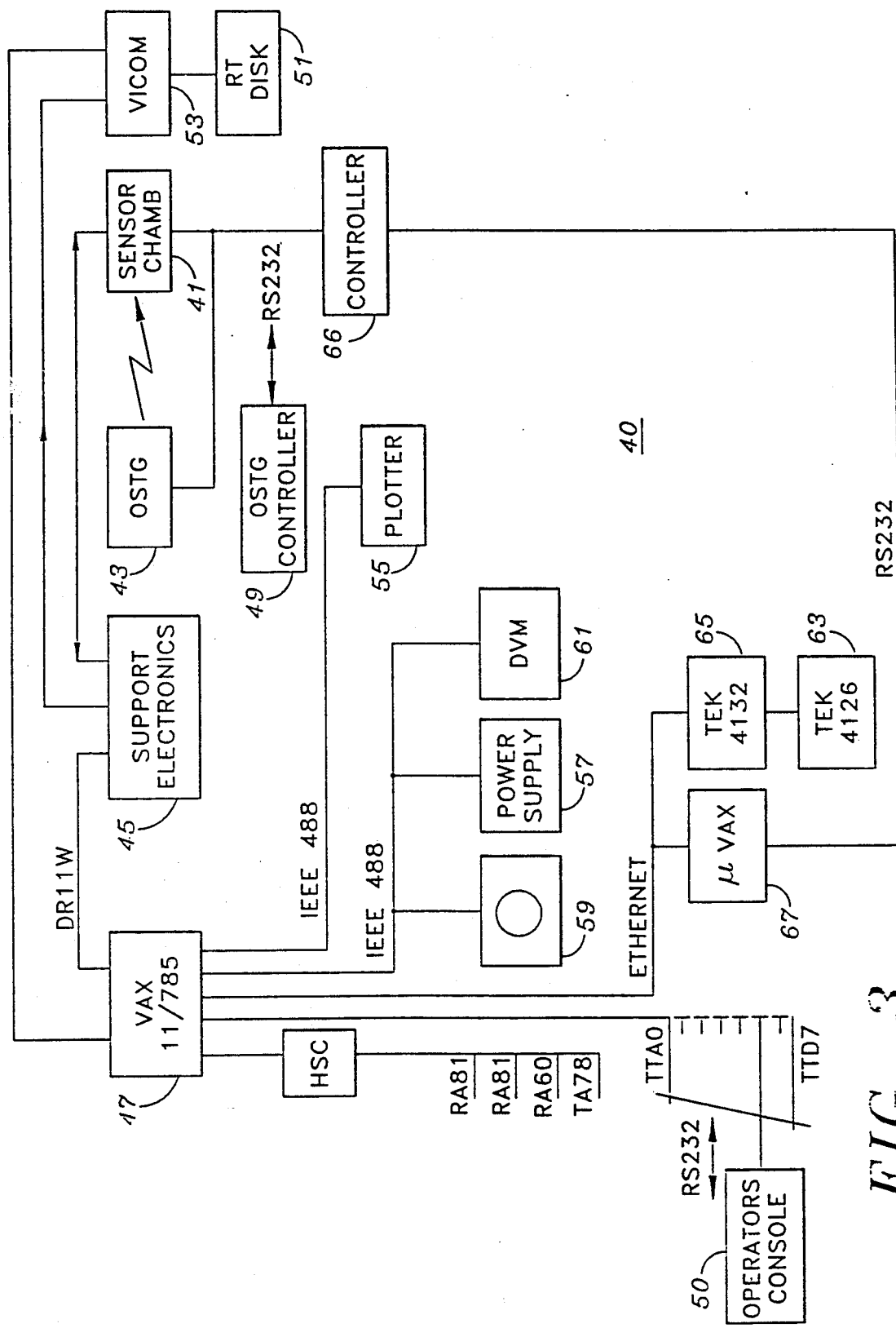
FIG. 3 is a block diagram illustrating the basic configuration of a sensor test system for testing detector modules such as those illustrated at FIG. 2.

FIG. 3 illustrates the basic block diagram of the system for testing the operation of the modules 25. The principal elements of the system 40 include the sensor chamber 41, adapted to hold a module 25 to be tested, the optical scene test generator 43 (OSTG), adapted to generate the optical image for display to the module, and the support electronics 45 adapted to operate and gather data from the subarray 23 or module 25. A VAX 11/785 computer 47 regulates the operation of the support electronics. The computer 47 operates under the direction of control programs and in accordance with instructions entered into controller 49, which may be a personal computer such as an IBM (TM) personal computer. Detailed programming information for an exemplary program to enable the functions of controller 49 are disclosed in an appendix submitted herewith.

Pursuant to the instructions resident in controller 49 the VAX computer 47 functions to regulate operations in the OSTG 43 and sensor chamber 41, as well as to establish the state of support electronics 45 and establish communications paths to output and store test information from the sensor chamber 41. As described more fully below the sensor chamber and OSTG 43 include servo mechanisms adapted to regulate the position of elements therein. The sensor chamber 41 includes servo mechanisms to orient a detector module to simulate the various angles at which the module may be disposed in relation to the Earth's surface. The OSTG 43 includes several servos to simulate, for example, movement of the Earth scene, movement of a target in motion in relation to the Earth scene, drift and jitter, representative of relative movement between the satellite and Earth scene and toggling of the imagery across the module detector array surface. Depending upon the particular test scenario defined by controller 49, the VAX computer 47 orients the various servo mechanisms and regulates the vacuum pumps and infrared sources to provide scenes and orientations representative of the desired test environment.

Referring again to FIG. 3, it is to be understood that the particular orientation of visual displays and recording and analyzing devices is intended to be exemplary of but one embodiment of the invention and is not intended to be limiting of other embodiments wherein the same or similar regulation or recording functions are implemented in a different manner. In the illustrated embodiment, data management is accomplished by the DR11W connector between the VAX computer 47 and support electronics 45. IEEE 488 connectors communicate formatted data from the VAX computer 47 to plotter 55. Information stored on the real time disk is available for display on VICOM 53 under the control of VAX 47. Plotter 55 provides another means for graphically illustrating the data communicated to VAX 47. Another IEEE 488 connector is used to communicate signals between the VAX oomputer 47 and power supply 57. Oscilloscope 59 and digital volt meter 61 are used to monitor the signals communicated along this conductor as well.

The graphics engine 63, implemented as a TEK 4126, provides real time display of high resolution images of test conditions. Graphics engine 63 operates in conjunction with controller 65, which may be implemented as a TEK 4132 or 4301. Microvax 67 is also connected to the ethernet and serves to provide processing of the test conditions and illustrating the environmental data such as vacuum, temperature or servo position data.

Pursuant to the program architecture and instruction list described more fully below, VAX computer 47 also communicates with controller 49 via an RS232 conductor, shown to include lines TTA0 . . . TTD7. In the present embodiment not all lines of the RS232 connectors are utilized and it should be understood that different display requirements or system components may necessitate the communication of different signals or signal formats along portions of the RS232 connector. However, in the presently preferred embodiment lines TTA0-TTA3 are directed to a display terminal to display information regarding vacuum, vacuum pressure, temperature and other environmental conditions within the sensor chamber 41 or OSTG 43. Line TTA4 is directed to an external printer to print out error messages as may be generated by the VAX computer 47. Lines TTB0-TTB3 communicate signals to a low or medium resolution graphic display device to facilitate real time functions such as illustration of histograms representative of the test data. Line TTB5 communicates signals between the VAX computer 47 and a test operator's console. In the presently preferred embodiment the test operator's console, i.e. controller 50, is implemented as a Macintosh (TM) computer manufactured by Apple Computers, Inc. The console functions to make the system "user friendly" by translating operator instructions to a data format compatible with the VAX computer 47, thereby avoiding the need for direct input of signals to the VAX computer 47 in a format that may be more complicated for the operator. The "C" lines, e.g. TTC0/TTC4 may be used to provide communication between VAX 47 and remote controllers, such as other IBM (TM) personal computers located in a test lab. The "C" lines may also be used to facilitate expansion, calibration inside the chambers, temperature regulation, etc.

It should be understood that various control circuits can be used to regulate the operation of the sensor chamber and OSTG and to display and store the test conditions and responsive data. Accordingly, the above description is intended to be exemplary and not limiting with respect to other control circuits that may be utilized to implement the functions of the present invention. A further description of the construction of sensor chamber 41 and OSTG 43 is provided below.

The OSTG 43 is designed to facilitate the presentation of different test scenarios to the detector module. As described in more detail below the OSTG includes means for generating infrared images representative of the surface of the earth and of one or more objects moving in relation to the surface of the earth. As is well known in the art such infrared images can be presented using a variety of different means. The present invention uses a transmissive scene similar to a halftone image which regulates the amount of infrared radiation passed through from an IR source per unit area by the size and arrangement of opaque spots on the scene plate. The scene plate and target plate may be formed from a circular dish of silicon.

Imagery of one or more objects moving along the earth's surface, or in the atmosphere or space adjacent the earth, is also achieved by radiating the template with an infrared light source. By varying the position of the template the system can simulate movement of an object under investigation with respect to the earth. The intensity and shape of the light may be varied to simulate different types of vehicles, e.g. solid or liquid fueled missiles. The size of aperture formed in the template may also be varied in size and shape to represent objects of different sizes and shapes under investigation, e.g. planes, missiles, ships, etc.

By independently regulating the infrared source, movement of the target template and the relative position of servos 79, 101, 107, 117, 123 (FIG. 4) the system can simulate relative movement between the earth, the satellite, and the object under investigation. Different types of relative position or movements can be simulated in multiple ways. For example, movement of the earth with respect to the detector module may be simulated by either moving the background template 99 or the detector module 25. Other types of relative movement may similarly be affected in different ways as will be apparent to those having ordinary skill in the art in view of the present disclosure. Different templates and apertures may be used to produce different test scenarios which are then regulated by program control.

Figures 4, 4A:
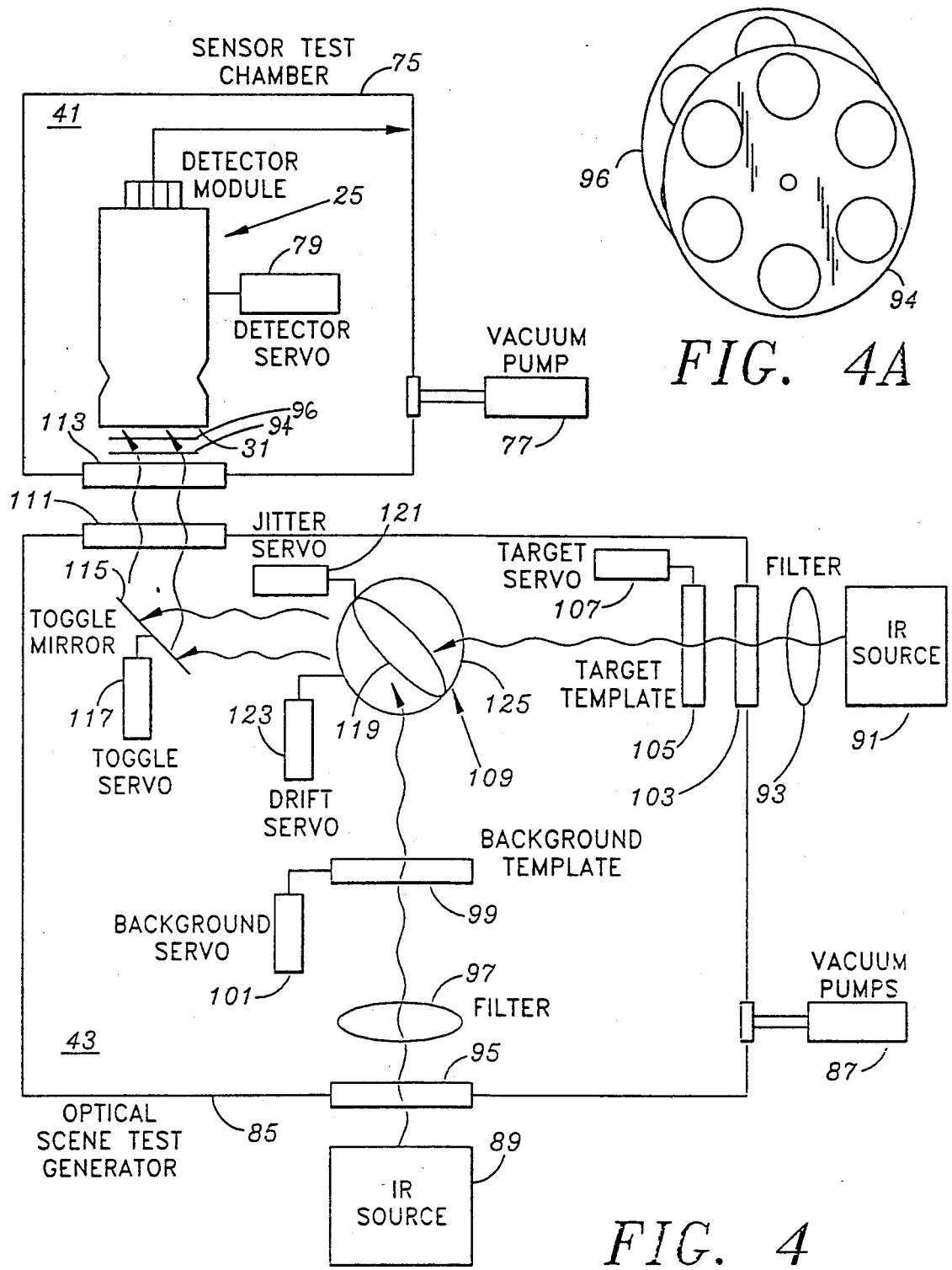
FIG. 4 is a top view of the sensor chamber and the OSTG illustrating the principal mechanical components thereof.
FIG. 4a is a perspective view of optical filters 94, 96, shown generally at FIG. 4.

Referring to FIG. 4, a top view of the construction of the sensor chamber 41 and OSTG 43 is provided. Sensor chamber 41 is a thermal vacuum chamber comprising housing 75 which is evacuated by means of vacuum pump 77. In practice the vacuum pump 77 may be a high speed vacuum control pump such as that sold by CTI-Cryogenics, model CT-10, and is operative to draw vacuum to a level of 1 time $10^{-6}$ atmos at temperatures between 88°–145° K. Chambers 43, 41 may be cooled to space temperatures using liquid nitrogen from an external source. In the presently preferred embodiment internal heaters are connected to the dewars to stabilize each dewar at the test operating temperature. Detector module 25 is mounted within the sensor chamber 41 so as to be movable in three axes, x, y and z, pursuant to actuation of detector motion servos, collectively represented by servo 79. The servo 79 is operative to position the detector module so as to image the test scene on the surface of the detector arrays 31 and to orient the detector module 25 at a desired angle of inclination with respect to the test scene, simulating an angle of inclination of the satellite with respect to the Earth's surface. Servo 79 is connected to the VAX computer 47 via the controller 66 and γVAX 67. (See FIG. 3) Detector module 25 is in electrical communication with support electronics 45 to facilitate selective interrogation of detector elements within detector arrays 31 and to communicate detector element outputs in response to such interrogation. In the presently preferred embodiment both sensor chamber 41 and OSTG 43 are mounted on a granite testbed that is isolated from the ground by hydraulic suspension means. This permits the sensor chamber 4 and OSTG 43 to be isolated from vibrations in the ground or surrounding building which would introduce distortion to the test results. As previously described certain initial processing of the detector signals may be accomplished within integrated circuits 29 (see FIG. 2) disposed directly on the module's surface. More complex processing of the output of detector module 26 is affected by the VAX computer 47 which also correlates the module output signal with test scenario data. A listing of instructions resident in the VAX computer 47 is submitted herewith. Other functions, such as bias regulation, clock signals, sampling and multiplexing of data may be affected by the support electronics 45.

FIG. 4 further shows a top view of the layout of the OSTG 43. OSTG 43 includes housing 85 disposed adjacent sensor chamber housing 75. Housing 85 is evacuated by vacuum pumps 87 which may be constructed similar to vacuum pumps 77 that evacuate the sensor chamber 41. In the preferred embodiment two infrared light frequency sources 89 and 91 are disposed exterior to the OSTG 43 and directed to transmit infrared light towards optical systems disposed within housing 85. IR sources 89 and 91 may alternatively be disposed within housing 85 as may be permitted by the available space within housing 85. One advantage of disposing the IR sources outside of housing 85 is that optical filters, such as optical filter 93, may be replaced without the need to bring the OSTG to normal atmosphere conditions. Filters, such as filter 93, may be useful to vary the intensity or to filter a portion of the IR frequency spectrum to test the detector module responsiveness to selected frequencies within the IR frequency range. As is well known to those of ordinary skill in the art certain frequencies ranges within the IR range are indicative of different objects or backgrounds. For example, certain portions of the IR frequency range are more representative of a solid rocket booster burn whereas other portions of the IR frequency range may be representative of a liquid rocket booster burn. By selectively filtering the light entering the OSTG the detector module may therefore be selectively tested for detection of certain types of vehicles.

In the preferred embodiment IR source 89 is intended to be useful to generate a scene representative of the Earth and other background conditions, e.g. objects on the earth's surface or cloud cover, whereas the IR source 91 is useful to generate an image representative of an object moving in relation to the background. The IR sources 89 and 91 may be implemented using an infrared light source, such as the model WS161-55, sold by Electro-Optical Industries.

The IR frequency light from IR source 89 enters housing 85 through window 95. IR source 89 is set to the desired spectral temperature. IR source 91 is also set to the desired spectral temperature. Filters 93, 97 may be implemented as gradient filters which may be rotated to a desired density filter to regulate light from IR source 91 entering housing 85. It is anticipated that spectral filters may also be used selectively filter the spectral content of the IR light entering the OST 643. A combination of spectral and neutral density filters are utilized in the sensor test chamber 41, as described in connection with FIG. 4A. Referring to FIG. 4, light from IR source 89 passes through filter 97 and impacts on background template 99. Background template 99 may be changed in order to conduct test scenarios wherein different portions of the earth's surface are intended to serve as background for the test. Background template 99 is typically provided with a series of small apertures which, upon the passage of IR light from IR source 89, generates an infrared signature similar to that observed from satellites looking at particular portions of the Earth's surface. Background template 99 may be changed in order to conduct test scenarios wherein different portions of the Earth's surface are intended to serve as background for the test. Background servo 101 facilitates movement of the background template 99 to facilitate simulation of movement of the background in relation to the detector module 25 and/or the target.

As previously noted IR source 91 is useful to generate an infrared signal used to simulate a target. The IR frequency signal passes through optical filter 93. The signal from filter 93 passes into housing 85 through window 103 and impacts target template or membrane 105. Target template 105 is provided with one or more apertures of selected sizes intended to produce the characteristic infrared signature of one or more particular types of vehicles or other objects. By varying the intensity of the signal from IR source 91, and the size of the aperture within target template 105, various types of vehicles or other objects can be simulated. Target servo 107 functions to move the target template 105 to simulate movement of the target in relation to the background and/or the detector module. As with background servo 101, target servo 107 may in practice be formed of a plurality of servos adopted to facilitate three-axis movement of target template 105. By selective actuation of target servo 107 various types of trajectories and speeds can be simulated such that the characteristic flight paths of different types of vehicles can be simulated. For example, cruise missiles or submarine launched ballistic missiles may travel trajectories that are different than the trajectories of ground based intercontinental ballistic missiles. In order to test the responsiveness of the detector module through different types of vehicles the target template may be changed and/or the action of target servo 107 can be varied in accordance with the test program implemented in controller 49 (see FIG. 3).

It should be understood that more than one template may be used to implement the functions of target template 105. In the embodiment illustrated at FIG. 4 a single target template is utilized and, therefore, each target image produced by the template would move in a common manner. However, if more than one target template was used it is possible to simulate a plurality of targets moving relative to each other. It is also anticipated that in alternate embodiments a dynamic IR scene and multiple IR targets may be imaged directly off a cathode ray tube onto the focal plane.

The images generated by the IR light passing through background template 99 and target template 105 are directed to optical image combining device (beam splitter) 109. Device 109 functions to receive both optical images and to direct them in such a manner that they ultimately pass out of housing 85 through window 111, into housing 75 through window 113, filters 94, 96 and impact on the detector arrays 31 disposed on the front surface of detector module 25. In the presently preferred embodiment device 109 communicates the images from templates 99 and 105 to toggle mirror 115 whereupon the images are reflected to detector module 25.

FIG. 4a illustrates in more detail the construction of filter wheels 94, 96, disposed within the sensor test chamber 41. Filter wheel 94 may be implemented as a neutral density wheel, rotatable to present different density gradient filters. Filter 96 may be implemented as a spectral wheel, rotatable to present different spectral density filters. By rotating the spectral filter wheel 96 the infrared frequency of the light signal presented to the detector module 25 may be selectively varied. As will be apparent to one of ordinary skill in the art the selective rotation of filter wheels 94 and 96 will enable the testing of the detector module 25 under a variety of different conditions.

Toggle mirror 115 is an optional element in the sensor test system which is utilized dependent upon the construction of detector module 25. In some constructions detector module 5 may be formed such that adjacent lines of detector elements forming the detector arrays 31 are constructed or connected to be responsive to different portions of the IR frequency spectrum. Thus, by toggling the image such that the same image Portion is moved from one line of detectors to the adjacent line of detector elements (or to any other line of detector elements) information particular to a portion of the IR frequency spectrum may be extracted from the test image without the need for increasing population of detector elements within the detector array.

As described in more detail in connection with FIG. 5, image combining device 109 includes lens 119 which is connected to jitter servo 121 which will selectively move the lens 119 in a manner to represent satellite jitter. The jitter servo 121 moves the target in background with respect to the detector module in such a manner to simulate vibration of the satellite. Drift servo 123 is connected to turntable 125 which also supports the lens 119. Drift servo 123 moves the mirror support 125 in such a fashion as to provide slow rate movement of the target and background in a manner to simulate drift of the satellite as it orbits the Earth. As will be clear to those of ordinary skill in the art the relative operation of the various servos 101, 107, 117, 121 and 123 is performed under program control in response to the particular test scenario implemented by controller 49.

Figure 5:
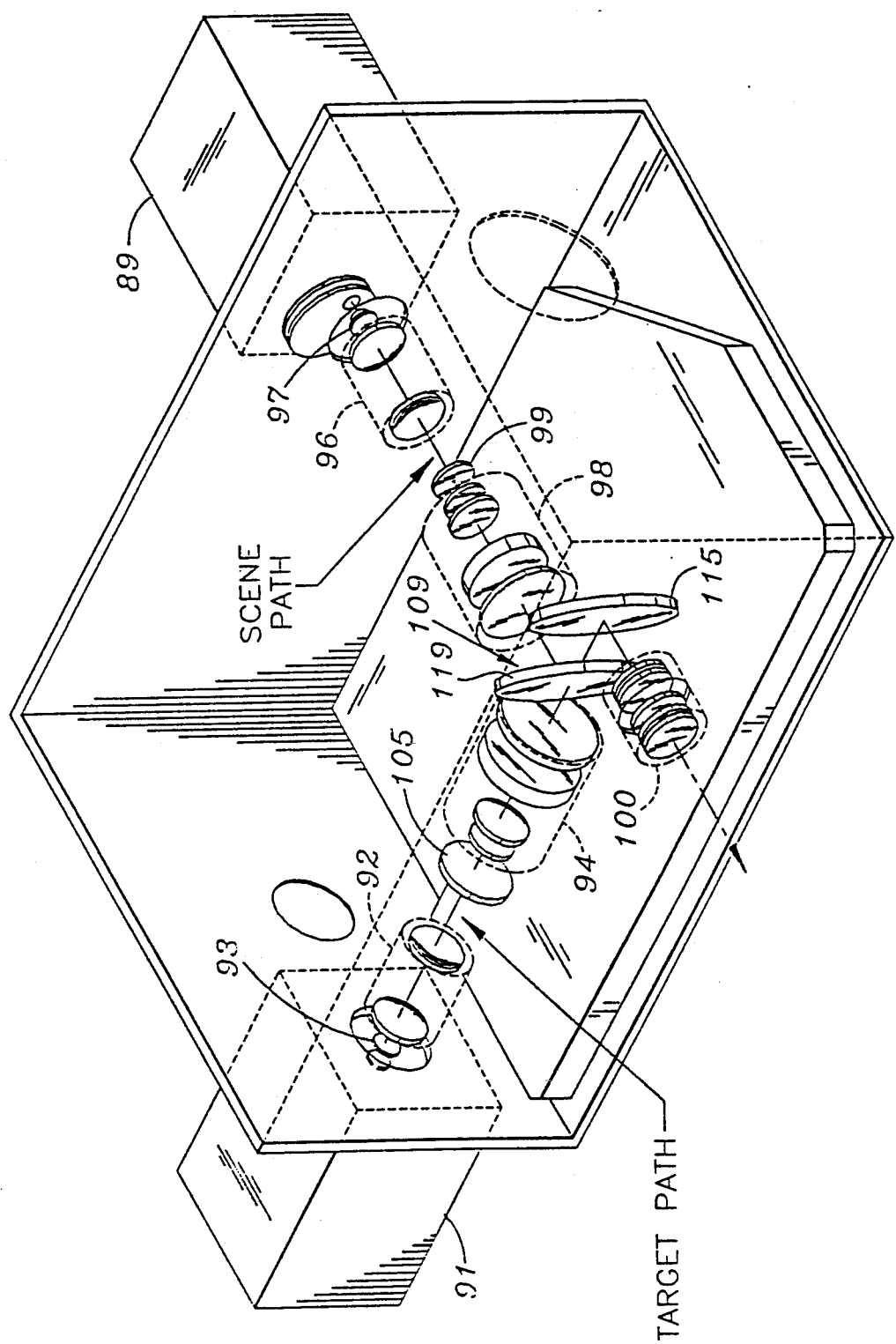
FIG. 5 is a perspective view of the construction of the OSTG illustrated at FIG. 4.

FIG. 5 is a perspective view of the OSTG illustrated at FIG. 4. The construction shown at FIG. 5 generally illustrates the optical arrangement implemented within the OSTG for combining the scene and target images, and for permitting relative movement therebetween. The target path is initiated with IR source 91 and passes through filter 93, condenser lens assembly 92, target mask 105, target collimator 94, and lens 119 of the beam splitter 109.

The scene path commences with IR source 89 and passes through filter 97, scene condenser lens assembly 96, scene template 99, scene collimator 98, and then impacts lens 119 of beam splitter 109.

The beam splitter 109 functions to combine the reflected scene images and transmitted target image on the surface of toggle mirror 115. The combined image is then communicated to the detector module through exit lens assembly 100.

Figure 6:
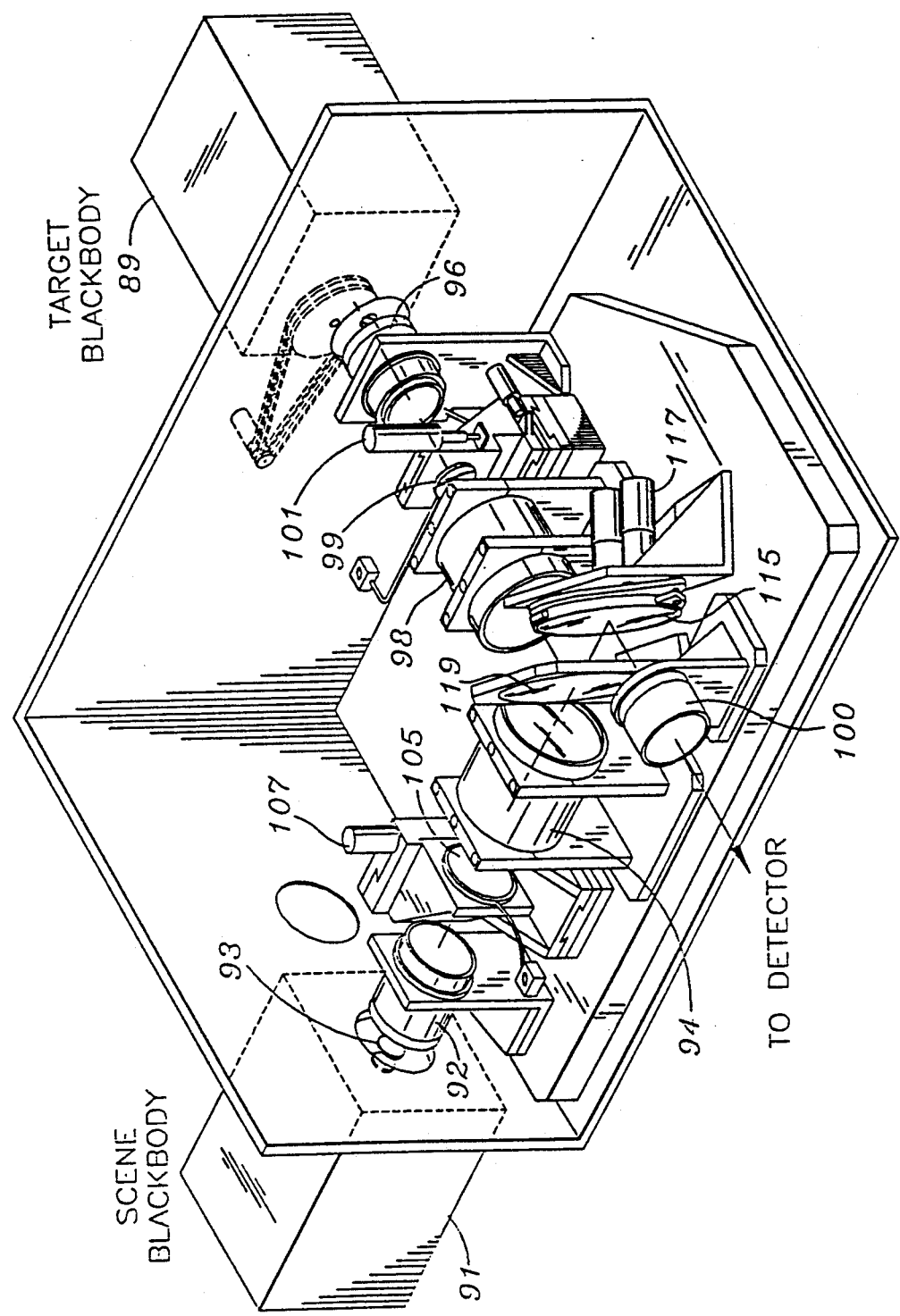
FIG. 6 is a further perspective view of the OSTG illustrated at FIG. 4.

FIG. 6 generally repeats the optical structure shown at FIG. 5 with the further inclusion of the mechanical supports and servos which regulate movement of the target and scene images. FIG. 6 illustrates the target servo 107 used to control movement of the scene mask 105. Background servo 101 operates to regulate the movement of the background mask 99. Both the background and target servos permit regulation of high resolution movement in the X, Y and Z planes. Toggle servo 117 regulates the movement of toggle mirror 115 as more fully set forth in connection with FIG. 7.

As will be recognized by one of ordinary skill in the art the particular optical assembly utilized to generate and vary the position of the target and scene images may be varied in accordance with the particular design requirements and test scenario to be implemented. Accordingly, the particular function set forth in connection with FIGS. 5 and 6 is intended to be only exemplary of the presently preferred embodiment of the invention.

Figure 7:
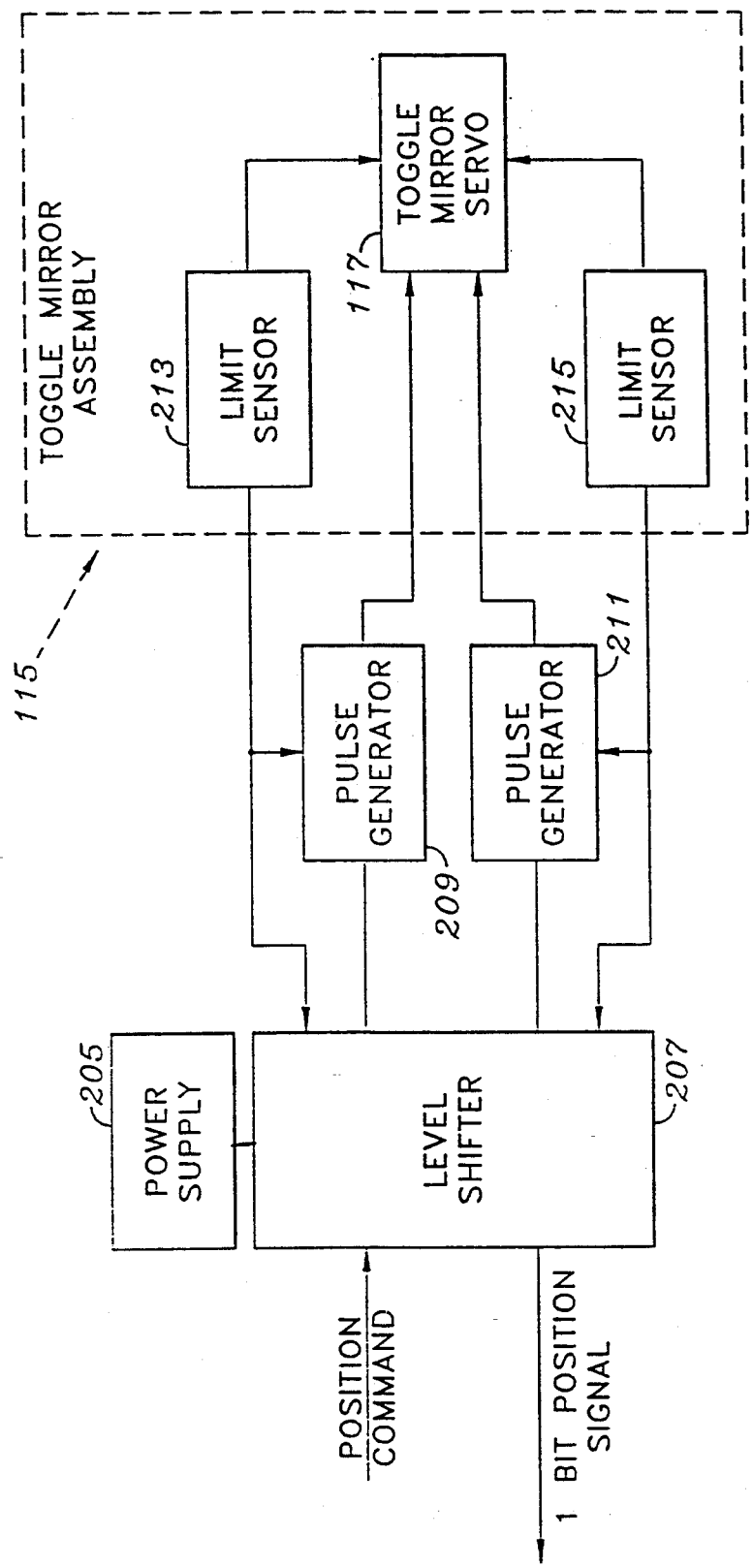
FIG. 7 is a functional block diagram of the control circuitry to operate the toggle servo 117.

FIG. 7 is a functional block diagram illustrating the electrical control circuitry to operate mirror toggle servo 117. The circuit set forth at FIG. 7 generally demonstrates the manner in which servo 117 is operated to regulate the motion of toggle mirror 115.

The toggle mirror assembly 115 is moved between two positions in response to the motion of toggle mirror servo 117. Upon receipt of signals from level shifter 207 the toggle mirror servo 117 moves the toggle mirror in alternate directions. Unit sensors 213, 215 act to terminate any further movement by the toggle mirror servo 117 beyond designated limits. Power to level shifter 207 is provided by power supply 205. The level shifter 207 enables pulse generators 209, 211 which in turn generate a one-bit position signals that activate toggle mirror servo 117 to move in the desired direction.

Figure 8:
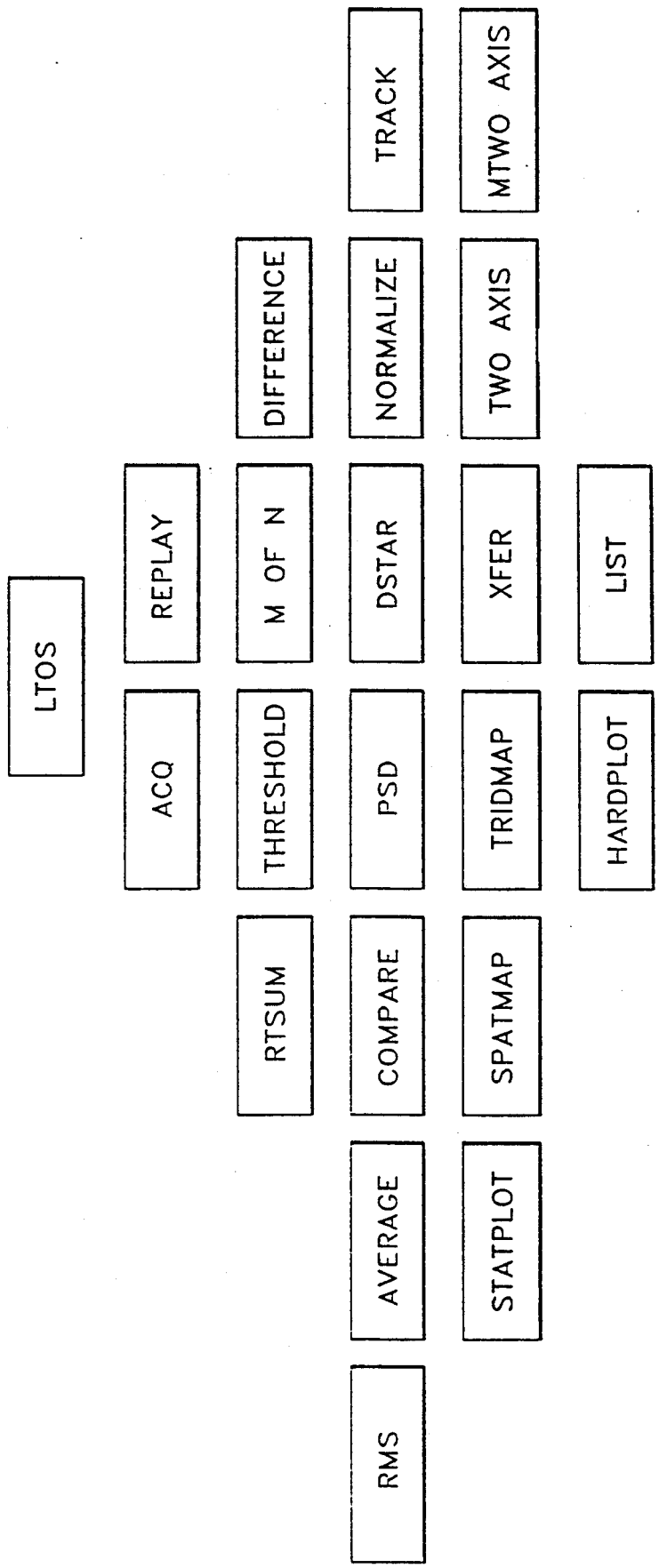
FIG. 8 is a block diagram illustrating the priority levels established by the programming within the controller 49.

FIG. 8 is a block diagram listing the priorities of operation of the software resident in the VAX 11/785 computer to operate the function of the sensor test system. As shown at FIG. 8, the level 1 program module refers to the laboratory test operating system (LTOS), i.e. the root program or test system which operates to specify the type of tests and terminals to be used in the particular test scenario to be run. Functionally, the LTOS program interactively defines a test requirement, loads all required tasks, allocates all shared buffers, links all required lower level functional modules, monitors the status of all tasks and waits for operator input after successful completion of all tasks. Further details of the LTOS and other level systems are set forth below, with a detailed instruction list being attached hereto as an appendix.

Priority level 2 is assigned for the task of data acquisition and data replay. The level 2 module receive requirements from the LTOS program and shares buffers with other level modules. The module loads raw data from the support electronics into associated buffers and, in response to LTOS signals the module transfers the information contained in the current buffer onto a storage disk during acquisition and sets a done flag for the LTOS after the acquisition is complete. The module checks for operation of level 3 tasks and triggers the operation of level 3 tasks.

The level 2 program module includes an acquisition (Acq) module which acquires data from the support electronics 45 and controls level 3 procedures via event flags. If level 3 procedures fall behind the data module stores the raw data during acquisition. The level 2 module also includes a replay module which replays data from a previously loaded disk data file. The replay module is activated either from the LTOS (playback) or acquisition module where the real time processing does not keep abreast of the data input. The replay module also controls level 3 processors via event flags.

The level 2 replay module is also loaded by the LTOS to receive test requirements and operating speed information. The module is triggered by the LTOS module to start playback of a previous test. The replay module loads frames of data onto buffers and triggers level 3 tasks. Upon completion of the replay module tasks the module also sets a done flag for the LTOS to indicate that the replay function is complete.

The level 3 tasks include all real time processing tasks. The level 3 module processes the data received from the support electronics to effect such processes as the construction of a histogram, XY plotting, mapping, sum square, difference, threshold, M of N filtering, etc. Level 3 modules are loaded by the LTOS from which they also receive the test requirements. The LTOS allocates buffers to the level 3 module, some of which may be shared with level 2, 4 or 5 modules. The processing modules operate on input data and set flags for the level 2 modules when processing is complete. The flags then trigger the next higher level task.

The level 4 modules operate to format the data for output. The modules perform an averaging and other functions on the data stored in the data buffer, and collect statistics for output on assigned output devices. The functions include RMS, Averaging, Comparing, PSD (Power Spectral Density, D* (figure of merit), Normalize and Trac. As with the other modules the level 4 module shares buffers with other level modules. When the level 4 tasks are complete the module triggers the flag permitting the next higher level tasks to proceed.

Level 5 module functions to regulate output service tasks, such as the output of data generated by the level 4 modules. As with the other modules, level 5 modules are loaded by the LTOS with the test requirements and the configuration of assigned output devices. Buffers are allocated by the LTOS which may be common with other level modules. The level 5 modules may be triggered by the level 3 or level 4 modules to process the assigned data. When processing is complete the level 5 module becomes inactive. The level 5 functions include static plot, spatial mapping, three dimensional mapping, XY output, spatial filtering, and histograms.

The last level module is the level 6 module which performs common hardcopy output tasks, such as hardcopy histogram plot, hardcopy XY plot and hardcopy list. Again this module is loaded by the LTOS with test requirements and buffer allocations. The module typically shares one buffer with each specified task on levels 3, 4 or 5 that request the hardcopy. The module reads hardcopy parameters from the system mailbox and generates the required number of hardcopies.

It is to be understood that the advantage derived by the multi-level program structure implemented in the VAX 47 is that it permits the various tasks to be identified for a particular test, allowing dynamic configuration of the program to meet the requirements associated with a particular test scenario. The particular program portions are modular in implementation and may be incorporated into the processing based upon either a preset test sequence or a recognition of the need for such program portion based on an analysis of output data from the module. For example, jitter and clutter rejection, appropriate temporal and spatial filtering and other rejection criteria to discard false data may be implemented as a consequence of data from the module indicating that noise vibrations, momentary or periodic scene vibrations or focal plane faults are present.

The LTOS module directs configuration of the lower level modules such that only those portions of the level 2 to 6 modules that are needed for a particular test scenario are utilized. The remaining portions become transparent to the programming and do not delay processing by the portions being utilized. This advantage is particularly useful when it is desired to process large amounts of data on a real time basis.

The multi-level program thus operates to link select general function modules in accordance with a desired processing functions. In such a manner only the general function modules that are essential to the desired processing function need be linked. The remaining processing modules form no portion of the instruction set and do not delay the overall operation of the program. The program becomes self-configurable upon defining the sources of data, the processing functions to be formed on that data, the priority sequence of the various processing functions and the desired manner of storing and presenting the process data. The root LTOS program operates to link the general function modules to receive the collected data, process the data, store the data, and display data as designated by relatively simple operation input instructions. An operator may simply indicate the source from which data is to be acquired, the analyzing or processing functions to be performed on the data and the console or other location at which the processed and/or raw data is to be presented or stored, and the LTOS orients the generic function modules to be configured in an efficient manner to implement the operators instructions. Modules run only if there is data for them to run. Modules that, for example, perform unneeded processing functions or communicate process data to non-designated displays or storage devices are excluded from the linking arrangement and the system need not provide sufficient processing time to affect the functions of unlinked modules. All programs on the same level run concurrently. Also the same module may concurrently run multiple programs, each with the same or different parameters. The system is presently configured to operate on 32,000 bits of data at a rate of 327,680 bytes per second. The system provides sufficient parallel processing capacity in order to permit concurrent operation. In the presently preferred embodiment each level can run 31 concurrent programs. Accordingly, the program operates to reduce processing time and thereby facilitate real time processing of large amounts of data.

Where the large amounts of data make the data collecting and data processing functions consume the real time capacity of the program, the different priority levels permit functions such as data display to be deferred in preference to high speed data storage devices which make the data available for display at a later time.

It is to be understood that the particular operations that are performed on the data e.g. the particular operations performed by the general function modules, may be varied without departing from the basic principles of the test configuration program. Thus, for example, the level 3 or level 4 modules may implement a variety of different processing functions other than those described above.

A listing of the program information stored in controller 47 is appended to this application as an appendix A. A brief review of the operational characteristics of the program stored in controller 49 is set forth below to facilitate an understanding of the operation of the program to implement the functions of the laboratory test system. It is to be understood, however, that the specific program listings in appendix A and the descriptive information set forth below are provided by means of example only, and are not intended to represent the only way in which the laboratory test system may be implemented, or that the novel features on the program may be affected.

A general description of the interconnection of the various priority levels of general purpose modules, and the event flags used to facilitate communication between the various levels is as follows:

| EVENT FLAGS | | |
|---|---|---|
| Level 1 | | |
| SEND | LTOS Cluster 2 (16 Triggers from level 1 to level 2) | |
| RECEIVE | LTOS Cluster 3 (1 common message from all levels except 6) | |
| LEVEL 2 | | |
| SEND | LTOS Cluster 3 (1 common message to level 1) ACQ Cluster 2 (Buffer #[Bits 0 + 2], 1 real time trigger [Bit 3], 1 replay trigger [Bit 4], Frame Count [Bits 5-17] | |
| RECEIVE | LTOS Cluster 2 (16 Triggers from Level 1) ACQ Cluster 3 (32 Ready from Level 3) | |
| LEVEL 3 | | |
| SEND | LTOS Cluster 3 (1 common message to Level 1) Real Time Cluster 2 (32 Triggers to Level 4, if required) Hard Copy Cluster 2 (16 Common Busy, 16 Common Triggers to Level 6 if required) ACQ Cluster 3 (32 ready to Level 2) | |
| RECEIVE | ACQ Cluster 2 (Buffer # [Bits 0-2], 1 real time trigger [Bit 3], 1 Replay trigger [Bit 4], Frame Count [Bits 5-17] from Level 2) | |
| LEVEL 4 | | |
| SEND | LTOS Cluster 3 (1 common message to Level 1) Process Cluster 2 (32 triggers to Level 5 if required) Hard Copy Cluster (16 common busy, 16 common triggers to Level 6 if required) | |
| RECEIVE | Real time Cluster 2 (32 triggers from Level 3) | |
| LEVEL 5 | | |
| SEND | LTOS Cluster 3 (1 common message to level 1) Hard Copy Cluster 2 (16 common busy, 16 common triggers to Level 6 if required) | |

| -continued | | |
|---|---|---|
| EVENT FLAGS | | |
| RECEIVE | Process Cluster 2 (32 triggers from Level 4) | |
| LEVEL 6 | | |
| SEND | Hard Copy 3 (16 common trigger to levels 3, 4, or 5) | |
| RECEIVE | Hard Copy 2 (16 common busy, 16 common triggers from Levels 3, 4 or 5) | |
| In the presently preferred embodiment the LTOS loads the following parameters to the various modules: | | |
| Parent process MSX name | 10 | char |
| Event flag clutter to use | 10 | char |
| Global memory name | 10 | char |
| Array size | 1 | integer |
| Frames in test | 1 | integer |
| Name label for output tasks | 40 | char |
| Data scaling factor | 1 | F.P. |
| Number of output processors required | 1 | char |
| Name of first output process | 10 | char |
| Name of mailbox for first process | 10 | char |
| Label 1 for first process | 20 | char |
| Label 2 for first process | 20 | char |
| Qualifier word for first process | 1 | integer |
| Name of second output process | 10 | char |
| Name of mailbox for second process | 10 | char |
| Label 1 for second process | 20 | char |
| Label 2 for second process | 20 | char |
| Qualifier for second process | 1 | integer |
| Name of third process . . . n qualifier for last process. | | |

The following pseudo services are affected by the LTOS in response to a particular scenario selected:
1. create buffer (logical name, size) [size is in bytes]
2. get buffer (logical name) [returns a pointer to buffer or zero if not avail]
3. create cluster (logical name, cluster number) [cluster number is either 2 or 3]
4. get cluster (logical name, cluster number)
5. set flag (cluster number, logical bit) [logical bit is 1-31]
6. release cluster (cluster name)
7. release buffer (logical name)
8. Clear flag (cluster number, logical bit)
9. Read cluster (cluster number)
10. Wait for (cluster number)
11. Wait for and (cluster number)
12. Wait for or (cluster number)

The description below illustrates the particular sequence in which the certain particular modules are implemented in the presently preferred embodiment. The exact implementation is set forth in the appended program listing.

The main driver for the operation of a system may be a simple personal computer which configures the VAX computer to implement the test scenario. As described above, in the presently preferred embodiment the main driver is implemented in a Macintosh Apple Computer. The principal routines affected by the personal computer are described below.

Main driver program

1. Call routine to get order from VAX on GPIB and put it into accumulator.
2. See if order is to relay another order to the OSTG.
3. If it is, go to subroutine to relay VAX order.
4. See if order is to read data from an SOTG unit and store it into memory.
5. If it is, go to subrountine to read OSTG unit.
6. See if order is to write stored data in memory out to the VAX 7. If it is, go to subroutine that dumps memory contents out to the VAX
8. If order was none of the above, it is an unrecognized command and should be ignored in this case, start over from step 1.

Relay Order Routine

1. Call routine to get order type from VAX on GPIB and put it into accumulator.
2. See if order type is for a three-byte (P3 outdip) instruction.
3. If it is, jump to branch that handles the three-byte case. (A)
4. Since we otherwise have a one-byte (p7 outdip) instruction call routine to get byte from VAX on GPIB and put it into a register
5. If order involves stepping a scene stepper ONLY, jump to B below
6. If order involves resetting the all commands done flag, jump to C below.
7. Otherwise, just present instruction byte to p7 outdip
8. Go back to 1. in main driver routine.

A.

1. Call routine to get low byte from VAX and put it into the lower half of a register.
2. Call routine to get high byte from VAX and put it into the upper half of a register.
3. Present low byte to P3 outdip.
4. Present order to P2 outdip.
5. Delay enough time for CMD not done yet flag to assert.
6. Now watch flag until it deasserts.
7. When it does, present high byte to P3 outdip.
8. Present a no CMD command to P2 outdip.
9. Delay if necessary for CMD not done yet flag to assert.
10. Now wait for flag to deassert.
11. Then present order again to P2 outdip.
12. Delay again for CMD not done yet flag assertion
13. Wait for flag deassertion.
14. Jump back to 1. in main driver routine.

B.

1. Invert the X and Y step trigger bits.
2. Present the byte to P7 outdip.
3. Let it dwell there for about 1/100 second.
4. If the X step trigger bit is low, invert it.
5. If the Y step trigger bit is low, invert it.
6. Present the byte to P7 outdip again.
7. Jump back to 1. in main driver routine.

C.

1. Store bits 0-3 in a holding register.
2. Put all 1's in bits 0-3 in scene byte.
3. Invert the reset CMD done* bit.
4. Present byte to P7 outdip.
5. Let it dwell there for a time period.
6. Invert the reset CMD done* bit again.
7. Present the byte to P7 outdip again.
8. Restore bits 0-3 of the byte to their original values.
9. Jump to B above.

Store OSTG data

1. Reset all counters and pointers.
2. Call routine to reset CMD done flag.
3. Send a global no CMD command via P2 outdip.
4. Wait for the not done yet flag in P4 indip to assert.
5. Now wait for it to disassert.
6. Monitor frame sync through its I/0 port and wait for it to go low if it is high.
7. Wait for frame sync to go from low to high.
8. Send a command to update position readout to card 1 (if first time through loop) via p2 outdip.
9. Wait for the card 1 CMD running flag in p4 indip to assert.
10. Now wait for it to disassert.
11. Read lowbyte of data from PO indip and put into a register.
12. Read highbyte of data from P1 indip and put into a register.
13. Increment memory pointer and place lowbyte into memory.
14. Increment memory pointer and place highbyte into memory.
15. Send a no CMD command to card 1 (if first time through loop).
16. Wait for the card 1 CMD running flag in p4 indip to assert.
17. Now wait for it to disassert.
18. Jump back to 8. and do loop 5 more times, each time with a different card ID (6 total).
19. Read byte of data from P6 indip and put it into a register.
20. Read byte of data from P5 indip and put it into a register.
21. Increment memory pointer and place first (P6 indip) byte into memory.
22. Increment memory pointer and place second (P5 indip) byte into memory.
23. Increment memory pointer and put a byte of 2ERD5 into memory, do this twice.
24. Increment frame pointer
25. Call routine to check for an interrupt order from the VAX through the IEEE 488 interface.
26. If there is an interrupt order (except resume), go to step 29 below.
27. If frame counter=8192 then jump back to main driver step 1.
28. Else jump back to step 2 above.
29. Is interrupt order to abort?
30. If so, jump to main driver step 1.
31. Is interrupt order to suspend?
32. If so, do nothing but continuously call routine to check for an interrupt order from the VAX until it comes.
33. If order is to resume, go to step 27 above.
34. Else jump to step 29 above.

Dump OSTG Data

1. Reset all counters and pointers.
2. Read byte of data from memory into accumulator.
3. Call routine to send it to VAX via the IEEE-488 Interf.
4. Increment memory pointer..
5. Have 128K bytes been sent?
6. If not, jump back to 2 above and do loop again.
7. Else jump back to main driver step 1.

```
00000000* EF 01 FB        118C              calls    #1,EXIT
                          1193   sym.66:
            7E 7C          1193              clrq     -(sp)
         CC AD DF         1195              pushal   -52(fp)
00000000* EF 03 FB        1198              calls    #3,SYS$DELTVA
         67 50 D0         119F              movl     r0,(r7)
52 50 FFFFFFFE 8F CB      11A2              bicl3    #-2,r0,r2
         01 52 D1         11AA              cmpl     r2,#1
            09 13         11AD              beql     sym.67
            67 DD         11AF              pushl    (r7)
00000000* EF 01 FB        11B1              calls    #1,EXIT
                          11B8   sym.67:
         04 AE DD         11B8              pushl    4(sp)
00000000* EF 01 FB        11BB              calls    #1,SYS$DASSGN
         67 50 D0         11C2              movl     r0,(r7)
52 50 FFFFFFFE 8F CB      11C5              bicl3    #-2,r0,r2
         01 52 D1         11CD              cmpl     r2,#1
            09 13         11D0              beql     sym.68
            67 DD         11D2              pushl    (r7)
00000000* EF 01 FB        11D4              calls    #1,EXIT
                          11DB   sym.68:
         FF20 CD DF       11DB              pushal   -224(fp)
00000000* EF 01 FB        11DF              calls    #1,GETS
         FF20 CD DF       11E6              pushal   -224(fp)
00000000* EF 01 FB        11EA              calls    #1,GETS
         FF70 CD DF       11F1              pushal   -144(fp)
         FEA8 CD DF       11F5              pushal   -344(fp)
00000000* EF 02 FB        11F9              calls    #2,STRCPY
         FF20 CD DF       1200              pushal   -224(fp)
         FEA8 CD DF       1204              pushal   -344(fp)
00000000* EF 02 FB        1208              calls    #2,STRCAT
         FEA8 CD DF       120F              pushal   -344(fp)
         075C CC DF       1213              pushal   1884(ap)
00000000* EF 02 FB        1217              calls    #2,PRINTF
         0771 CC DF       121E              pushal   1905(ap)
00000000* EF 01 FB        1222              calls    #1,PRINTF
FCDE CD FEA8 CD DE        1229              moval    -344(fp),-802(fp
         FEA8 CD DF       1230              pushal   -344(fp)
00000000* EF 01 FB        1234              calls    #1,STRLEN
         FCDA CD 50 B0    1238              movw     r0,-806(fp)
            7E 7C         1240              clrq     -(sp)
            7E 7C         1242              clrq     -(sp)
            7E 7C         1244              clrq     -(sp)
            00 DD         1246              pushl    #0
         FCD2 CD 9F       1248              pushab   -814(fp)
            7E 7C         124C              clrq     -(sp)
            00 DD         124E              pushl    #0
         FCDA CD 9F       1250              pushab   -806(fp)
00000000* EF 0C FB        1254              calls    #12,LIB$SPAWN
         67 50 D0         1258              movl     r0,(r7)
52 50 FFFFFFFE 8F CB      125E              bicl3    #-2,r0,r2
         01 52 D1         1266              cmpl     r2,#1
            09 13         1269              beql     sym.69
            67 DD         126B              pushl    (r7)
00000000* EF 01 FB        126D              calls    #1,EXIT
                          1274   sym.69:
         078A CC DF       1274              pushal   1930(ap)
```

```
                   00000000* EF 01 FB   1278            calls    #1,PRINTF
                            07A9 CC DF  127F            pushal   1961(ap)
                   00000000* EF 01 FB   1283            calls    #1,PRINTF
                                  7E 7C 128A            clrq     -(sp)
                            FDD6 CD 9F  128C            pushab   -554(fp)
                   00000000* EF 03 FB   1290            calls    #3,SYS$OPEN
                                  67 50 D0 1297         movl     r0,(r7)
                52 50 FFFFFFFE 8F CB    129A            bicl3    #-2,r0,r2
                                  01 52 D1 12A2         cmpl     r2,#1
                                     09 13 12A5         beql     sym.70
                                     67 DD 12A7         pushl    (r7)
                   00000000* EF 01 FB   12A9            calls    #1,EXIT
                                           12B0 sym.70:
                         04 AE FDE2 CD D0 12B0          movl     -542(fp),4(sp)
                                     10 A6 DD 12B6      pushl    16(r6)
                                     7E 7C 12B9         clrq     -(sp)
                                     10 A6 DD 12BB      pushl    16(r6)
                                     14 AE DD 12BE      pushl    20(sp)
                                     7E 7C 12C1         clrq     -(sp)
                            00000000 EF 9F 12C3         pushab   FRAMES
                            00020009 8F DD 12C9         pushl    #131081
                                     00 DD 12CF         pushl    #0
                                     D4 AD DF 12D1      pushal   -44(fp)
                                     CC AD DF 12D4      pushal   -52(fp)
                   00000000* EF 0C FB   12D7            calls    #12,SYS$CRMPSC
                                  67 50 D0 12DE         movl     r0,(r7)
                52 50 FFFFFFFE 8F CB    12E1            bicl3    #-2,r0,r2
                                  01 52 D1 12E9         cmpl     r2,#1
                                     09 13 12EC         beql     sym.71
                                     67 DD 12EE         pushl    (r7)
                   00000000* EF 01 FB   12F0            calls    #1,EXIT
                                           12F7 sym.71:
                            C8 AD D4 AD D0 12F7         movl     -44(fp),-56(fp)
                            CC AD D4 AD D0 12FC         movl     -44(fp),-52(fp)
                            D0 AD D8 AD D0 1301         movl     -40(fp),-48(fp)
                                     E8 AD DF 1306      pushal   -24(fp)
                   00000000* EF 01 FB   1309            calls    #1,LIB$FREE_EF
                                  67 50 D0 1310         movl     r0,(r7)
                52 50 FFFFFFFE 8F CB    1313            bicl3    #-2,r0,r2
                                  01 52 D1 131B         cmpl     r2,#1
                                     03 12 131E         bne      gen.16
                                     0241 31 1320       brw      sym.80
                                           1323 gen.16:
                                     67 DD 1323         pushl    (r7)
                   00000000* EF 01 FB   1325            calls    #1,EXIT
                                     0235 31 132C       brw      sym.80
                                        01 132F         nop
                                           1330 case(906):
                                     E8 AD DF 1330      pushal   -24(fp)
                   00000000* EF 01 FB   1333            calls    #1,LIB$GET_EF
                                  67 50 D0 133A         movl     r0,(r7)
                52 50 FFFFFFFE 8F CB    133D            bicl3    #-2,r0,r2
                                  01 52 D1 1345         cmpl     r2,#1
                                     09 13 1348         beql     sym.72
                                     67 DD 134A         pushl    (r7)
                   00000000* EF 01 FB   134C            calls    #1,EXIT
                                           1353 sym.72:
```

```
                  7E 7C    1353            clrq     -(sp)
               CO AD DF    1355            pushal   -64(fp)
               E8 AD DD    1358            pushl    -24(fp)
                  01 DD    135B            pushl    #1
                  00 DD    135D            pushl    #0
               D4 AD DF    135F            pushal   -44(fp)
               C8 AD DF    1362            pushal   -56(fp)
      00000000* EF 03 FB   1365            calls    #8,SYS$UPDSEC
               67 50 DO    136C            movl     r0,(r7)
52 50 FFFFFFFE 8F CB       136F            bicl3    #-2,r0,r2
            01 52 D1       1377            cmpl     r2,#1
                  09 13    137A            beql     sym.73
                  67 DD    137C            pushl    (r7)
      00000000* EF 01 FB   137E            calls    #1,EXIT
                           1385   sym.73:
               CO AD DF    1385            pushal   -64(fp)
               E8 AD DD    1388            pushl    -24(fp)
      00000000* EF 02 FB   138B            calls    #2,SYS$SYNCH
               67 50 DO    1392            movl     r0,(r7)
52 50 FFFFFFFE 8F CB       1395            bicl3    #-2,r0,r2
            01 52 D1       139D            cmpl     r2,#1
                  09 13    13A0            beql     sym.74
                  67 DD    13A2            pushl    (r7)
      00000000* EF 01 FB   13A4            calls    #1,EXIT
                           13AB   sym.74:
                  7E 7C    13AB            clrq     -(sp)
               CC AD DF    13AD            pushal   -52(fp)
      00000000* EF 03 FB   13B0            calls    #3,SYS$DELTVA
               67 50 DO    13B7            movl     r0,(r7)
52 50 FFFFFFFE 8F CB       13BA            bicl3    #-2,r0,r2
            01 52 D1       13C2            cmpl     r2,#1
                  09 13    13C5            beql     sym.75
                  67 DD    13C7            pushl    (r7)
      00000000* EF 01 FB   13C9            calls    #1,EXIT
                           13D0   sym.75:
               04 AE DD    13D0            pushl    4(sp)
      00000000* EF 01 FB   13D3            calls    #1,SYS$DASSGN
               67 50 DO    13DA            movl     r0,(r7)
52 50 FFFFFFFE 8F CB       13DD            bicl3    #-2,r0,r2
            01 52 D1       13E5            cmpl     r2,#1
                  09 13    13E8            beql     sym.76
                  67 DD    13EA            pushl    (r7)
      00000000* EF 01 FB   13EC            calls    #1,EXIT
                           13F3   sym.76:
               FF20 CD DF  13F3            pushal   -224(fp)
      00000000* EF 01 FB   13F7            calls    #1,GETS
               FF20 CD DF  13FE            pushal   -224(fp)
      00000000* EF 01 FB   1402            calls    #1,GETS
               07CA CC DF  1409            pushal   1994(ap)
               FEA8 CD DF  140D            pushal   -344(fp)
      00000000* EF 02 FB   1411            calls    #2,STRCPY
               FF20 CD DF  1418            pushal   -224(fp)
               FEA8 CD DF  141C            pushal   -344(fp)
      00000000* EF 02 FB   1420            calls    #2,STRCAT
               07EA CC DF  1427            pushal   2026(ap)
               FEA8 CD DF  142B            pushal   -344(fp)
      00000000* EF 02 FB   142F            calls    #2,STRCAT
```

```
                  FEA8 CD DF    1436           pushal  -344(fp)
                  080D CC DF    143A           pushal  2061(ap)
        00000000* EF 02 FB      143E           calls   #2,PRINTF
                  0822 CC DF    1445           pushal  2082(ap)
        00000000* EF 01 FB      1449           calls   #1,PRINTF
         FCE6 CD FEA8 CD DE     1450           moval   -344(fp),-794(fp
                  FEA8 CD DF    1457           pushal  -344(fp)
        00000000* EF 01 FB      145B           calls   #1,STRLEN
                  FCE2 CD 50 B0 1462           movw    r0,-798(fp)
                        7E 7C   1467           clrq    -(sp)
                        7E 7C   1469           clrq    -(sp)
                        7E 7C   146B           clrq    -(sp)
                        00 DD   146D           pushl   #0
                     FCD2 CD 9F 146F           pushab  -814(fp)
                        7E 7C   1473           clrq    -(sp)
                        00 DD   1475           pushl   #0
                     FCE2 CD 9F 1477           pushab  -798(fp)
        00000000* EF 0C FB      147B           calls   #12,LIB$SPAWN
                        67 50 D0 1482          movl    r0,(r7)
        52 50 FFFFFFFE 8F C3    1485           bicl3   #-2,r0,r2
                        01 52 D1 148D          cmpl    r2,#1
                        09 13   1490           beql    sym.77
                        67 DD   1492           pushl   (r7)
        00000000* EF 01 FB      1494           calls   #1,EXIT
                                149B   sym.77:
                  083C CC DF    149B           pushal  2108(ap)
        00000000* EF 01 FB      149F           calls   #1,PRINTF
                  085C CC DF    14A6           pushal  2140(ap)
        00000000* EF 01 FB      14AA           calls   #1,PRINTF
                        7E 7C   14B1           clrq    -(sp)
                     FDD6 CD 9F 14B3           pushab  -554(fp)
        00000000* EF 03 FB      14B7           calls   #3,SYS$OPEN
                        67 50 D0 14BE          movl    r0,(r7)
        52 50 FFFFFFFE 8F C3    14C1           bicl3   #-2,r0,r2
                        01 52 D1 14C9          cmpl    r2,#1
                        09 13   14CC           beql    sym.78
                        67 DD   14CE           pushl   (r7)
        00000000* EF 01 FB      14D0           calls   #1,EXIT
                                14D7   sym.78:
             04 AE FDE2 CD D0   14D7           movl    -542(fp),4(sp)
                        10 A6 DD 14DD          pushl   16(r6)
                        7E 7C   14E0           clrq    -(sp)
                        10 A6 DD 14E2          pushl   16(r6)
                        14 AE DD 14E5          pushl   20(sp)
                        7E 7C   14E8           clrq    -(sp)
                  00000000 EF 9F 14EA         pushab  FRAMES
                  00020009 8F DD 14F0         pushl   #131081
                        00 DD   14F6           pushl   #0
                        D4 AD DF 14F8          pushal  -44(fp)
                        CC AD DF 14FB          pushal  -52(fp)
        00000000* EF 0C FB      14FE           calls   #12,SYS$CRMPSC
                        67 50 D0 1505          movl    r0,(r7)
        52 50 FFFFFFFE 8F C3    1508           bicl3   #-2,r0,r2
                        01 52 D1 1510          cmpl    r2,#1
                        09 13   1513           beql    sym.79
                        67 DD   1515           pushl   (r7)
        00000000* EF 01 FB      1517           calls   #1,EXIT
```

```
                         151E  sym.79:
    C8 AD D4 AD DO       151E           movl     -44(fp),-56(fp)
    CC AD D4 AD DO       1523           movl     -44(fp),-52(fp)
    DO AD D8 AD DO       1528           movl     -40(fp),-48(fp)
          E8 AD DF       152D           pushal   -24(fp)
 00000000* EF 01 FB      1530           calls    #1,LIB$FREE_EF
          67 50 DO       1537           movl     r0,(r7)
 52 50 FFFFFFFE 8F CB    153A           bicl3    #-2,r0,r2
          01 52 D1       1542           cmpl     r2,#1
             1D 13       1545           beql     sym.80
             67 DD       1547           pushl    (r7)
 00000000* EF 01 FB      1549           calls    #1,EXIT
             12 11       1550           brb      sym.80
             50 D5       1552           tstl     r0
                         1554  default:
          E4 AD DD       1554           pushl    -28(fp)
          087D CC DF     1557           pushal   2173(ap)
             69 DD       155B           pushl    (r9)
 00000000* EF 03 FB      155D           calls    #3,FPRINTF
                         1564  sym.80:
 000003E7 8F E4 AD D1    1564           cmpl     -28(fp),#999
             03 13       156C           beql     gen.17
             EE3B 31     156E           brw      sym.7
                         1571  gen.17:
                         1571  sym.81:
             0A DD       1571           pushl    #10
 00000000* EF 01 FB      1573           calls    #1,SLEEP
          08A2 CC DF     157A           pushal   2210(ap)
 00000000* EF 01 FB      157E           calls    #1,PRINTF
          7E 40 8F 9A    1585           movzbl   #64,-(sp)
 00000000* EF 01 FB      1589           calls    #1,SYS$SETEF
          67 50 DO       1590           movl     r0,(r7)
 52 50 FFFFFFFE 8F CB    1593           bicl3    #-2,r0,r2
          01 52 D1       159B           cmpl     r2,#1
             09 13       159E           beql     sym.82
             67 DD       15A0           pushl    (r7)
 00000000* EF 01 FB      15A2           calls    #1,EXIT
                         15A9  sym.82:
          50 01 DO       15A9           movl     #1,r0
                04       15AC           ret
```

```
                              0000   main:
                       OFFC   0000          .entry    main,^m<r2,r3,r4
   5E FFFF7FDC EE 9E   0002          movab     -32804(sp),sp
      00000000* EF 16  0009          jsb       C$MAIN
   56 00000000 EF 9E   000F          movab     STATUS,r6
      000002A4 EF DF   0016          pushal    $CHAR_STRING_CON
      0000029E EF DF   001C          pushal    $CHAR_STRING_CON
   00000000* EF 02 FB  0022          calls     #2,FOPEN
   00000000  EF 50 D0  0029          movl      r0,LOGFILE
                 14 12 0030          bneq      sym.1
      000002A6 EF DF   0032          pushal    $CHAR_STRING_CON
   00000000* EF 01 FB  0038          calls     #1,PRINTF
   00000000* EF 00 FB  003F          calls     #0,EXIT
                              0046   sym.1:
      00000000 EF 9F   0046          pushab    LTOS_MAIL
                 7E 7C 004C          clrq      -(sp)
                 7E 7C 004E          clrq      -(sp)
      00000000 EF DF   0050          pushal    MBXCHAN
                 00 DD 0056          pushl     #0
   00000000* EF 07 FB  0058          calls     #7,SYS$CREMBX
              66 50 D0 005F          movl      r0,(r6)
52 50 FFFFFFFE 8F CB   0062          bicl3     #-2,r0,r2
           01 52 D1    006A          cmpl      r2,#1
                 09 13 006D          beql      sym.2
                 66 DD 006F          pushl     (r6)
   00000000* EF 01 FB  0071          calls     #1,EXIT
                              0078   sym.2:
                 7E 7C 0078          clrq      -(sp)
      00000000 EF 9F   007A          pushab    LEVEL1
              7E 40 8F 9A 0080       movzbl    #64,-(sp)
   00000000* EF 04 FB  0084          calls     #4,SYS$ASCEFC
              66 50 D0 008B          movl      r0,(r6)
52 50 FFFFFFFE 8F CB   008E          bicl3     #-2,r0,r2
           01 52 D1    0096          cmpl      r2,#1
                 09 13 0099          beql      sym.3
                 66 DD 009B          pushl     (r6)
   00000000* EF 01 FB  009D          calls     #1,EXIT
                              00A4   sym.3:
                 7E 7C 00A4          clrq      -(sp)
                 7E 7C 00A6          clrq      -(sp)
                 14 DD 00A8          pushl     #20
      00000000 EF DF   00AA          pushal    L2MAIL
                 7E 7C 00B0          clrq      -(sp)
                 00 DD 00B2          pushl     #0
                 31 DD 00B4          pushl     #49
      00000000 EF DD   00B6          pushl     MBXCHAN
                 01 DD 00BC          pushl     #1
   00000000* EF 0C FB  00BE          calls     #12,SYS$QIOW
              66 50 D0 00C5          movl      r0,(r6)
52 50 FFFFFFFE 8F C9   00C8          bicl3     #-2,r0,r2
           01 52 D1    00D0          cmpl      r2,#1
                 09 13 00D3          beql      sym.4
                 66 DD 00D5          pushl     (r6)
   00000000* EF 01 FB  00D7          calls     #1,EXIT
                              00DE   sym.4:
   F4 AD 0200 8F 3C    00DE          movzwl    #512,-12(fp)
```

```
        F8 AD 0A00 8F 3C   00E4           movzwl   #2560,-8(fp)
                   7E 7C   00EA           clrq     -(sp)
           00000000 EF 9F  00EC           pushab   INFO
           00020008 8F DD  00F2           pushl    #131080
                  00 DD    00F8           pushl    #0
                  EC AD DF 00FA           pushal   -20(fp)
                  F4 AD DF 00FD           pushal   -12(fp)
          00000000* EF 07 FB 0100         calls    #7,SYS$MGBLSC
                  66 50 D0 0107           movl     r0,(r6)
       52 50 FFFFFFFE 8F CB 010A          bicl3    #-2,r0,r2
                  01 52 D1 0112           cmpl     r2,#1
                     09 13 0115           beql     sym.5
                     66 DD 0117           pushl    (r6)
          00000000* EF 01 FB 0119         calls    #1,EXIT
                           0120  sym.5:
                  52 EC AD D0 0120        movl     -20(fp),r2
                  53 F0 AD D0 0124        movl     -16(fp),r3
                     52 DD 0128           pushl    r2
           000002BC EF DF 012A            pushal   $CHAR_STRING_CON
           00000000 EF DD 0130            pushl    LOGFILE
          00000000* EF 03 FB 0136         calls    #3,FPRINTF
                     53 DD 013D           pushl    r3
           000002D6 EF DF 013F            pushal   $CHAR_STRING_CON
           00000000 EF DD 0145            pushl    LOGFILE
          00000000* EF 03 FB 014B         calls    #3,FPRINTF
           F4 AD 0200 8F 3C 0152          movzwl   #512,-12(fp)
               5C 10 A2 09 78 0158        ashl     #9,16(r2),ap
                     5C 5C C0 015D        addl2    ap,ap
       F8 AD 5C 00000200 8F C1 0160       addl3    #512,ap,-8(fp)
                        7E 7C 0169        clrq     -(sp)
              00000000 EF 9F 016B         pushab   FRAMES
              00020008 8F DD 0171         pushl    #131080
                        00 DD 0177        pushl    #0
                     EC AD DF 0179        pushal   -20(fp)
                     F4 AD DF 017C        pushal   -12(fp)
             00000000* EF 07 FB 017F      calls    #7,SYS$MGBLSC
                     66 50 D0 0186        movl     r0,(r6)
          5C 50 FFFFFFFE 8F CB 0189       bicl3    #-2,r0,ap
                     01 5C D1 0191        cmpl     ap,#1
                        09 13 0194        beql     sym.6
                        66 DD 0196        pushl    (r6)
             00000000* EF 01 FB 0198      calls    #1,EXIT
                              019F  sym.6:
                     54 EC AD D0 019F     movl     -20(fp),r4
                     55 F0 AD D0 01A3     movl     -16(fp),r5
                        54 DD 01A7        pushl    r4
              000002DE EF DF 01A9         pushal   $CHAR_STRING_CON
              00000000 EF DD 01AF         pushl    LOGFILE
             00000000* EF 03 FB 01B5      calls    #3,FPRINTF
                        55 DD 01BC        pushl    r5
              000002F3 EF DF 01BE         pushal   $CHAR_STRING_CON
              00000000 EF DD 01C4         pushl    LOGFILE
             00000000* EF 03 FB 01CA      calls    #3,FPRINTF
              00000300 EF DF 01D1         pushal   $CHAR_STRING_CON
             00000000* EF 01 FB 01D7      calls    #1,PRINTF
                        7E 7C 01DE        clrq     -(sp)
                     E3 AD DF 01E0        pushal   -24(fp)
```

```
            00000000 EF 9F    01E3           pushab   DR11W
  00000000* EF 04 FB          01E9           calls    #4,SYS$ASSIGN
               66 50 D0       01F0           movl     r0,(r6)
5C 50 FFFFFFFE 8F CB          01F3           bicl3    #-2,r0,ap
                  01 5C D1    01FB           cmpl     ap,#1
                     09 13    01FE           beql     sym.7
                     66 DD    0200           pushl    (r6)
  00000000* EF 01 FB          0202           calls    #1,EXIT
                              0209  sym.7:
               E3 AD DD       0209           pushl    -24(fp)
        00000310 EF DF        020C           pushal   $CHAR_STRING_CON
  00000000* EF 02 FB          0212           calls    #2,PRINTF
               E4 AD DF       0219           pushal   -28(fp)
  00000000* EF 01 FB          021C           calls    #1,LIB$GET_EF
               66 50 D0       0223           movl     r0,(r6)
5C 50 FFFFFFFE 8F CB          0226           bicl3    #-2,r0,ap
                  01 5C D1    022E           cmpl     ap,#1
                     09 13    0231           beql     sym.8
                     66 DD    0233           pushl    (r6)
  00000000* EF 01 FB          0235           calls    #1,EXIT
                              023C  sym.8:
        00000324 EF DF        023C           pushal   $CHAR_STRING_CON
  00000000* EF 01 FB          0242           calls    #1,PRINTF
               7E 46 8F 9A    0249           movzbl   #70,-(sp)
  00000000* EF 01 FB          024D           calls    #1,SYS$WAITFR
               66 50 D0       0254           movl     r0,(r6)
5C 50 FFFFFFFE 8F CB          0257           bicl3    #-2,r0,ap
                  01 5C D1    025F           cmpl     ap,#1
                     09 13    0262           beql     sym.9
                     66 DD    0264           pushl    (r6)
  00000000* EF 01 FB          0266           calls    #1,EXIT
                              026D  sym.9:
               7E 46 8F 9A    026D           movzbl   #70,-(sp)
  00000000* EF 01 FB          0271           calls    #1,SYS$CLREF
               66 50 D0       0278           movl     r0,(r6)
5C 50 FFFFFFFE 8F CB          027B           bicl3    #-2,r0,ap
                  01 5C D1    0283           cmpl     ap,#1
                     09 13    0286           beql     sym.10
                     66 DD    0288           pushl    (r6)
  00000000* EF 01 FB          028A           calls    #1,EXIT
                              0291  sym.10:
               03 A2 01 CE    0291           mnegl    #1,8(r2)
                     53 D4    0295           clrl     r3
               7E 47 8F 9A    0297           movzbl   #71,-(sp)
  00000000* EF 01 FB          029B           calls    #1,SYS$SETEF
               66 50 D0       02A2           movl     r0,(r6)
5C 50 FFFFFFFE 8F CB          02A5           bicl3    #-2,r0,ap
                  01 5C D1    02AD           cmpl     ap,#1
                     09 13    02B0           beql     sym.11
                     66 DD    02B2           pushl    (r6)
  00000000* EF 01 FB          02B4           calls    #1,EXIT
                              02BB  sym.11:
        00000341 EF DF        02BB           pushal   $CHAR_STRING_CON
  00000000* EF 01 FB          02C1           calls    #1,PRINTF
  00000000* EF 00 FB          02C8           calls    #0,LIB$INIT_TIME
               66 50 D0       02CF           movl     r0,(r6)
5C 50 FFFFFFFE 8F CB          02D2           bicl3    #-2,r0,ap
```

```
                01 5C D1    02DA            cmpl     ap,#1
                   09 13    02DD            beql     sym.12
                   66 DD    02DF            pushl    (r6)
     00000000* EF 01 FB    02E1            calls    #1,EXIT
                            02E8  sym.12:
                   7E 7C    02E8            clrq     -(sp)
                   00 DD    02EA            pushl    #0
                   0A DD    02EC            pushl    #10
        7E 04 A2 04 A2 C1   02EE            addl3    4(r2),4(r2),-(sp
                BFE4 CD DF  02F4            pushal   -16412(fp)
                   7E 7C    02F8            clrq     -(sp)
              FFFF7FDC ED DF 02FA           pushal   -32804(fp)
              7E 2031 8F 3C 0300            movzwl   #8369,-(sp)
                   E8 AD DD 0305            pushl    -24(fp)
                   E4 AD DD 0308            pushl    -28(fp)
     00000000* EF 0C FB    030B            calls    #12,SYS$QIO
                   66 50 D0 0312            movl     r0,(r6)
        5C 50 FFFFFFFE 8F C9 0315           bicl3    #-2,r0,ap
                01 5C D1    031D            cmpl     ap,#1
                   09 13    0320            beql     sym.13
                   66 DD    0322            pushl    (r6)
     00000000* EF 01 FB    0324            calls    #1,EXIT
                            0328  sym.13:
              FFFF7FDC ED DF 032B           pushal   -32804(fp)
                   E4 AD DD 0331            pushl    -28(fp)
     00000000* EF 02 FB    0334            calls    #2,SYS$SYNCH
                   66 50 D0 0338            movl     r0,(r6)
        5C 50 FFFFFFFE 8F C9 033E           bicl3    #-2,r0,ap
                01 5C D1    0346            cmpl     ap,#1
                   09 13    0349            beql     sym.14
                   66 DD    034B            pushl    (r6)
     00000000* EF 01 FB    034D            calls    #1,EXIT
                            0354  sym.14:
                   57 D4    0354            clrl     r7
                5C 62 01 C3 0356            subl3    #1,(r2),ap
                   5C 57 D1 035A            cmpl     r7,ap
                   03 19    035D            blss     gen.1
                   01A2 31  035F            brw      sym.28
                            0362  gen.1:
        53 00000000* EF 9E  0362            movab    SYS$SETEF,r11
        55 00000000* EF 9E  0369            movab    EXIT,r5
        59 00000000* EF 9E  0370            movab    SYS$SYNCH,r9
        5A 00000000* EF 9E  0377            movab    SYS$CLREF,r10
        58 00000000* EF 9E  037E            movab    SYS$QIO,r8
                   50 D5    0385            tstl     r0
                      01    0387            nop
                            0388  sym.15:
                   50 D4    0388            clrl     r0
                   04 A2 D5 038A            tstl     4(r2)
                   14 15    038D            bleq     sym.17
                      01    038F            nop
                            0390  sym.16:
                5C 53 50 C1 0390            addl3    r0,r3,ap
           644C BFE4 CD40 B0 0394           movw     -16412(fp)[r0],(
                   53 D6    039B            incl     r0
                04 A2 50 D1 039D            cmpl     r0,4(r2)
                   ED 19    03A1            blss     sym.16
```

```
                        03A3  sym.17:
         08 A2 D6       03A3         incl     8(r2)
         53 04 A2 C0    03A6         addl2    4(r2),r3
         7E 4B 8F 9A    03AA         movzbl   #75,-(sp)
         6B 01 FB       03AE         calls    #1,(r11)
         66 50 D0       03B1         movl     r0,(r6)
5C 50 FFFFFFFE 8F CB    03B4         bicl3    #-2,r0,ap
         01 5C D1       03BC         cmpl     ap,#1
         05 13          03BF         beql     sym.18
         66 DD          03C1         pushl    (r6)
         65 01 FB       03C3         calls    #1,(r5)
                        03C6  sym.18:
    FFFF7FDC ED DF      03C6         pushal   -32804(fp)
         E4 AD DD       03CC         pushl    -28(fp)
         69 02 FB       03CF         calls    #2,(r9)
         66 50 D0       03D2         movl     r0,(r6)
5C 50 FFFFFFFE 8F CB    03D5         bicl3    #-2,r0,ap
         01 5C D1       03DD         cmpl     ap,#1
         05 13          03E0         beql     sym.19
         66 DD          03E2         pushl    (r6)
         65 01 FB       03E4         calls    #1,(r5)
                        03E7  sym.19:
         E4 AD DD       03E7         pushl    -28(fp)
         6A 01 FB       03EA         calls    #1,(r10)
         66 50 D0       03ED         movl     r0,(r6)
5C 50 FFFFFFFE 8F CB    03F0         bicl3    #-2,r0,ap
         01 5C D1       03F8         cmpl     ap,#1
         05 13          03FB         beql     sym.20
         66 DD          03FD         pushl    (r6)
         65 01 FB       03FF         calls    #1,(r5)
                        0402  sym.20:
         7E 7C          0402         clrq     -(sp)
         00 DD          0404         pushl    #0
         0A DD          0406         pushl    #10
    7E 04 A2 04 A2 C1   0408         addl3    4(r2),4(r2),-(sp)
    FFFF7FE4 ED DF      040E         pushal   -32796(fp)
         7E 7C          0414         clrq     -(sp)
    FFFF7FDC ED DF      0416         pushal   -32804(fp)
         7E 20B1 8F 3C  041C         movzwl   #3369,-(sp)
         E3 AD DD       0421         pushl    -24(fp)
         E4 AD DD       0424         pushl    -28(fp)
         68 0C FB       0427         calls    #12,(r8)
         66 50 D0       042A         movl     r0,(r6)
5C 50 FFFFFFFE 8F CB    042D         bicl3    #-2,r0,ap
         01 5C D1       0435         cmpl     ap,#1
         05 13          0438         beql     sym.21
         66 DD          043A         pushl    (r6)
         65 01 FB       043C         calls    #1,(r5)
                        043F  sym.21:
         50 D4          043F         clrl     r0
         04 A2 D5       0441         tstl     4(r2)
         15 15          0444         bleq     sym.23
         50 D5          0446         tstl     r0
                        0448  sym.22:
         5C 53 50 C1    0448         addl3    r0,r3,ap
    644C 3FE4 CD40 B0   044C         movw     -16412(fp)[r0],(
         50 D6          0453         incl     r0
```

```
            04 A2 50 D1   0455           cmpl     r0,4(r2)
                  ED 19   0459           blss     sym.22
                          045B   sym.23:
               08 A2 D6   045B           incl     8(r2)
            53 04 A2 C0   045E           addl2    4(r2),r3
            7E 4B 8F 9A   0462           movzbl   #75,-(sp)
               6B 01 FB   0466           calls    #1,(r11)
               66 50 D0   0469           movl     r0,(r6)
   5C 50 FFFFFFFE 8F C9   046C           bicl3    #-2,r0,ap
               01 5C D1   0474           cmpl     ap,#1
                  05 13   0477           beql     sym.24
                  66 DD   0479           pushl    (r6)
               65 01 FB   047B           calls    #1,(r5)
                          047E   sym.24:
            FFFF7FDC ED DF   047E        pushal   -32804(fp)
                  E4 AD DD   0484        pushl    -28(fp)
               69 02 FB   0487           calls    #2,(r9)
               66 50 D0   048A           movl     r0,(r6)
   5C 50 FFFFFFFE 8F CB   048D           bicl3    #-2,r0,ap
               01 5C D1   0495           cmpl     ap,#1
                  05 13   0498           beql     sym.25
                  66 DD   049A           pushl    (r6)
               65 01 FB   049C           calls    #1,(r5)
                          049F   sym.25:
                  E4 AD DD   049F        pushl    -28(fp)
               6A 01 FB   04A2           calls    #1,(r10)
               66 50 D0   04A5           movl     r0,(r6)
   5C 50 FFFFFFFE 8F CB   04A8           bicl3    #-2,r0,ap
               01 5C D1   04B0           cmpl     ap,#1
                  05 13   04B3           beql     sym.26
                  66 DD   04B5           pushl    (r6)
               65 01 FB   04B7           calls    #1,(r5)
                          04BA   sym.26:
                  7E 7C   04BA           clrq     -(sp)
                  00 DD   04BC           pushl    #0
                  0A DD   04BE           pushl    #10
         7E 04 A2 04 A2 C1   04C0        addl3    4(r2),4(r2),-(sp)
            BFE4 CD DF   04C6           pushal   -16412(fp)
                  7E 7C   04CA           clrq     -(sp)
            FFFF7FDC ED DF   04CC        pushal   -32804(fp)
            7E 20B1 8F 3C   04D2        movzwl   #8369,-(sp)
                  E8 AD DD   04D7        pushl    -24(fp)
                  E4 AD DD   04DA        pushl    -28(fp)
               68 0C FB   04DD           calls    #12,(r8)
               66 50 D0   04E0           movl     r0,(r6)
   5C 50 FFFFFFFE 8F CB   04E3           bicl3    #-2,r0,ap
               01 5C D1   04EB           cmpl     ap,#1
                  05 13   04EE           beql     sym.27
                  66 DD   04F0           pushl    (r6)
               65 01 FB   04F2           calls    #1,(r5)
                          04F5   sym.27:
               57 02 C0   04F5           addl2    #2,r7
            5C 62 01 C3   04F8           subl3    #1,(r2),ap
               5C 57 D1   04FC           cmpl     r7,ap
                  03 13   04FF           bgeq     gen.2
                  FE34 31   0501         brw      sym.15
                          0504   gen.2:
```

```
                        0504  sym.28:
           62 DD        0504            pushl    (r2)
  00000355 EF DF        0506            pushal   $CHAR_STRING_CON
00000000* EF 02 FB      050C            calls    #2,PRINTF
00000000* EF 00 FB      0513            calls    #0,LIB$SHOW_TIME
           66 50 D0     051A            movl     r0,(r6)
52 50 FFFFFFFE 8F CB    051D            bicl3    #-2,r0,r2
           01 52 D1     0525            cmpl     r2,#1
           09 13        0528            beql     sym.29
           66 DD        052A            pushl    (r6)
00000000* EF 01 FB      052C            calls    #1,EXIT
                        0533  sym.29:
           E3 AD DD     0533            pushl    -24(fp)
00000000* EF 01 FB      0536            calls    #1,SYS$DASSGN
           66 50 D0     053D            movl     r0,(r6)
52 50 FFFFFFFE 8F CB    0540            bicl3    #-2,r0,r2
           01 52 D1     0548            cmpl     r2,#1
           09 13        054B            beql     sym.30
           66 DD        054D            pushl    (r6)
00000000* EF 01 FB      054F            calls    #1,EXIT
                        0556  sym.30:
           E4 AD DF     0556            pushal   -28(fp)
00000000* EF 01 FB      0559            calls    #1,LIB$FREE_EF
           66 50 D0     0560            movl     r0,(r6)
52 50 FFFFFFFE 8F CB    0563            bicl3    #-2,r0,r2
           01 52 D1     056B            cmpl     r2,#1
           09 13        056E            beql     sym.31
           66 DD        0570            pushl    (r6)
00000000* EF 01 FB      0572            calls    #1,EXIT
                        0579  sym.31:
           52 20 D0     0579            movl     #32,r2
           36 13        057C            beql     sym.34
           50 D5        057E            tstl     r0
                        0580  sym.32:
           7E 49 8F 9A  0580            movzbl   #75,-(sp)
00000000* EF 01 FB      0584            calls    #1,SYS$SETEF
           66 50 D0     058B            movl     r0,(r6)
5C 50 FFFFFFFE 8F CB    058E            bicl3    #-2,r0,ap
           01 5C D1     0596            cmpl     ap,#1
           09 13        0599            beql     sym.33
           66 DD        059B            pushl    (r6)
00000000* EF 01 FB      059D            calls    #1,EXIT
                        05A4  sym.33:
           01 DD        05A4            pushl    #1
00000000* EF 01 FB      05A6            calls    #1,SLEEP
           52 D6        05AD            incl     r2
           52 20 D0     05AF            movl     #32,r2
           CC 12        05B2            bneq     sym.32
                        05B4  sym.34:
  0000037B EF DF        05B4            pushal   $CHAR_STRING_CON
00000000* EF 01 FB      05BA            calls    #1,PRINTF
           50 01 D0     05C1            movl     #1,r0
           04           05C4            ret
```

```
                        0000  main:
              0FFC      0000          .entry   main,^m<r2,r3,r4
       5E BFD0 CE 9E    0002          movab    -16432(sp),sp
    00000000* EF 16     0007          jsb      CSMAIN
    56 00000000 EF 9E   000D          movab    STATUS,r6
    5B 00000000 EF 9E   0014          movab    $CHAR_STRING_CON
       BFD0 CD 07 80    001B          movw     #7,-16432(fp)
       BFD2 CD 0E 90    0020          movb     #14,-16430(fp)
       BFD3 CD 01 90    0025          movb     #1,-16429(fp)
    BFD4 CD 029E CB DE  002A          moval    670(r11),-16428(
           02AC CB DF   0031          pushal   684(r11)
           02A6 CB DF   0035          pushal   678(r11)
       00000000* EF 02 FB  0039       calls    #2,FOPEN
       00000000  EF 50 D0  0040       movl     r0,LOGFILE
              12 12     0047          bneq     sym.1
           02AE CB DF   0049          pushal   686(r11)
    00000000* EF 01 FB  004D          calls    #1,PRINTF
    00000000* EF 00 FB  0054          calls    #0,EXIT
                        005B  sym.1:
       00000000 EF 9F   005B          pushab   LTOS_MAIL
              7E 7C     0061          clrq     -(sp)
              7E 7C     0063          clrq     -(sp)
       00000000 EF DF   0065          pushal   MBXCHAN
              00 DD     006B          pushl    #0
    00000000* EF 07 FB  006D          calls    #7,SYS$CREMBX
              66 50 D0  0074          movl     r0,(r6)
    52 50 FFFFFFFE 8F CB  0077        bicl3    #-2,r0,r2
              01 52 D1  007F          cmpl     r2,#1
              09 13     0082          beql     sym.2
              66 DD     0084          pushl    (r6)
    00000000* EF 01 FB  0086          calls    #1,EXIT
                        008D  sym.2:
              7E 7C     008D          clrq     -(sp)
       00000000 EF 9F   008F          pushab   LEVEL1
              7E 40 8F 9A  0095       movzbl   #64,-(sp)
    00000000* EF 04 FB  0099          calls    #4,SYS$ASCEFC
              66 50 D0  00A0          movl     r0,(r6)
    52 50 FFFFFFFE 8F C3  00A3        bicl3    #-2,r0,r2
              01 52 D1  00AB          cmpl     r2,#1
              09 13     00AE          beql     sym.3
              66 DD     00B0          pushl    (r6)
    00000000* EF 01 FB  00B2          calls    #1,EXIT
                        00B9  sym.3:
              7E 7C     00B9          clrq     -(sp)
              7E 7C     00BB          clrq     -(sp)
              14 DD     00BD          pushl    #20
       00000000 EF DF   00BF          pushal   L2MAIL
              7E 7C     00C5          clrq     -(sp)
              00 DD     00C7          pushl    #0
              31 DD     00C9          pushl    #49
       00000000 EF DD   00CB          pushl    MBXCHAN
              01 DD     00D1          pushl    #1
    00000000* EF 0C FB  00D3          calls    #12,SYS$QIOW
              66 50 D0  00DA          movl     r0,(r6)
    52 50 FFFFFFFE 8F CB  00DD        bicl3    #-2,r0,r2
              01 52 D1  00E5          cmpl     r2,#1
```

```
                    09 13      00E8            beql    sym.4
                    66 DD      00EA            pushl   (r6)
        00000000* EF 01 FB     00EC            calls   #1,EXIT
                               00F3    sym.4:
        F4 AD 0200 8F 3C       00F3            movzwl  #512,-12(fp)
        F8 AD 0A00 8F 3C       00F9            movzwl  #2560,-8(fp)
                    7E 7C      00FF            clrq    -(sp)
            00000000 EF 9F     0101            pushab  INFO
            00020003 8F DD     0107            pushl   #131080
                    00 DD      010D            pushl   #0
                  EC AD DF     010F            pushal  -20(fp)
                  F4 AD DF     0112            pushal  -12(fp)
        00000000* EF 07 FB     0115            calls   #7,SYS$MGBLSC
                    66 50 D0   011C            movl    r0,(r6)
        52 50 FFFFFFFE 8F CB   011F            bicl3   #-2,r0,r2
                    01 52 D1   0127            cmpl    r2,#1
                    09 13      012A            beql    sym.5
                    66 DD      012C            pushl   (r6)
        00000000* EF 01 FB     012E            calls   #1,EXIT
                               0135    sym.5:
                 52 EC AD D0   0135            movl    -20(fp),r2
                 53 F0 AD D0   0139            movl    -16(fp),r3
                    52 DD      013D            pushl   r2
                 02C4 CB DF    013F            pushal  708(r11)
            00000000 EF DD     0143            pushl   LOGFILE
        00000000* EF 03 FB     0149            calls   #3,FPRINTF
                    53 DD      0150            pushl   r3
                 02DE C9 DF    0152            pushal  734(r11)
            00000000 EF DD     0156            pushl   LOGFILE
        00000000* EF 03 FB     015C            calls   #3,FPRINTF
        F4 AD 0200 8F 3C       0163            movzwl  #512,-12(fp)
              5C 10 A2 09 78   0169            ashl    #9,16(r2),ap
                    5C 5C C0   016E            addl2   ap,ap
        F8 AD 5C 00000200 8F C1 0171           addl3   #512,ap,-8(fp)
                    7E 7C      017A            clrq    -(sp)
            00000000 EF 9F     017C            pushab  FRAMES
            00020008 8F DD     0182            pushl   #131080
                    00 DD      0188            pushl   #0
                  EC AD DF     018A            pushal  -20(fp)
                  F4 AD DF     018D            pushal  -12(fp)
        00000000* EF 07 FB     0190            calls   #7,SYS$MGBLSC
                    66 50 D0   0197            movl    r0,(r6)
        5C 50 FFFFFFFE 8F CB   019A            bicl3   #-2,r0,ap
                    01 5C D1   01A2            cmpl    ap,#1
                    09 13      01A5            beql    sym.6
                    66 DD      01A7            pushl   (r6)
        00000000* EF 01 FB     01A9            calls   #1,EXIT
                               01B0    sym.6:
                 54 EC AD D0   01B0            movl    -20(fp),r4
                 55 F0 AD D0   01B4            movl    -16(fp),r5
                    54 DD      01B8            pushl   r4
                 02E6 C3 DF    01BA            pushal  742(r11)
            00000000 EF DD     01BE            pushl   LOGFILE
        00000000* EF 03 FB     01C4            calls   #3,FPRINTF
                    55 DD      01CB            pushl   r5
                 0300 C3 DF    01CD            pushal  768(r11)
            00000000 EF DD     01D1            pushl   LOGFILE
```

```
00000000* EF 03 FB   01D7              calls    #3,FPRINTF
         E8 AD DF    01DE              pushal   -24(fp)
00000000* EF 01 FB   01E1              calls    #1,LIB$GET_EF
         66 50 D0    01E8              movl     r0,(r6)
5C 50 FFFFFFFE 8F CB 01EB              bicl3    #-2,r0,ap
         01 5C D1    01F3              cmpl     ap,#1
            09 13    01F6              beql     sym.7
            66 DD    01F8              pushl    (r6)
00000000* EF 01 FB   01FA              calls    #1,EXIT
                     0201  sym.7:
            5C D4    0201              clrl     ap
         50 62 01 C3 0203              subl3    #1,(r2),r0
            50 5C D1 0207              cmpl     ap,r0
            0B 18    020A              bgeq     sym.9
         50 62 01 C3 020C              subl3    #1,(r2),r0
                     0210  sym.8:
            5C D6    0210              incl     ap
            50 5C D1 0212              cmpl     ap,r0
            F9 19    0215              blss     sym.8
                     0217  sym.9:
         0308 CB DF  0217              pushal   776(r11)
00000000* EF 01 FB   021B              calls    #1,PRINTF
         BFD8 CD DF  0222              pushal   -16424(fp)
         BFD0 CD 9F  0226              pushab   -16432(fp)
00000000* EF 02 FB   022A              calls    #2,SYS$BINTIM
         66 50 D0    0231              movl     r0,(r6)
5C 50 FFFFFFFE 8F CB 0234              bicl3    #-2,r0,ap
         01 5C D1    023C              cmpl     ap,#1
            09 13    023F              beql     sym.10
            66 DD    0241              pushl    (r6)
00000000* EF 01 FB   0243              calls    #1,EXIT
                     024A  sym.10:
         7E 46 8F 9A 024A              movzbl   #70,-(sp)
00000000* EF 01 FB   024E              calls    #1,SYS$WAITFR
         66 50 D0    0255              movl     r0,(r6)
5C 50 FFFFFFFE 8F CB 0258              bicl3    #-2,r0,ap
         01 5C D1    0260              cmpl     ap,#1
            09 13    0263              beql     sym.11
            66 DD    0265              pushl    (r6)
00000000* EF 01 FB   0267              calls    #1,EXIT
                     026E  sym.11:
         7E 46 8F 9A 026E              movzbl   #70,-(sp)
00000000* EF 01 FB   0272              calls    #1,SYS$CLREF
         66 50 D0    0279              movl     r0,(r6)
5C 50 FFFFFFFE 8F CB 027C              bicl3    #-2,r0,ap
         01 5C D1    0284              cmpl     ap,#1
            09 13    0287              beql     sym.12
            66 DD    0289              pushl    (r6)
00000000* EF 01 FB   028B              calls    #1,EXIT
                     0292  sym.12:
         08 A2 01 CE 0292              mnegl    #1,8(r2)
            53 D4    0296              clrl     r3
         7E 47 8F 9A 0298              movzbl   #71,-(sp)
00000000* EF 01 FB   029C              calls    #1,SYS$SETEF
         66 50 D0    02A3              movl     r0,(r6)
5C 50 FFFFFFFE 8F CB 02A6              bicl3    #-2,r0,ap
         01 5C D1    02AE              cmpl     ap,#1
```

```
                   09 13    0281         beql    sym.13
                   66 DD    0283         pushl   (r6)
00000000* EF 01 FB          0285         calls   #1,EXIT
                            028C  sym.13:
           0323 CB DF        028C         pushal  803(r11)
00000000* EF 01 FB          02C0         calls   #1,PRINTF
00000000* EF 00 FB          02C7         calls   #0,LIB$INIT_TIME
                66 50 D0    02CE         movl    r0,(r6)
5C 50 FFFFFFFE 8F CB        02D1         bicl3   #-2,r0,ap
             01 5C D1       02D9         cmpl    ap,#1
                   09 13    02DC         beql    sym.14
                   66 DD    02DE         pushl   (r6)
00000000* EF 01 FB          02E0         calls   #1,EXIT
                            02E7  sym.14:
                   7E 7C    02E7         clrq    -(sp)
             BFD8 CD DF      02E9         pushal  -16424(fp)
                E8 AD DD    02ED         pushl   -24(fp)
00000000* EF 04 FB          02F0         calls   #4,SYS$SETIMR
                66 50 D0    02F7         movl    r0,(r6)
5C 50 FFFFFFFE 8F CB        02FA         bicl3   #-2,r0,ap
             01 5C D1       0302         cmpl    ap,#1
                   09 13    0305         beql    sym.15
                   66 DD    0307         pushl   (r6)
00000000* EF 01 FB          0309         calls   #1,EXIT
                            0310  sym.15:
                E8 AD DD    0310         pushl   -24(fp)
00000000* EF 01 FB          0313         calls   #1,SYS$WAITFR
                66 50 D0    031A         movl    r0,(r6)
5C 50 FFFFFFFE 8F CB        031D         bicl3   #-2,r0,ap
             01 5C D1       0325         cmpl    ap,#1
                   09 13    0328         beql    sym.16
                   66 DD    032A         pushl   (r6)
00000000* EF 01 FB          032C         calls   #1,EXIT
                            0333  sym.16:
                   57 D4    0333         clrl    r7
                5C 62 01 C3 0335         subl3   #1,(r2),ap
                   5C 57 D1 0339         cmpl    r7,ap
                   03 19    033C         blss    gen.1
                  0124 31   033E         brw     sym.28
                            0341  gen.1:
5A 00000000* EF 9E          0341         movab   SYS$SETEF,r10
55 00000000* EF 9E          0348         movab   EXIT,r5
59 00000000* EF 9E          034F         movab   SYS$SETIMR,r9
58 00000000* EF 9E          0356         movab   SYS$WAITFR,r8
                   50 D5    035D         tstl    r0
                      01    035F         nop
                            0360  sym.17:
                   50 D4    0360         clrl    r0
                04 A2 D5    0362         tstl    4(r2)
                   14 15    0365         bleq    sym.19
                      01    0367         nop
                            0368  sym.18:
                5C 53 50 C1 0368         addl3   r0,r3,ap
         644C BFE8 CD40 B0  036C         movw    -16408(fp)[r0],(
                   50 D6    0373         incl    r0
                04 A2 50 D1 0375         cmpl    r0,4(r2)
                   ED 19    0379         blss    sym.18
```

```
                     037B   sym.19:
         08 A2 D6    037B            incl      8(r2)
         53 04 A2 C0 037E            addl2     4(r2),r3
         7E 48 8F 9A 0382            movzbl    #75,-(sp)
         6A 01 FB    0386            calls     #1,(r10)
         66 50 D0    0389            movl      r0,(r6)
5C 50 FFFFFFFE 8F CB 038C            bicl3     #-2,r0,ap
         01 5C D1    0394            cmpl      ap,#1
         05 13       0397            beql      sym.20
         66 DD       0399            pushl     (r6)
         65 01 FB    039B            calls     #1,(r5)
                     039E   sym.20:
         7E 7C       039E            clrq      -(sp)
         BFD8 CD DF  03A0            pushal    -16424(fp)
         E8 AD DD    03A4            pushl     -24(fp)
         69 04 FB    03A7            calls     #4,(r9)
         66 50 D0    03AA            movl      r0,(r6)
5C 50 FFFFFFFE 8F CB 03AD            bicl3     #-2,r0,ap
         01 5C D1    03B5            cmpl      ap,#1
         05 13       03B8            beql      sym.21
         66 DD       03BA            pushl     (r6)
         65 01 FB    03BC            calls     #1,(r5)
                     03BF   sym.21:
         E8 AD DD    03BF            pushl     -24(fp)
         68 01 FB    03C2            calls     #1,(r8)
         66 50 D0    03C5            movl      r0,(r6)
5C 50 FFFFFFFE 8F CB 03C8            bicl3     #-2,r0,ap
         01 5C D1    03D0            cmpl      ap,#1
         05 13       03D3            beql      sym.22
         66 DD       03D5            pushl     (r6)
         65 01 FB    03D7            calls     #1,(r5)
                     03DA   sym.22:
         50 D4       03DA            clrl      r0
         04 A2 D5    03DC            tstl      4(r2)
         16 15       03DF            bleq      sym.24
         50 D5       03E1            tstl      r0
         01          03E3            nop
                     03E4   sym.23:
         5C 53 50 C1 03E4            addl3     r0,r3,ap
         644C BFE8 CD40 80 03E8      movw      -16408(fp)[r0],(
         50 D6       03EF            incl      r0
         04 A2 50 D1 03F1            cmpl      r0,4(r2)
         ED 19       03F5            blss      sym.23
                     03F7   sym.24:
         08 A2 D6    03F7            incl      8(r2)
         53 04 A2 C0 03FA            addl2     4(r2),r3
         7E 48 8F 9A 03FE            movzbl    #75,-(sp)
         6A 01 FB    0402            calls     #1,(r10)
         66 50 D0    0405            movl      r0,(r6)
5C 50 FFFFFFFE 8F CB 0408            bicl3     #-2,r0,ap
         01 5C D1    0410            cmpl      ap,#1
         05 13       0413            beql      sym.25
         66 DD       0415            pushl     (r6)
         65 01 FB    0417            calls     #1,(r5)
                     041A   sym.25:
         7E 7C       041A            clrq      -(sp)
         BFD8 CD DF  041C            pushal    -16424(fp)
```

```
              E8 AD DD    0420            pushl    -24(fp)
              69 04 FB    0423            calls    #4,(r9)
              66 50 D0    0426            movl     r0,(r6)
5C 50 FFFFFFFE 8F CB      0429            bicl3    #-2,r0,ap
              01 5C D1    0431            cmpl     ap,#1
                 05 13    0434            beql     sym.26
                 66 DD    0436            pushl    (r6)
              65 01 FB    0438            calls    #1,(r5)
                          0439  sym.26:
              E8 AD DD    043B            pushl    -24(fp)
              63 01 FB    043E            calls    #1,(r8)
              66 50 D0    0441            movl     r0,(r6)
5C 50 FFFFFFFE 8F CB      0444            bicl3    #-2,r0,ap
              01 5C D1    044C            cmpl     ap,#1
                 05 13    044F            beql     sym.27
                 66 DD    0451            pushl    (r6)
              65 01 FB    0453            calls    #1,(r5)
                          0456  sym.27:
              57 02 C0    0456            addl2    #2,r7
           5C 62 01 C3    0459            subl3    #1,(r2),ap
              5C 57 D1    045D            cmpl     r7,ap
                 03 18    0460            bgeq     gen.2
                 FEFB 31  0462            brw      sym.17
                          0465  gen.2:
                          0465  sym.28:
                 62 DD    0465            pushl    (r2)
              033A CB DF  0467            pushal   826(r11)
     00000000* EF 02 FB   046B            calls    #2,PRINTF
     00000000* EF 00 FB   0472            calls    #0,LIB$SHOW_TIME
              66 50 D0    0479            movl     r0,(r6)
52 50 FFFFFFFE 8F CB      047C            bicl3    #-2,r0,r2
              01 52 D1    0484            cmpl     r2,#1
                 09 13    0487            beql     sym.29
                 66 DD    0489            pushl    (r6)
     00000000* EF 01 FB   048B            calls    #1,EXIT
                          0492  sym.29:
              E8 AD DF    0492            pushal   -24(fp)
     00000000* EF 01 FB   0495            calls    #1,LIB$FREE_EF
              66 50 D0    049C            movl     r0,(r6)
52 50 FFFFFFFE 8F CB      049F            bicl3    #-2,r0,r2
              01 52 D1    04A7            cmpl     r2,#1
                 09 13    04AA            beql     sym.30
                 66 DD    04AC            pushl    (r6)
     00000000* EF 01 FB   04AE            calls    #1,EXIT
                          04B5  sym.30:
              0363 CB DF  04B5            pushal   867(r11)
     00000000* EF 01 FB   04B9            calls    #1,PRINTF
              50 01 D0    04C0            movl     #1,r0
                    04    04C3            ret
```

```
                            0000    main:
                    0FFC    0000            .entry   main,^m<r2,r3,r4
              5E 18 C2      0002            subl2    #24,sp
    00000000* EF 16         0005            jsb      CSMAIN
    57 00000000 EF 9E       000B            movab    HUE,r7
    5A 00000000 EF 9E       0012            movab    J,r10
    58 00000000 EF 9E       0019            movab    I,r8
    56 00000000 EF 9E       0020            movab    STATUS,r6
                 7E 7C      0027            clrq     -(sp)
       00000000 EF 9F       0029            pushab   LEVEL1
              7E 40 8F 9A   002F            movzbl   #64,-(sp)
    00000000* EF 04 FB      0033            calls    #4,SYS$ASCEFC
              66 50 D0      003A            movl     r0,(r6)
    52 50 FFFFFFFE 8F C8    003D            bicl3    #-2,r0,r2
              01 52 D1      0045            cmpl     r2,#1
                 09 13      0048            beql     sym.1
                 66 DD      004A            pushl    (r6)
    00000000* EF 01 FB      004C            calls    #1,EXIT
                            0053    sym.1:
           F4 AD 0200 8F 3C 0053            movzwl   #512,-12(fp)
           F8 AD 0A00 8F 3C 0059            movzwl   #2560,-8(fp)
                 7E 7C      005F            clrq     -(sp)
       00000000 EF 9F       0061            pushab   INFO
       00020008 8F DD       0067            pushl    #131080
                 00 DD      006D            pushl    #0
                 EC AD DF   006F            pushal   -20(fp)
                 F4 AD DF   0072            pushal   -12(fp)
    00000000* EF 07 FB      0075            calls    #7,SYS$MGBLSC
              66 50 D0      007C            movl     r0,(r6)
    52 50 FFFFFFFE 8F C8    007F            bicl3    #-2,r0,r2
              01 52 D1      0087            cmpl     r2,#1
                 09 13      008A            beql     sym.2
                 66 DD      008C            pushl    (r6)
    00000000* EF 01 FB      008E            calls    #1,EXIT
                            0095    sym.2:
              5C EC AD D0   0095            movl     -20(fp),ap
              53 F0 AD D0   0099            movl     -16(fp),r3
                 5C DD      009D            pushl    ap
       0000001B EF DF       009F            pushal   $CHAR_STRING_CON
    00000000* EF 02 FB      00A5            calls    #2,PRINTF
                 53 DD      00AC            pushl    r3
       00000035 EF DF       00AE            pushal   $CHAR_STRING_CON
    00000000* EF 02 FB      00B4            calls    #2,PR1 F
           F4 AD 0200 8F 3C 00B8            movzwl   #512,-12(fp)
              52 10 AC 09 78 00C1           ashl     #9,16(ap),r2
                 52 52 C0   00C6            addl2    r2,r2
    F8 AD 52 00000200 8F C1 00C9            addl3    #512,r2,-8(fp)
                 7E 7C      00D2            clrq     -(sp)
       00000000 EF 9F       00D4            pushab   FRAMES
       00020008 8F DD       00DA            pushl    #131080
                 00 DD      00E0            pushl    #0
                 EC AD DF   00E2            pushal   -20(fp)
                 F4 AD DF   00E5            pushal   -12(fp)
    00000000* EF 07 FB      00E8            calls    #7,SYS$MGBLSC
              66 50 D0      00EF            movl     r0,(r6)
    52 50 FFFFFFFE 8F C8    00F2            bicl3    #-2,r0,r2
              01 52 D1      00FA            cmpl     r2,#1
                 09 13      00FD            beql     sym.3
```

```
              66 DD       00FF              pushl    (r6)
00000000* EF 01 FB        0101              calls    #1,EXIT
                          0108    sym.3:
        6E EC AD D0       0108              movl     -20(fp),(sp)
        54 F0 AD D0       010C              movl     -16(fp),r4
              6E DD       0110              pushl    (sp)
  0000003D EF DF          0112              pushal   $CHAR_STRING_CON
00000000* EF 02 FB        0118              calls    #2,PRINTF
              54 DD       011F              pushl    r4
  00000057 EF DF          0121              pushal   $CHAR_STRING_CON
00000000* EF 02 FB        0127              calls    #2,PRINTF
        7E 4B 8F 9A       012E              movzbl   #75,-(sp)
00000000* EF 01 FB        0132              calls    #1,SYS$CLREF
           66 50 D0       0139              movl     r0,(r6)
52 50 FFFFFFFE 8F CB      013C              bicl3    #-2,r0,r2
           01 52 D1       0144              cmpl     r2,#1
              09 13       0147              beql     sym.4
              66 DD       0149              pushl    (r6)
00000000* EF 01 FB        014B              calls    #1,EXIT
                          0152    sym.4:
  00000000 EF 18 AC D0    0152              movl     24(ap),LO
  00000000 EF 14 AC D0    015A              movl     20(ap),HI
00000000 EF 2000 8F 3C    0162              movzwl   #8192,BUFLEN
52 00000000
     EF 00000000 EF C3    016B              subl3    LO,HI,r2
   00000000 EF 52 13 C7   0177              divl3    #19,r2,MAPBIN
        00000000 EF DF    017F              pushal   TFLAG
00000000* EF 01 FB        0185              calls    #1,LIB$GET_EF
     00000000 EF 50 D0    018C              movl     r0,TSTAT
52 50 FFFFFFFE 8F CB      0193              bicl3    #-2,r0,r2
           01 52 D1       019B              cmpl     r2,#1
              0D 13       019E              beql     sym.5
        00000000 EF DD    01A0              pushl    TSTAT
00000000* EF 01 FB        01A6              calls    #1,EXIT
                          01AD    sym.5:
        00000000 EF DF    01AD              pushal   TBUF
        00000000 EF 9F    01B3              pushab   TIME
00000000* EF 02 FB        01B9              calls    #2,SYS$BINTIM
     00000000 EF 50 D0    01C0              movl     r0,TSTAT
52 50 FFFFFFFE 8F CB      01C7              bicl3    #-2,r0,r2
           01 52 D1       01CF              cmpl     r2,#1
              0D 13       01D2              beql     sym.6
        00000000 EF DD    01D4              pushl    TSTAT
00000000* EF 01 FB        01DA              calls    #1,EXIT
                          01E1    sym.6:
        00000000 EF DF    01E1              pushal   HOSTNAME
        00000000 EF DF    01E7              pushal   HOST
00000000* EF 02 FB        01ED              calls    #2,STRCPY
        00000000 EF DF    01F4              pushal   HOST
00000000* EF 01 FB        01FA              calls    #1,GETHOSTBYNAME
  00000000 EF 60 14 28    0201              movc3    #20,(r0),DEST_HO
  53 00000010 EF D0       0209              movl     DEST_HOST+16,r3
  00000000 EF 00 B3 90    0210              movb     00(r3),ADDRESS
           52 63 D0       0213              movl     (r3),r2
  00000001 EF 01 A2 90    021B              movb     1(r2),ADDRESS+1
           52 63 D0       0223              movl     (r3),r2
  00000002 EF 02 A2 90    0226              movb     2(r2),ADDRESS+2
           52 63 D0       022E              movl     (r3),r2
```

```
00000003 EF 03 A2 90      0231           movb      3(r2),ADDRESS+3
52 00000004 EF 9E         0239           movab     SIN+4,r2
62 00000000 EF D0         0240           movl      ADDRESS,(r2)
00000000 EF 02 B0         0247           movw      #2,SIN
7E 0420 8F 3C             024E           movzwl    #1056,-(sp)
00000000* EF 01 FB        0253           calls     #1,HTONS
52 00000002 EF 9E         025A           movab     SIN+2,r2
62 50 B0                  0261           movw      r0,(r2)
00 DD                     0264           pushl     #0
01 DD                     0266           pushl     #1
02 DD                     0268           pushl     #2
00000000* EF 03 FB        026A           calls     #3,SOCKET
00000000 EF 50 D0         0271           movl      r0,CHANNEL
FFFFFFFF 8F
00000000 EF D1            0278           cmpl      CHANNEL,#-1
13 12                     0283           bneq      sym.7
0000005F EF DF            0285           pushal    $CHAR_STRING_CON
00000000* EF 01 FB        0288           calls     #1,PRINTF
0243 31                   0292           brw       sym.23
50 D5                     0295           tstl      r0
01                        0297           nop
                          0298   sym.7:
10 DD                     0298           pushl     #16
00000000 EF 9F            029A           pushab    SIN
00000000 EF DD            02A0           pushl     CHANNEL
00000000* EF 03 FB        02A6           calls     #3,CONNECT
00000000 EF 50 D0         02AD           movl      r0,SOCKSTAT
FFFFFFFF 8F
00000000 EF D1            0234           cmpl      SOCKSTAT,#-1
1F 12                     028F           bneq      sym.8
00000087 EF DF            02C1           pushal    $CHAR_STRING_CON
00000000* EF 01 FB        02C7           calls     #1,PRINTF
00000000 EF DD            02CE           pushl     CHANNEL
00000000* EF 01 FB        02D4           calls     #1,NETCLOSE
01FA 31                   02DB           brw       sym.23
50 D5                     02DE           tstl      r0
                          02E0   sym.8:
000000A9 EF DF            02E0           pushal    $CHAR_STRING_CON
52 00000000* EF 9E        02E6           movab     PRINTF,r2
62 01 FB                  02ED           calls     #1,(r2)
03 AC DD                  02F0           pushl     3(ap)
000000C7 EF DF            02F3           pushal    $CHAR_STRING_CON
62 02 FB                  02F9           calls     #2,(r2)
04 AC DD                  02FC           pushl     4(ap)
000000DC EF DF            02FF           pushal    $CHAR_STRING_CON
62 02 FB                  0305           calls     #2,(r2)
6C DD                     0308           pushl     (ap)
000000F6 EF DF            030A           pushal    $CHAR_STRING_CON
62 02 FB                  0310           calls     #2,(r2)
7E 4B 8F 9A               0313           movzbl    #75,-(sp)
00000000* EF 01 FB        0317           calls     #1,SYS$WAITFR
66 50 D0                  031E           movl      r0,(r6)
52 50 FFFFFFFE 8F C8      0321           bicl3     #-2,r0,r2
01 52 D1                  0329           cmpl      r2,#1
09 13                     032C           beql      sym.9
66 DD                     032E           pushl     (r6)
00000000* EF 01 FB        0330           calls     #1,EXIT
18 A7 9F                  01CD           pushab    24(r7)
00000000* EF 01 FB        01D0           calls     #1,LIB$DATE_TIME
```

```
              52 50 D0     01D7           movl     r0,r2
SC 52 FFFFFFFE 3F C8       01DA           bicl3    #-2,r2,ap
              01 5C D1     01E2           cmpl     ap,#1
                 14 13     01E5           beql     sym.10
              0089 C9 DF   01E7           pushal   185(r9)
    00000000* EF 01 FB     01EB           calls    #1,PRINTF
                 52 DD     01F2           pushl    r2
    00000000* EF 01 FB     01F4           calls    #1,LIB$STOP
                           01FB  sym.10:
                 65 DD     01FB           pushl    (r5)
    00000000* EF 01 FB     01FD           calls    #1,COUNT_HITS
              04 A5 DD     0204           pushl    4(r5)
                 65 DD     0207           pushl    (r5)
              00D9 C9 DF   0209           pushal   217(r9)
53 00000000* EF 9E         020D           movab    PRINTF,r3
              63 03 FB     0214           calls    #3,(r3)
5C 00000000 EF D0          0217           movl     THRESHPREFBLOCK,
              04 AC DD     021E           pushl    4(ap)
                 6C DD     0221           pushl    (ap)
              00F8 C9 DF   0223           pushal   248(r9)
              63 03 FB     0227           calls    #3,(r3)
              5C 6B D0     022A           movl     (r11),ap
              7E 08 AC 32  022D           cvtwl    8(ap),-(sp)
              0128 C9 DF   0231           pushal   296(r9)
              63 02 FB     0235           calls    #2,(r3)
              5C 6B D0     0238           movl     (r11),ap
              7E 2008 CC 32 023B          cvtwl    8200(ap),-(sp)
              0141 C9 DF   0240           pushal   321(r9)
              63 02 FB     0244           calls    #2,(r3)
              5C 6B D0     0247           movl     (r11),ap
              7E 4006 CC 32 024A          cvtwl    16390(ap),-(sp)
              015E C9 DF   024F           pushal   350(r9)
              63 02 FB     0253           calls    #2,(r3)
              40 A7 9F     0256           pushab   64(r7)
    00000000* EF 01 FB     0259           calls    #1,LIB$DATE_TIME
              52 50 D0     0260           movl     r0,r2
SC 52 FFFFFFFE 3F C8       0263           bicl3    #-2,r2,ap
              01 5C D1     026B           cmpl     ap,#1
                 10 13     026E           beql     sym.11
              017D C9 DF   0270           pushal   381(r9)
              63 01 FB     0274           calls    #1,(r3)
                 52 DD     0277           pushl    r2
    00000000* EF 01 FB     0279           calls    #1,LIB$STOP
                           0280  sym.11:
              3F A7 94     0280           clrb     63(r7)
              17 A7 94     0283           clrb     23(r7)
              019C C9 DF   0286           pushal   412(r9)
    00000000* EF 01 FB     028A           calls    #1,PRINTF
                 00 DD     0291           pushl    #0
    00000000* EF 01 FB     0293           calls    #1,TO_SCREEN
              50 01 D0     029A           movl     #1,r0
                    04     029D           ret
                           029E  runcalc:
                 007C      029E           .entry   runcalc,^m<r2,r3
              5E 04 C2     02A0           subl2    #4,sp
56 00000000 EF 9E          02A3           movab    THRESHHITS,r6
55 00000000 EF 9E          02AA           movab    BADPIX,r5
52 00000000 EF D0          02B1           movl     THRESH,r2
```

```
       51 04 AC D0    02B8            movl     4(ap),r1
             50 D4    02BC            clrl     r0
             51 D5    02BE            tstl     r1
             3D 15    02C0            bleq     sym.16
             50 D5    02C2            tstl     r0
                      02C4   sym.12:
             54 65 D0 02C4            movl     (r5),r4
             6440 B5  02C7            tstw     (r4)[r0]
             2C 12    02CA            bneq     sym.15
       53 08 9C DE    02CC            moval    @8(ap),r3
       53 6340 D0     02D0            movl     (r3)[r0],r3
FFF84B58 8F 53 D1     02D4            cmpl     r3,#-505000
             09 19    02D8            blss     sym.13
000794A8 8F 53 D1     02DD            cmpl     r3,#505000
             06 15    02E4            bleq     sym.14
                      02E6   sym.13:
           6440 01 B0 02E6            movw     #1,(r4)[r0]
             0C 11    02EA            brb      sym.15
                      02EC   sym.14:
             52 53 D1 02EC            cmpl     r3,r2
             07 19    02EF            blss     sym.15
             53 66 D0 02F1            movl     (r6),r3
           6340 01 B0 02F4            movw     #1,(r3)[r0]
                      02F8   sym.15:
             50 D6    02F8            incl     r0
             51 50 D1 02FA            cmpl     r0,r1
             C5 19    02FD            blss     sym.12
                      02FF   sym.16:
                04    02FF            ret
                      0300   count_hits:
                007C  0300            .entry   count_hits,^m<r2
             5E 04 C2 0302            subl2    #4,sp
       56 00000000 EF 9E 0305         movab    THRESHPREFBLOCK,
       54 00000000 EF 9E 030C         movab    THRESHHITS,r4
       55 00000000 EF 9E 0313         movab    BADPIX,r5
             51 04 AC D0 031A         movl     4(ap),r1
             52 D4    031E            clrl     r2
             50 D4    0320            clrl     r0
             51 D5    0322            tstl     r1
             27 15    0324            bleq     sym.20
             50 D5    0326            tstl     r0
                      0328   sym.17:
             53 65 D0 0328            movl     (r5),r3
           01 6340 B1 032B            cmpw     (r3)[r0],#1
             09 12    032F            bneq     sym.18
             53 64 D0 0331            movl     (r4),r3
             6340 B4  0334            clrw     (r3)[r0]
             0D 11    0337            brb      sym.19
             50 D5    0339            tstl     r0
                01    033B            nop
                      033C   sym.18:
             53 64 D0 033C            movl     (r4),r3
             6340 B5  033F            tstw     (r3)[r0]
             02 13    0342            beql     sym.19
                      041C   sym.22:
             2B A3 DF 041C            pushal   40(r3)
           025B C6 DF 041F            pushal   603(r6)
       58 00000000* EF 9E 0423        movab    PRINTF,r8
```

```
            68 02 F3        042A              calls    #2,(r8)
            48 A3 9F        042D              pushab   72(r3)
               64 9F        0430              pushab   (r4)
00000000* EF 02 F3          0432              calls    #2,SYS$NUMTIM
         0288 C6 DF         0439              pushal   648(r6)
            68 01 FB        043D              calls    #1,(r8)
         7E 0C A4 32        0440              cvtwl    12(r4),-(sp)
         7E 0A A4 32        0444              cvtwl    10(r4),-(sp)
         7E 03 A4 32        0448              cvtwl    8(r4),-(sp)
         7E 06 A4 32        044C              cvtwl    6(r4),-(sp)
            7E 64 32        0450              cvtwl    (r4),-(sp)
         7E 02 A4 32        0453              cvtwl    2(r4),-(sp)
         7E 04 A4 32        0457              cvtwl    4(r4),-(sp)
         02CE C6 DF         045B              pushal   718(r6)
            68 03 FB        045F              calls    #8,(r8)
            52 06 A4 32     0462              cvtwl    6(r4),r2
            52 3C C4        0466              mull2    #60,r2
            50 08 A4 32     0469              cvtwl    8(r4),r0
            52 50 C0        046D              addl2    r0,r2
            52 3C C4        0470              mull2    #60,r2
            50 0A A4 32     0473              cvtwl    10(r4),r0
            52 50 C0        0477              addl2    r0,r2
52 00000064 8F C4           047A              mull2    #100,r2
            50 0C A4 32     0481              cvtwl    12(r4),r0
            52 50 C0        0485              addl2    r0,r2
            51 06 A5 32     0488              cvtwl    6(r5),r1
            51 3C C4        048C              mull2    #60,r1
            50 03 A5 32     048F              cvtwl    8(r5),r0
            51 50 C0        0493              addl2    r0,r1
            51 3C C4        0496              mull2    #60,r1
            50 0A A5 32     0499              cvtwl    10(r5),r0
            51 50 C0        049D              addl2    r0,r1
51 00000064 8F C4           04A0              mull2    #100,r1
            50 0C A5 32     04A7              cvtwl    12(r5),r0
            51 50 C0        04AB              addl2    r0,r1
            57 52 51 C3     04AE              subl3    r1,r2,r7
               07 18        04B2              bgeq     sym.23
57 0083D600 8F C0           04B4              addl2    #8640000,r7
                            04BB    sym.23:
                  57 DD     04BB              pushl    r7
            02FD C6 DF      04BD              pushal   765(r6)
               68 02 FB     04C1              calls    #2,(r8)
            52 57 32 C1     04C4              addl3    #50,r7,r2
52 00000064 8F C6           04C8              divl2    #100,r2
                  52 DD     04CF              pushl    r2
            031F C6 DF      04D1              pushal   799(r6)
               68 02 FB     04D5              calls    #2,(r8)
            01 04 AC D1     04D8              cmpl     4(ap),#1
                  1B 12     04DC              bneq     sym.24
52 000003E8 8F C4           04DE              mull2    #1000,r2
         50 04 A9 02 C7     04E5              divl3    #2,4(r9),r0
            52 50 C0        04EA              addl2    r0,r2
         7E 52 04 A9 C7     04ED              divl3    4(r9),r2,-(sp)
            033D C6 DF      04F2              pushal   829(r6)
               68 02 FB     04F6              calls    #2,(r8)
                            04F9    sym.24:
                     04     04F9              ret
```

```
                          0028   main:
                 OFFC     0028            .entry    main,^m<r2,r3,r4
      5E EFA0 CE 9E       002A            movab     -4192(sp),sp
   00000000* EF 16        002F            jsb       CSMAIN
   5C 00000000 EF 9E      0035            movab     $CHAR_STRING_CON
   5B 00000000 EF 9E      003C            movab     HEYPRINT2,r11
   56 00000000 EF 9E      0043            movab     DATE7,r6
   F20E CD 0F AC 0C 28    004A            movc3     #12,15(ap),-3570
   00000000 EF 9F         0051            pushab    DETACHED
            1B AC DF      0057            pushal    27(ap)
   00000000* EF 02 FB     005A            calls     #2,SCANF
   64 8F 00000000 EF 91   0061            cmpb      DETACHED,#100
            09 12         0069            bneq      sym.1
   00000000 EF 01 D0      006B            movl      #1,HEYPRINT4
            07 11         0072            brb       sym.2
                          0074   sym.1:
   00000000 EF 02 D0      0074            movl      #2,HEYPRINT4
                          0078   sym.2:
   02 00000000 EF D1      0078            cmpl      HEYPRINT,#2
            0A 12         0082            bneq      sym.3
            1E AC DF      0084            pushal    30(ap)
   00000000* EF 01 FB     0087            calls     #1,PRINTF
                          008E   sym.3:
   00000000* EF 00 FB     008E            calls     #0,OPENOUTPUT
   00000000* EF 00 FB     0095            calls     #0,OPENINPUT
         00000000 EF 7C   009C            clrq      PREVDATE7
         00000008 EF D4   00A2            clrl      PREVDATE7+8
         0000000C EF B4   00A8            clrw      PREVDATE7+12
         00000100 EF DD   00AE            pushl     $DATA+256
   00000000* EF 01 FB     00B4            calls     #1,STRLEN
      000000F8 EF 50 B0   00BB            movw      r0,$DATA+248
   000000FC EF
         00000100 EF D0   00C2            movl      $DATA+256,$DATA+
      000000F8 EF 01 90   00CD            movb      #1,$DATA+251
      000000FA EF 0E 90   00D4            movb      #14,$DATA+250
         00000000 EF 31 D0 00DB          movl      #49,IOFUNC
         00000000 EF 01 D0 00E2          movl      #1,HEYPRINT
            6B 01 D0      00E9            movl      #1,(r11)
         00000000 EF 01 D0 00EC          movl      #1,HEYPRINT3
   00000000 EF
         00000104 EF DE   00F3            moval     $DATA+260,FILE_S
            53 AC DF      00FE            pushal    83(ap)
            EFF0 CD DF    0101            pushal    -4112(fp)
      52 00000000* EF 9E  0105            movab     STRCPY,r2
            62 02 FB      010C            calls     #2,(r2)
            69 AC DF      010F            pushal    105(ap)
            EFD2 CD DF    0112            pushal    -4142(fp)
            62 02 FB      0116            calls     #2,(r2)
            0082 CC DF    0119            pushal    130(ap)
            EFAA CD DF    011D            pushal    -4182(fp)
            62 02 FB      0121            calls     #2,(r2)
   02 00000000 EF D1      0124            cmpl      HEYPRINT4,#2
            0B 12         012B            bneq      sym.4
            00AA CC DF    012D            pushal    170(ap)
   00000000* EF 01 FB     0131            calls     #1,PRINTF
                          0138   sym.4:
            F21A CD DF    0138            pushal    -3558(fp)
            00E5 CC DF    013C            pushal    229(ap)
```

```
00000000* EF 02 FB    0140         calls    #2,SCANF
 59 8F F21A CD 91     0147         cmpb     -3558(fp),#89
              03 13   014D         beql     sym.5
 79 8F F21A CD 91     014F         cmpb     -3558(fp),#121
              0A 12   0155         bneq     sym.6
                      0157 sym.5:
    00000000 EF 02 D0 0157         movl     #2,HEYPRINT
           68 02 D0   015E         movl     #2,(r11)
                      0161 sym.6:
                      0161 askagain:
 02 00000000 EF D1    0161         cmpl     HEYPRINT4,#2
              08 12   0168         bneq     sym.7
           00E8 CC DF 016A         pushal   232(ap)
 00000000* EF 01 FB   016E         calls    #1,PRINTF
                      0175 sym.7:
         F21C CD DF   0175         pushal   -3556(fp)
         0118 CC DF   0179         pushal   280(ap)
 00000000* EF 02 FB   017D         calls    #2,SCANF
    52 F21C CD 90     0184         movb     -3556(fp),r2
       72 8F 52 91    0189         cmpb     r2,#114
              03 12   018D         bneq     gen.1
              0098 31 018F         brw      skipmail21
                      0192 gen.1:
       52 8F 52 91    0192         cmpb     r2,#82
              03 12   0196         bneq     gen.2
              008F 31 0198         brw      skipmail21
                      019B gen.2:
       77 8F 52 91    019B         cmpb     r2,#119
              06 13   019F         beql     choices
       57 8F 52 91    01A1         cmpb     r2,#87
                 BA 12 01A5        bneq     askagain
                      01A7 choices:
 00000000* EF 00 FB   01A7         calls    #0,SCREENCHOICE
              F8 AD DF 01AE        pushal   -8(fp)
 00000000* EF 01 FB   01B1         calls    #1,GET_SNOOZE_TI
 02 00000000 EF D1    01B8         cmpl     HEYPRINT,#2
              0E 12   01BF         bneq     sym.8
              F8 AD DD 01C1        pushl    -8(fp)
         0118 CC DF   01C4         pushal   283(ap)
 00000000* EF 02 FB   01C8         calls    #2,PRINTF
                      01CF sym.8:
 02 00000000 EF D1    01CF         cmpl     HEYPRINT4,#2
              08 12   01D6         bneq     sym.9
         0146 CC DF   01D8         pushal   326(ap)
 00000000* EF 01 FB   01DC         calls    #1,PRINTF
                      01E3 sym.9:
    00000000 EF DF    01E3         pushal   MAX_READS
         0187 CC DF   01E9         pushal   391(ap)
 00000000* EF 02 FB   01ED         calls    #2,SCANF
 02 00000000 EF D1    01F4         cmpl     HEYPRINT4,#2
              03 12   01FB         bneq     sym.10
         0184 CC DF   01FD         pushal   394(ap)
 00000000* EF 01 FB   0201         calls    #1,PRINTF
                      0208 sym.10:
              F4 AD DF 0208        pushal   -12(fp)
         01B5 CC DF   0208         pushal   437(ap)
 00000000* EF 02 FB   020F         calls    #2,SCANF
```

```
02 00000000 EF D1    0216            cmpl     HEYPRINT,#2
            0B 12    021D            bneq     skipmail21
        01B8 CC DF   021F            pushal   440(ap)
00000000* EF 01 FB   0223            calls    #1,PRINTF
                     022A   choices_done:
                     022A   skipmail21:
00000000 EF 0374 8F 3C   022A        movzwl   #884,HDRSIZER
00000000 EF 0A52 8F 3C   0233        movzwl   #2642,TRAILERSIZ
         02 6B D1    023C            cmpl     (r11),#2
            17 12    023F            bneq     sym.11
00000000 EF DD       0241            pushl    TRAILERSIZER
00000000 EF DD       0247            pushl    HDRSIZER
        0263 CC DF   024D            pushal   611(ap)
00000000* EF 03 FB   0251            calls    #3,PRINTF
                     0258   sym.11:
            EC AD D4 0258            clrl     -20(fp)
00000104 EF DF       025B            pushal   $DATA+260
00000000* EF 01 FB   0261            calls    #1,CHOOSEFILE
        0298 CC DF   0268            pushal   664(ap)
00000000 EF DD       026C            pushl    FILE_SPEC
00000000* EF 02 FB   0272            calls    #2,FOPEN
00000000 EF 50 D0    0279            movl     r0,FPTR
            03 13    0280            beql     gen.3
            0088 31  0282            brw      sym.16
                     0285   gen.3:
02 00000000 EF D1    0285            cmpl     HEYPRINT4,#2
            0B 12    028C            bneq     sym.12
        029A CC DF   028E            pushal   666(ap)
00000000* EF 01 FB   0292            calls    #1,PRINTF
                     0299   sym.12:
72 8F F21C CD 91     0299            cmpb     -3556(fp),#114
            08 13    029F            beql     sym.13
52 8F F21C CD 91     02A1            cmpb     -3556(fp),#82
            12 12    02A7            bneq     sym.14
                     02A9   sym.13:
        023F CC DF   02A9            pushal   703(ap)
00000000* EF 01 FB   02AD            calls    #1,PRINTF
00000000* EF 00 FB   02B4            calls    #0,EXIT
                     02BB   sym.14:
02 00000000 EF D1    02BB            cmpl     HEYPRINT4,#2
            08 12    02C2            bneq     sym.15
        02F3 CC DF   02C4            pushal   755(ap)
00000000* EF 01 FB   02C8            calls    #1,PRINTF
                     02CF   sym.15:
        F21A CD DF   02CF            pushal   -3558(fp)
        0324 CC DF   02D3            pushal   804(ap)
00000000* EF 02 FB   02D7            calls    #2,SCANF
59 8F F21A CD 91     02DE            cmpb     -3558(fp),#89
            56 13    02E4            beql     makenewfile
79 8F F21A CD 91     02E6            cmpb     -3558(fp),#121
            4E 13    02EC            beql     makenewfile
        0327 CC DF   02EE            pushal   807(ap)
00000000* EF 01 FB   02F2            calls    #1,PRINTF
        0364 CC DF   02F9            pushal   868(ap)
00000000* EF 01 FB   02FD            calls    #1,PRINTF
            57 DD    0304            pushl    r7
00000000* EF 01 FB   0306            calls    #1,LIB$STOP
```

```
            2D 11   030D            brb     sym.19
               01   030F            nop
                    0310   sym.16:
         02 68 D1   0310            cmpl    (r11),#2
            11 12   0313            bneq    sym.17
   00000000 EF DD   0315            pushl   FPTR
         0399 CC DF 031B            pushal  921(ap)
  00000000* EF 02 FB 031F           calls   #2,PRINTF
                    0326   sym.17:
         02 68 D1   0326            cmpl    (r11),#2
            08 12   0329            bneq    sym.18
         0396 CC DF 032B            pushal  950(ap)
  00000000* EF 01 FB 032F           calls   #1,PRINTF
                    0336   sym.18:
         EC AD D4   0336            clrl    -20(fp)
            57 11   0339            brb     konekt
               01   033B            nop
                    033C   sym.19:
                    033C   makenewfile:
      EC AD 01 D0   033C            movl    #1,-20(fp)
         03DC CC DF 0340            pushal  988(ap)
   00000000 EF DD   0344            pushl   FILE_SPEC
  00000000* EF 02 FB 034A           calls   #2,FOPEN
   00000000 EF 50 D0 0351           movl    r0,FPTR
            12 12   0358            bneq    sym.20
         03DF CC DF 035A            pushal  991(ap)
  00000000* EF 01 FB 035E           calls   #1,PRINTF
  00000000* EF 00 FB 0365           calls   #0,EXIT
                    036C   sym.20:
         02 68 D1   036C            cmpl    (r11),#2
            08 12   036F            bneq    sym.21
         03FC CC DF 0371            pushal  1020(ap)
  00000000* EF 01 FB 0375           calls   #1,PRINTF
                    037C   sym.21:
         02 68 D1   037C            cmpl    (r11),#2
            11 12   037F            bneq    sym.22
   00000000 EF DD   0381            pushl   FPTR
         0428 CC DF 0387            pushal  1064(ap)
  00000000* EF 02 FB 038B           calls   #2,PRINTF
                    0392   sym.22:
                    0392   konekt:
         02 68 D1   0392            cmpl    (r11),#2
            11 12   0395            bneq    sym.23
   00000000 EF DD   0397            pushl   FPTR
         043F CC DF 039D            pushal  1087(ap)
  00000000* EF 02 FB 03A1           calls   #2,PRINTF
                    03A8   sym.23:
      01 EC AD D1   03A8            cmpl    -20(fp),#1
            1A 12   03AC            bneq    sym.24
      FC70 CD 9F    03AE            pushab  -912(fp)
         EC AD DD   03B2            pushl   -20(fp)
      F21E CD 9F    03B5            pushab  -3554(fp)
      FC70 CD 9F    03B9            pushab  -912(fp)
  00000000* EF 04 FB 03BD           calls   #4,SETUP
         0621 31    03C4            brw     onedaywrloop
               01   03C7            nop
                    03C8   sym.24:
```

```
         52 F21C CD 90    03C8            movb     -3556(fp),r2
         72 8F 52 91      03CD            cmpb     r2,#114
               2D 13      03D1            beql     readloop
         52 8F 52 91      03D3            cmpb     r2,#82
               27 13      03D7            beql     readloop
         77 8F 52 91      03D9            cmpb     r2,#119
               06 13      03DD            beql     sym.25
         57 8F 52 91      03DF            cmpb     r2,#87
               1B 12      03E3            bneq     sym.26
                          03E5   sym.25:
            FC70 CD 9F    03E5            pushab   -912(fp)
            EC AD DD      03E9            pushl    -20(fp)
            F21E CD 9F    03EC            pushab   -3554(fp)
            FC70 CD 9F    03F0            pushab   -912(fp)
  00000000* EF 04 FB      03F4            calls    #4,SETUP
            05EA 31       03FB            brw      onedaywrloop
               50 D5      03FE            tstl     r0
                          0400   sym.26:
                          0400   readloop:
               02 6B D1   0400            cmpl     (r11),#2
               0B 12      0403            bneq     sym.27
            0507 CC DF    0405            pushal   1287(ap)
  00000000* EF 01 FB      0409            calls    #1,PRINTF
                          0410   sym.27:
               02 6B D1   0410            cmpl     (r11),#2
               11 12      0413            bneq     sym.28
   00000000 EF DD         0415            pushl    TRAILERSIZER
            0536 CC DF    041B            pushal   1334(ap)
  00000000* EF 02 FB      041F            calls    #2,PRINTF
                          0426   sym.28:
         57 FC70 CD 9E    0426            movab    -912(fp),r7
      55 FFFF21E ED 9E    042B            movab    -3554(fp),r5
               53 D4      0432            clrl     r3
      52 000000A8 EF 9E   0434            movab    $DATA+168,r2
               01         043B            nop
                          043C   sym.29:
               D6 A2 94   043C            clrb     -42(r2)
               82 94      043F            clrb     (r2)+
            F7 53 17 F3   0441            aobleq   #23,r3,sym.29
                          0445   quest_again:
      02 00000000 EF D1   0445            cmpl     HEYPRINT4,#2
               0B 12      044C            bneq     sym.30
            056B CC DF    044E            pushal   1337(ap)
  00000000* EF 01 FB      0452            calls    #1,PRINTF
                          0459   sym.30:
            F21A CD DF    0459            pushal   -3558(fp)
            05A7 CC DF    045D            pushal   1447(ap)
  00000000* EF 02 FB      0461            calls    #2,SCANF
         52 F21A CD 90    0468            movb     -3558(fp),r2
         41 8F 52 91      046D            cmpb     r2,#65
               06 13      0471            beql     sym.31
         61 8F 52 91      0473            cmpb     r2,#97
               07 12      0477            bneq     sym.32
                          0479   sym.31:
               53 D4      0479            clrl     r3
               02DD 31    047B            brw      clear_buf
               50 D5      047E            tstl     r0
```

```
                        0480  sym.32:
         53 8F 52 91    0480           caob     r2,#83
               06 13    0484           beql     sym.33
         73 8F 52 91    0486           cmpb     r2,#115
               B9 12    048A           bneq     quest_again
                        048C  sym.33:
            58 01 D0    048C           movl     #1,r8
                        048F  quest14:
   02 00000000 EF D1    048F           cmpl     HEYPRINT4,#2
               0B 12    0496           bneq     sym.34
         05AA CC DF     0498           pushal   1450(ap)
 00000000* EF 01 FB     049C           calls    #1,PRINTF
                        04A3  sym.34:
   02 00000000 EF D1    04A3           cmpl     HEYPRINT4,#2
               0B 12    04AA           bneq     sym.35
         05DC CC DF     04AC           pushal   1500(ap)
 00000000* EF 01 FB     04B0           calls    #1,PRINTF
                        04B7  sym.35:
   02 00000000 EF D1    04B7           cmpl     HEYPRINT4,#2
               0B 12    04BE           bneq     sym.36
         0620 CC DF     04C0           pushal   1568(ap)
 00000000* EF 01 FB     04C4           calls    #1,PRINTF
                        04CB  sym.36:
       0000007E EF DF   04CB           pushal   $DATA+126
         0643 CC DF     04D1           pushal   1603(ap)
 00000000* EF 02 FB     04D5           calls    #2,SCANF
   2D 00000080 EF 91    04DC           cmpb     $DATA+128,#45
               0F 12    04E3           bneq     sym.37
     00000089 EF 20 90  04E5           movb     #32,$DATA+137
        00000095 EF 94  04EC           clrb     $DATA+149
               16 11    04F2           brb      showsearchlow
                        04F4  sym.37:
   2D 0000007F EF 91    04F4           cmpb     $DATA+127,#45
               92 12    04FB           bneq     quest14
     00000088 EF 20 90  04FD           movb     #32,$DATA+136
        00000094 EF 94  0504           clrb     $DATA+148
                        050A  showsearchlow:
   02 00000000 EF D1    050A           cmpl     HEYPRINT4,#2
               11 12    0511           bneq     sym.38
       0000007E EF DF   0513           pushal   $DATA+126
         0646 CC DF     0519           pushal   1606(ap)
 00000000* EF 02 FB     051D           calls    #2,PRINTF
                        0524  sym.38:
       000000A0 EF 9F   0524           pushab   $DATA+160
       00000096 EF 9F   052A           pushab   $DATA+150
 00000000* EF 02 FB     0530           calls    #2,SYS$BINTIM
            53 50 D0    0537           movl     r0,r3
            02 63 D1    053A           cmpl     (r11),#2
               0D 12    053D           bneq     sym.39
               53 DD    053F           pushl    r3
         0663 CC DF     0541           pushal   1640(ap)
 00000000* EF 02 FB     0545           calls    #2,PRINTF
                        054C  sym.39:
  52 53 FFFFFFFE 8F CB  054C           bicl3    #-2,r3,r2
            01 52 D1    0554           cmpl     r2,#1
               03 13    0557           beql     gen.4
               FF33 31  0559           brw      quest14
```

```
                            055C  gen.4:
           01 53 D1         055C        cmpl      r3,#1
              10 12         055F        bneq      sym.40
           02 6B D1         0561        cmpl      (r11),#2
              0B 12         0564        bneq      sym.40
        06A0 CC DF          0566        pushal    1696(ap)
  00000000* EF 01 FB        056A        calls     #1,PRINTF
                            0571  sym.40:
  00000184 8F 53 D1         0571        cmpl      r3,#398
              10 12         0578        bneq      sym.41
           02 6B D1         057A        cmpl      (r11),#2
              0B 12         057D        bneq      sym.41
        06D2 CC DF          057F        pushal    1746(ap)
  00000000* EF 01 FB        0583        calls     #1,PRINTF
                            058A  sym.41:
     000000A0 EF 9F         058A        pushab    SDATA+160
     00000000 EF 9F         0590        pushab    LOWDATE7
  00000000* EF 02 FB        0596        calls     #2,SYS$NUMTIM
           02 6B D1         059D        cmpl      (r11),#2
              0B 12         05A0        bneq      sym.42
        0701 CC DF          05A2        pushal    1793(ap)
  00000000* EF 01 FB        05A6        calls     #1,PRINTF
                            05AD  sym.42:
           02 6B D1         05AD        cmpl      (r11),#2
              3C 12         05B0        bneq      sym.43
  7E 0000000C EF 32         05B2        cvtwl     LOWDATE7+12,-(sp)
  7E 0000000A EF 32         05B9        cvtwl     LOWDATE7+10,-(sp)
  7E 00000008 EF 32         05C0        cvtwl     LOWDATE7+8,-(sp)
  7E 00000006 EF 32         05C7        cvtwl     LOWDATE7+6,-(sp)
  7E 00000000 EF 32         05CE        cvtwl     LOWDATE7,-(sp)
  7E 00000002 EF 32         05D5        cvtwl     LOWDATE7+2,-(sp)
  7E 00000004 EF 32         05DC        cvtwl     LOWDATE7+4,-(sp)
        0748 CC DF          05E3        pushal    1864(ap)
  00000000* EF 08 FB        05E7        calls     #8,PRINTF
                            05EE  sym.43:
                            05EE  quest15:
  02 00000000 EF D1         05EE        cmpl      HEYPRINT4,#2
              0B 12         05F5        bneq      sym.44
        0776 CC DF          05F7        pushal    1910(ap)
  00000000* EF 01 FB        05FB        calls     #1,PRINTF
                            0602  sym.44:
  02 00000000 EF D1         0602        cmpl      HEYPRINT4,#2
              0B 12         0609        bneq      sym.45
        07A6 CC DF          060B        pushal    1958(ap)
  00000000* EF 01 FB        060F        calls     #1,PRINTF
                            0616  sym.45:
  02 00000000 EF D1         0616        cmpl      HEYPRINT4,#2
              0B 12         061D        bneq      sym.46
        07EA CC DF          061F        pushal    2026(ap)
  00000000* EF 01 FB        0623        calls     #1,PRINTF
                            062A  sym.46:
     000000A8 EF DF         062A        pushal    SDATA+168
        080D CC DF          0630        pushal    2061(ap)
  00000000* EF 02 FB        0634        calls     #2,SCANF
  2D 000000AA EF 91         063B        cmpb      SDATA+170,#45
              10 12         0642        bneq      sym.47
  00000083 EF 20 90         0644        movb      #32,SDATA+179
```

```
0000008F EF 94        064B              clrb      $DATA+191
            17 11     0651              brb       showsearchhigh
                  01  0653              nop
                      0654  sym.47:
2D 000000A9 EF 91     0654              cmpb      $DATA+169,#45
            91 12     065B              bneq      quest15
00000082 EF 20 90     065D              movb      #32,$DATA+173
0000008E EF 94        0664              clrb      $DATA+190
                      066A  showsearchhigh:
00000083 EF 20 90     066A              movb      #32,$DATA+179
0000008F EF 94        0671              clrb      $DATA+191
02 00000000 EF D1     0677              cmpl      HEYPRINT4,#2
            11 12     067E              bneq      sym.48
000000A8 EF DF        0680              pushal    $DATA+168
         0810 CC DF   0686              pushal    2064(ap)
00000000* EF 02 FB    068A              calls     #2,PRINTF
                      0691  sym.48:
000000C8 EF 9F        0691              pushab    $DATA+200
000000C0 EF 9F        0697              pushab    $DATA+192
00000000* EF 02 FB    069D              calls     #2,SYS$BINTIM
            53 50 D0  06A4              movl      r0,r3
            02 6B D1  06A7              cmpl      (r11),#2
            0D 12     06AA              bneq      sym.49
            53 DD     06AC              pushl     r3
         0833 CC DF   06AE              pushal    2099(ap)
00000000* EF 02 FB    06B2              calls     #2,PRINTF
                      06B9  sym.49:
52 53 FFFFFFFE 8F CB  06B9              bicl3     #-2,r3,r2
            01 52 D1  06C1              cmpl      r2,#1
            03 13     06C4              beql      gen.5
         FF25 31      06C6              brw       quest15
                      06C9  gen.5:
            01 53 D1  06C9              cmpl      r3,#1
            10 12     06CC              bneq      sym.50
            02 6B D1  06CE              cmpl      (r11),#2
            08 12     06D1              bneq      sym.50
         0863 CC DF   06D3              pushal    2155(ap)
00000000* EF 01 FB    06D7              calls     #1,PRINTF
                      06DE  sym.50:
00000184 8F 53 D1     06DE              cmpl      r3,#388
            10 12     06E5              bneq      sym.51
            02 6B D1  06E7              cmpl      (r11),#2
            03 12     06EA              bneq      sym.51
         089D CC DF   06EC              pushal    2205(ap)
00000000* EF 01 FB    06F0              calls     #1,PRINTF
                      06F7  sym.51:
000000C8 EF 9F        06F7              pushab    $DATA+200
00000000 EF 9F        06FD              pushab    HIGHDATE7
00000000* EF 02 FB    0703              calls     #2,SYS$NUMTIM
            02 6B D1  070A              cmpl      (r11),#2
            03 12     070D              bneq      sym.52
         08CC CC DF   070F              pushal    2252(ap)
00000000* EF 01 FB    0713              calls     #1,PRINTF
                      071A  sym.52:
            02 6B D1  071A              cmpl      (r11),#2
            3C 12     071D              bneq      sym.53
7E 0000000C EF 32     071F              cvtwl     HIGHDATE7+12,-(s
```

```
7E 0000000A EF 32    0726           cvtwl    HIGHDATE7+10,-(s
7E 00000008 EF 32    072D           cvtwl    HIGHDATE7+8,-(sp
7E 00000006 EF 32    0734           cvtwl    HIGHDATE7+6,-(sp
7E 00000000 EF 32    0739           cvtwl    HIGHDATE7,-(sp)
7E 00000002 EF 32    0742           cvtwl    HIGHDATE7+2,-(sp
7E 00000004 EF 32    0749           cvtwl    HIGHDATE7+4,-(sp
        0913 CC DF   0750           pushal   2323(ap)
00000000* EF 08 FB   0754           calls    #8,PRINTF
                     0758   sym.53:
                     0758   clear_buf:
           54 01 D0  075B           movl     #1,r4
                     075E   readmore:
              52 04  075E           clrl     r2
    00000000 EF D5   0760           tstl     HDRSIZER
              0E 15  0766           bleq     sym.55
                     0768   sym.54:
              6742 94 0768          clrb     (r7)[r2]
              52 D6  076B           incl     r2
    00000000 EF 52 D1 076D          cmpl     r2,HDRSIZER
              F2 19  0774           blss     sym.54
                     0776   sym.55:
              53 D4  0776           clrl     r3
    00000000 EF D5   0778           tstl     TRAILERSIZER
              0E 15  077E           bleq     sym.57
                     0780   sym.56:
              6543 94 0780          clrb     (r5)[r3]
              53 D6  0783           incl     r3
    00000000 EF 53 D1 0785          cmpl     r3,TRAILERSIZER
              F2 19  078C           blss     sym.56
                     078E   sym.57:
           02 6B D1  078E           cmpl     (r11),#2
              08 12  0791           bneq     sym.58
        0941 CC DF   0793           pushal   2369(ap)
00000000* EF 01 FB   0797           calls    #1,PRINTF
                     079E   sym.58:
              54 DD  079E           pushl    r4
           E8 AD DF  07A0           pushal   -24(fp)
    00000000 EF DF   07A3           pushal   FPTR
    00000000 EF DF   07A9           pushal   HDRSIZER
        F21E CD 9F   07AF           pushab   -3554(fp)
        FC70 CD 9F   07B3           pushab   -912(fp)
00000000* EF 06 FB   07B7           calls    #6,CALL_READ_REC
        01 E8 AD D1  07BE           cmpl     -24(fp),#1
              44 12  07C2           bneq     sym.61
           02 6B D1  07C4           cmpl     (r11),#2
              08 12  07C7           bneq     sym.59
        096E CC DF   07C9           pushal   2414(ap)
00000000* EF 01 FB   07CD           calls    #1,PRINTF
                     07D4   sym.59:
           02 6B D1  07D4           cmpl     (r11),#2
              08 12  07D7           bneq     sym.60
        0997 CC DF   07D9           pushal   2455(ap)
00000000* EF 01 FB   07DD           calls    #1,PRINTF
                     07E4   sym.60:
    00000000 EF DD   07E4           pushl    FPTR
00000000* EF 01 FB   07EA           calls    #1,FCLOSE
              50 D5  07F1           tstl     r0
```

```
              03 12      07F3            bneq     gen.6
            0502 31      07F5            brw      alldone_atlast
                         07F8   gen.6:
              50 DD      07F8            pushl    r0
           09A6 CC DF    07FA            pushal   2470(ap)
    00000000* EF 02 FB   07FE            calls    #2,PRINTF
            04F2 31      0805            brw      alldone_atlast
                         0808   sym.61:
              58 D5      0808            tstl     r8
              2C 12      080A            bneq     sym.63
           02 68 D1      080C            cmpl     (r11),#2
              09 12      080F            bneq     sym.62
           09F1 CC DF    0811            pushal   2545(ap)
    00000000* EF 01 FB   0815            calls    #1,PRINTF
                         081C   sym.62:
              01 DD      081C            pushl    #1
              00 DD      081E            pushl    #0
              58 DD      0820            pushl    r8
           F21E CD 9F    0822            pushab   -3554(fp)
           FC70 CD 9F    0826            pushab   -912(fp)
    00000000* EF 05 FB   082A            calls    #5,SHOWLOGREC
              54 D6      0831            incl     r4
            FF28 31      0833            brw      readmore
              50 D5      0836            tstl     r0
                         0838   sym.63:
              52 B4      0838            clrw     r2
  02 A6 00000002 EF B1   083A            cmpw     LOWDATE7+2,2(r6)
              02 12      0842            bneq     vcg.1
              52 B6      0844            incw     r2
                         0846   vcg.1:
              53 B4      0846            clrw     r3
  04 A6 00000004 EF B1   0848            cmpw     LOWDATE7+4,4(r6)
              02 12      0850            bneq     vcg.2
              53 B6      0852            incw     r3
                         0854   vcg.2:
            52 52 B2     0854            mcomw    r2,r2
           52 53 52 AB   0857            bicw3    r2,r3,r2
        00000000 EF 52 32 085B            cvtwl   r2,SRCH_LOW
              52 B4      0862            clrw     r2
  02 A6 00000002 EF B1   0864            cmpw     HIGHDATE7+2,2(r6
              02 12      086C            bneq     vcg.3
              52 B6      086E            incw     r2
                         0870   vcg.3:
              53 B4      0870            clrw     r3
  04 A6 00000004 EF B1   0872            cmpw     HIGHDATE7+4,4(r6
              02 12      087A            bneq     vcg.4
              53 B6      087C            incw     r3
                         087E   vcg.4:
            52 52 B2     087E            mcomw    r2,r2
           52 53 52 AB   0881            bicw3    r2,r3,r2
        00000000 EF 52 32 0885          cvtwl    r2,SRCH_HIGH
  00000000 EF
        00000000 EF B1   088C            cmpw     HIGHDATE7,LOWDAT
              0F 13      0897            beql     sym.64
           0A13 CC DF    0899            pushal   2584(ap)
    00000000* EF 01 FB   089D            calls    #1,PRINTF
            0453 31      08A4            brw      alldone_atlast
              01         08A7            nop
```

```
                    08A3    sym.64:
00000000 EF 66 B1   08A8            cmpw    (r6),LOWDATE7
         0F 13      08AF            beql    sym.65
       0A4F CC DF   08B1            pushal  2639(ap)
00000000* EF 01 FB  08B5            calls   #1,PRINTF
         043B 31    08BC            brw     alldone_atlast
            01      08BF            nop
                    08C0    sym.65:
         53 02 A6 80 08C0           movw    2(r6),r3
00000002 EF 53 B1   08C4            cmpw    r3,LOWDATE7+2
         03 13      08CB            beql    gen.7
         0084 31    08CD            brw     sym.69
                    08D0    gen.7:
         52 04 A6 80 08D0           movw    4(r6),r2
00000004 EF 52 B1   08D4            cmpw    r2,LOWDATE7+4
         13 12      08DB            bneq    sym.66
         01 DD      08DD            pushl   #1
         00 DD      08DF            pushl   #0
         01 DD      08E1            pushl   #1
       F21E CD 9F   08E3            pushab  -3554(fp)
       FC70 CD 9F   08E7            pushab  -912(fp)
00000000* EF 05 FB  08EB            calls   #5,SHOWLOGREC
         54 D6      08F2            incl    r4
         FE67 31    08F4            brw     readmore
            01      08F7            nop
                    08F8    sym.66:
00000004 EF 52 B1   08F8            cmpw    r2,LOWDATE7+4
         07 18      08FF            bgeq    sym.67
         54 D6      0901            incl    r4
         FE58 31    0903            brw     readmore
         50 D5      0906            tstl    r0
                    0908    sym.67:
00000004 EF 52 B1   0908            cmpw    r2,HIGHDATE7+4
         19 18      090F            bgeq    sym.68
         01 DD      0911            pushl   #1
         7E 7C      0913            clrq    -(sp)
       F21E CD 9F   0915            pushab  -3554(fp)
       FC70 CD 9F   0919            pushab  -912(fp)
00000000* EF 05 FB  091D            calls   #5,SHOWLOGREC
         54 D6      0924            incl    r4
         FE35 31    0926            brw     readmore
         50 D5      0929            tstl    r0
            01      092B            nop
                    092C    sym.68:
00000004 EF 52 B1   092C            cmpw    r2,HIGHDATE7+4
         03 13      0933            beql    gen.8
         03C2 31    0935            brw     alldone_atlast
                    0938    gen.8:
         01 DD      0938            pushl   #1
         00 DD      093A            pushl   #0
         01 DD      093C            pushl   #1
       F21E CD 9F   093E            pushab  -3554(fp)
       FC70 CD 9F   0942            pushab  -912(fp)
00000000* EF 05 FB  0946            calls   #5,SHOWLOGREC
         54 D6      094D            incl    r4
         FE0C 31    094F            brw     readmore
         50 D5      0952            tstl    r0
```

```
                        0954  sym.69:
00000002 EF 53 81       0954          cmpw    r3,HIGHDATE7+2
            19 18       095B          bgeq    sym.70
            01 DD       095D          pushl   #1
            7E 7C       095F          clrq    -(sp)
      F21E CD 9F        0961          pushab  -3554(fp)
      FC70 CD 9F        0965          pushab  -912(fp)
00000000* EF 05 FB      0969          calls   #5,SHOWLOGREC
            54 D6       0970          incl    r4
         FDE9 31        0972          brw     readmore
            50 D5       0975          tstl    r0
               01       0977          nop
                        0978  sym.70:
00000002 EF 53 31       0978          cmpw    r3,HIGHDATE7+2
            0F 15       097F          bleq    sym.71
      0A83 CC DF        0981          pushal  2691(ap)
00000000* EF 01 FB      0985          calls   #1,PRINTF
         036B 31        098C          brw     alldone_atlast
               01       098F          nop
                        0990  sym.71:
00000004 EF 04 A6 91    0990          cmpw    4(r6),HIGHDATE7+
            0E 15       0998          bleq    sym.72
      0AA4 CC DF        099A          pushal  2724(ap)
00000000* EF 01 FB      099E          calls   #1,PRINTF
         0352 31        09A5          brw     alldone_atlast
                        09A8  sym.72:
00000004 EF 04 A6 81    09A8          cmpw    4(r6),HIGHDATE7+
            1A 18       09B0          bgeq    sym.73
            01 DD       09B2          pushl   #1
            7E 7C       09B4          clrq    -(sp)
      F21E CD 9F        09B6          pushab  -3554(fp)
      FC70 CD 9F        09BA          pushab  -912(fp)
00000000* EF 05 FB      09BE          calls   #5,SHOWLOGREC
            54 D6       09C5          incl    r4
         FD94 31        09C7          brw     readmore
            50 D5       09CA          tstl    r0
                        09CC  sym.73:
            01 DD       09CC          pushl   #1
            00 DD       09CE          pushl   #0
            01 DD       09D0          pushl   #1
      F21E CD 9F        09D2          pushab  -3554(fp)
      FC70 CD 9F        09D6          pushab  -912(fp)
00000000* EF 05 FB      09DA          calls   #5,SHOWLOGREC
            54 D6       09E1          incl    r4
         FD78 31        09E3          brw     readmore
            50 D5       09E6          tstl    r0
                        09E8  onedaywrloop:
   00000000 EF DD       09E8          pushl   FPTR
00000000* EF 01 FB      09EE          calls   #1,FCLOSE
            52 50 D0    09F5          movl    r0,r2
            02 63 D1    09F8          cmpl    (r11),#2
            0D 12       09FB          bneq    sym.74
            52 DD       09FD          pushl   r2
      0AC5 CC DF        09FF          pushal  2757(ap)
00000000* EF 02 FB      0A03          calls   #2,PRINTF
                        0A0A  sym.74:
            52 D5       0A0A          tstl    r2
```

```
                   07 13    OA0C             beql     sym.75
00000000* EF 00 FB          0A0E             calls    #0,EXIT
                            0A15   sym.75:
                02 68 D1    0A15             cmpl     (r11),#2
                   0B 12    0A18             bneq     sym.76
             0AF9 CC DF     0A1A             pushal   2809(ap)
00000000* EF 01 FB          0A1E             calls    #1,PRINTF
                            0A25   sym.76:
             F0 AD 01 D0    0A25             movl     #1,-16(fp)
          52 F4 AD 01 C1    0A29             addl3    #1,-12(fp),r2
          52 F0 AD D1       0A2E             cmpl     -16(fp),r2
                   03 15    0A32             bleq     gen.9
                02C3 31     0A34             brw      sym.98
                            0A37   gen.9:
          53 00000000* EF 9E   0A37          movab    PRINTF,r3
       00 AE 00000000* EF 9E   0A3E          movab    SNOOZE,0(sp)
          5A 00000000* EF 9E   0A46          movab    FILLUP,r10
          59 00000000* EF 9E   0A4D          movab    UPDATE,r9
    0004CE 00000000* EF 9E    0A54           movab    EXIT,4(sp)
          58 00000000* EF 9E   0A5D          movab    DAILYWRITE,r8
                            0A64   sym.77:
                02 68 D1    0A64             cmpl     (r11),#2
                   0B 12    0A67             bneq     sym.78
              FF70 CD DD    0A69             pushl    -144(fp)
              0832 CC DF    0A6D             pushal   2866(ap)
                63 02 FB    0A71             calls    #2,(r3)
                            0A74   sym.78:
          F4 AD FF70 CD D1   0A74            cmpl     -144(fp),-12(fp)
                   10 15    0A7A             bleq     sym.79
              0867 CC DF    0A7C             pushal   2919(ap)
00000000* EF 01 FB          0A80             calls    #1,PRINTF
                 0270 31    0A87             brw      years_end
                   50 D5    0A8A             tstl     r0
                            0A8C   sym.79:
                02 68 D1    0A8C             cmpl     (r11),#2
                   07 12    0A8F             bneq     sym.80
              08A3 CC DF    0A91             pushal   2979(ap)
                63 01 FB    0A95             calls    #1,(r3)
                            0A98   sym.80:
          FC74 CD 02 8F 99   0A98            cvtbw    #2,-908(fp)
          FFFFFF74 ED D4     0A9E            clrl     -140(fp)
                   57 D4    0AA4             clrl     r7
                   55 D4    0AA6             clrl     r5
                            0AA8   sym.81:
                   55 DD    0AA8             pushl    r5
                F8 AD DD    0AAA             pushl    -8(fp)
                E4 AD DF    0AAD             pushal   -28(fp)
             0C BE 03 FB    0AB0             calls    #3,a12(sp)
             54 E4 AD D0    0AB4             movl     -28(fp),r4
                01 54 D1    0AB8             cmpl     r4,#1
                   03 13    0ABB             beql     gen.10
                  00A0 31   0ABD             brw      sym.85
                            0AC0   gen.10:
                   57 D4    0AC0             clrl     r7
                   55 DD    0AC2             pushl    r5
          00000000 EF DF    0AC4             pushal   CUR_INT
              F21E CD 9F    0ACA             pushab   -3554(fp)
```

```
        FC70 CD 9F    0ACE              pushab   -912(fp)
         6A 04 FB     0AD2              calls    #4,(r10)
         02 6B D1     0AD5              cmpl     (r11),#2
            07 12     0AD8              bneq     sym.82
        0BE7 CC DF    0ADA              pushal   3047(ap)
         63 01 FB     0ADE              calls    #1,(r3)
                      0AE1    sym.82:
     52 FC74 CD 32    0AE1              cvtwl    -908(fp),r2
  52 00000053 8F C0   0AE6              addl2    #88,r2
        FC74 CD 52 F7 0AED              cvtlw    r2,-908(fp)
         02 6B D1     0AF2              cmpl     (r11),#2
            0C 12     0AF5              bneq     sym.83
     7E FC74 CD 32    0AF7              cvtwl    -908(fp),-(sp)
        0C1C CC DF    0AFC              pushal   3100(ap)
         63 02 FB     0B00              calls    #2,(r3)
                      0B03    sym.83:
        FF74 CD DD    0B03              pushl    -140(fp)
        F21E CD 9F    0B07              pushab   -3554(fp)
         69 02 FB     0B0B              calls    #2,(r9)
         1D 55 D1     0B0E              cmpl     r5,#29
            03 13     0B11              beql     gen.11
           0189 31    0B13              brw      end_xx_loop
                      0B16    gen.11:
        F21E CD 9F    0B16              pushab   -3554(fp)
         F0 AD DF     0B1A              pushal   -16(fp)
         EC AD DF     0B1D              pushal   -20(fp)
        FC70 CD 9F    0B20              pushab   -912(fp)
         68 04 FB     0B24              calls    #4,(r8)
  02 00000000 EF D1   0B27              cmpl     HEYPRINT4,#2
            07 12     0B2E              bneq     sym.84
        0C56 CC DF    0B30              pushal   3158(ap)
         63 01 FB     0B34              calls    #1,(r3)
                      0B37    sym.84:
  02 00000000 EF D1   0B37              cmpl     HEYPRINT4,#2
            03 13     0B3E              beql     gen.12
           0162 31    0B40              brw      check_nndays
                      0B43    gen.12:
      7E 08 A6 32     0B43              cvtwl    8(r6),-(sp)
      7E 06 A6 32     0B47              cvtwl    6(r6),-(sp)
      7E 04 A6 32     0B4B              cvtwl    4(r6),-(sp)
      7E 02 A6 32     0B4F              cvtwl    2(r6),-(sp)
        0C90 CC DF    0B53              pushal   3216(ap)
         63 05 FB     0B57              calls    #5,(r3)
           0148 31    0B5A              brw      check_nndays
            50 D5     0B5D              tstl     r0
               01     0B5F              nop
                      0B60    sym.85:
         03 54 D1     0B60              cmpl     r4,#3
            03 13     0B63              beql     gen.13
           0084 31    0B65              brw      sym.89
                      0B68    gen.13:
         57 01 D0     0B68              movl     #1,r7
            55 DD     0B6B              pushl     r5
    00000000 EF DF    0B6D              pushal   CUR_INT
        F21E CD 9F    0B73              pushab   -3554(fp)
        FC70 CD 9F    0B77              pushab   -912(fp)
         6A 04 FB     0B7B              calls    #4,(r10)
```

```
      02 6B D1        0B7E            cmpl     (r11),#2
         07 12        0B81            bneq     sym.86
      0CC5 CC DF      0B83            pushal   3269(ap)
         63 01 FB     0B87            calls    #1,(r3)
                      0B8A   sym.86:
      52 FC74 CD 32   0B8A            cvtwl    -908(fp),r2
52 00000058 8F C0     0B8F            addl2    #88,r2
      FC74 CD 52 F7   0B96            cvtlw    r2,-908(fp)
      02 6B D1        0B9B            cmpl     (r11),#2
         0C 12        0B9E            bneq     sym.87
      7E FC74 CD 32   0BA0            cvtwl    -908(fp),-(sp)
      0CFA CC DF      0BA5            pushal   3322(ap)
         63 02 FB     0BA9            calls    #2,(r3)
                      0BAC   sym.87:
      02 6B D1        0BAC            cmpl     (r11),#2
         07 12        0BAF            bneq     sym.88
      0D34 CC DF      0BB1            pushal   3380(ap)
         63 01 FB     0BB5            calls    #1,(r3)
                      0BB8   sym.88:
      FF74 CD DD      0BB8            pushl    -140(fp)
      F21E CD 9F      0BBC            pushab   -3554(fp)
         69 02 FB     0BC0            calls    #2,(r9)
      F21E CD 9F      0BC3            pushab   -3554(fp)
         F0 AD DF     0BC7            pushal   -16(fp)
         EC AD DF     0BCA            pushal   -20(fp)
      FC70 CD 9F      0BCD            pushab   -912(fp)
         68 04 FB     0BD1            calls    #4,(r8)
02 00000000 EF D1     0BD4            cmpl     HEYPRINT4,#2
         03 13        0BDB            beql     gen.14
         00C5 31      0BDD            brw      check_nndays
                      0BE0   gen.14:
      0D65 CC DF      0BE0            pushal   3429(ap)
         63 01 FB     0BE4            calls    #1,(r3)
         00BB 31      0BE7            brw      check_nndays
            50 05     0BEA            tstl     r0
                      0BEC   sym.89:
      02 54 D1        0BEC            cmpl     r4,#2
         03 13        0BEF            beql     gen.15
         00A0 31      0BF1            brw      sym.94
                      0BF4   gen.15:
            57 D4     0BF4            clrl     r7
            55 DD     0BF6            pushl    r5
   00000000 EF DF     0BF8            pushal   CUR_INT
      F21E CD 9F      0BFE            pushab   -3554(fp)
      FC70 CD 9F      0C02            pushab   -912(fp)
         6A 04 FB     0C06            calls    #4,(r10)
      02 6B D1        0C09            cmpl     (r11),#2
         07 12        0C0C            bneq     sym.90
      0D9F CC DF      0C0E            pushal   3487(ap)
         63 01 FB     0C12            calls    #1,(r3)
                      0C15   sym.90:
      52 FC74 CD 32   0C15            cvtwl    -908(fp),r2
52 00000058 8F C0     0C1A            addl2    #88,r2
      FC74 CD 52 F7   0C21            cvtlw    r2,-908(fp)
      02 6B D1        0C26            cmpl     (r11),#2
         0C 12        0C29            bneq     sym.91
      7E FC74 CD 32   0C2B            cvtwl    -908(fp),-(sp)
```

```
        0DD4 CC DF    0C30              pushal   3540(ap)
           63 02 FB   0C34              calls    #2,(r3)
                      0C37   sym.91:
           02 6B D1   0C37              cmpl     (r11),#2
              07 12   0C3A              bneq     sym.92
        0E0C CC DF    0C3C              pushal   3596(ap)
           63 01 FB   0C40              calls    #1,(r3)
                      0C43   sym.92:
        FF74 CD DD    0C43              pushl    -140(fp)
        F21E CD 9F    0C47              pushab   -3554(fp)
           69 02 FB   0C4B              calls    #2,(r9)
        F21E CD 9F    0C4E              pushab   -3554(fp)
           F0 AD DF   0C52              pushal   -16(fp)
           EC AD DF   0C55              pushal   -20(fp)
        FC70 CD 9F    0C58              pushab   -912(fp)
           68 04 FB   0C5C              calls    #4,(r8)
  02 00000000 EF D1   0C5F              cmpl     HEYPRINT4,#2
              07 12   0C66              bneq     sym.93
        0E3D CC DF    0C68              pushal   3645(ap)
           63 01 FB   0C6C              calls    #1,(r3)
                      0C6F   sym.93:
  02 00000000 EF D1   0C6F              cmpl     HEYPRINT4,#2
              2D 12   0C76              bneq     check_nndays
           7E 08 A6 32 0C78             cvtwl    8(r6),-(sp)
           7E 06 A6 32 0C7C             cvtwl    6(r6),-(sp)
           7E 04 A6 32 0C80             cvtwl    4(r6),-(sp)
           7E 02 A6 32 0C84             cvtwl    2(r6),-(sp)
        0E64 CC DF    0C88              pushal   3684(ap)
           63 05 FB   0C8C              calls    #5,(r3)
              14 11   0C8F              brb      check_nndays
              50 05   0C91              tstl     r0
                 01   0C93              nop
                      0C94   sym.94:
        0E99 CC DF    0C94              pushal   3737(ap)
           63 01 FB   0C98              calls    #1,(r3)
           04 BE 00 FB 0C9B             calls    #0,a4(sp)
                      0C9F   end_xx_loop:
      FE03 55 01 1D F1 0C9F             acbl     #29,#1,r5,sym.81
                      0CA5   check_nndays:
           01 57 D1   0CA5              cmpl     r7,#1
              1D 13   0CA8              beql     sym.95
              52 B4   0CAA              clrw     r2
           0C 02 A6 B1 0CAC             cmpw     2(r6),#12
              02 12   0CB0              bneq     vcg.5
              52 B6   0CB2              incw     r2
                      0CB4   vcg.5:
              54 B4   0CB4              clrw     r4
           1F 04 A6 B1 0CB6             cmpw     4(r6),#31
              02 12   0CBA              bneq     vcg.6
              54 B6   0CBC              incw     r4
                      0CBE   vcg.6:
           52 52 B2   0CBE              mcomw    r2,r2
        52 54 52 AB   0CC1              bicw3    r2,r4,r2
              0D 13   0CC5              beql     sym.96
                      0CC7   sym.95:
        0EC7 CC DF    0CC7              pushal   3783(ap)
   00000000* EF 01 FB 0CCB              calls    #1,PRINTF
```

```
              26 11      0CD2             brb       years_end
                         0CD4   sym.96:
   02 00000000 EF D1     0CD4             cmpl      HEYPRINT4,#2
              07 12      0CDB             bneq      sym.97
         0F0A CC DF      0CDD             pushal    3850(ap)
           63 01 FB      0CE1             calls     #1,(r3)
                         0CE4   sym.97:
            F8 AD DD     0CE4             pushl     -8(fp)
   00000000* EF 01 FB    0CE7             calls     #1,SLEEP
      52 F4 AD 01 C1     0CEE             addl3     #1,-12(fp),r2
  FD6A F0 AD 01 52 F1    0CF3             acbl      r2,#1,-16(fp),sy
                         0CFA   sym.98:
                         0CFA   years_end:
                         0CFA   alldone_atlast:
      00000000 EF DD     0CFA             pushl     OUTFILE6
   00000000* EF 01 FB    0D00             calls     #1,FCLOSE
   02 00000000 EF D1     0D07             cmpl      HEYPRINT,#2
              0B 12      0D0E             bneq      sym.99
         0F28 CC DF      0D10             pushal    3830(ap)
   00000000* EF 01 FB    0D14             calls     #1,PRINTF
                         0D18   sym.99:
      00000000 EF DD     0D18             pushl     INFILE6
   00000000* EF 01 FB    0D21             calls     #1,FCLOSE
   02 00000000 EF D1     0D28             cmpl      HEYPRINT,#2
              0B 12      0D2F             bneq      sym.100
         0F56 CC DF      0D31             pushal    3926(ap)
   00000000* EF 01 FB    0D35             calls     #1,PRINTF
                         0D3C   sym.100:
   02 00000000 EF D1     0D3C             cmpl      HEYPRINT4,#2
              0B 12      0D43             bneq      sym.101
         0F8A CC DF      0D45             pushal    3978(ap)
   00000000* EF 01 FB    0D49             calls     #1,PRINTF
                         0D50   sym.101:
   02 00000000 EF D1     0D50             cmpl      HEYPRINT4,#2
              0B 12      0D57             bneq      sym.102
         0FB8 CC DF      0D59             pushal    4027(ap)
   00000000* EF 01 FB    0D5D             calls     #1,PRINTF
                         0D64   sym.102:
           50 01 D0      0D64             movl      #1,r0
                 04      0D67             ret
                         0D68   choosefile:
                000C     0D68             .entry    choosefile,^m<r2
           5E 08 C2      0D6A             subl2     #8,sp
   52 00000000 EF 9E     0D6D             movab     $CHAR_STRING_CON
   53 00000000 EF 9E     0D74             movab     HEYPRINT4,r3
           02 63 D1      0D7B             cmpl      (r3),#2
              0B 12      0D7E             bneq      sym.103
         0FF9 C2 DF      0D80             pushal    4089(r2)
   00000000* EF 01 FB    0D84             calls     #1,PRINTF
                         0D88   sym.103:
           02 63 D1      0D8B             cmpl      (r3),#2
              0B 12      0D8E             bneq      sym.104
         1014 C2 DF      0D90             pushal    4116(r2)
   00000000* EF 01 FB    0D94             calls     #1,PRINTF
                         0D98   sym.104:
           04 AC DD      0D98             pushl     4(ap)
            F8 AD DF     0D9E             pushal    -8(fp)
```

```
            1040 C2 DF    0DA1              pushal    4160(r2)
    00000000* EF 03 FB    0DA5              calls     #3,SCANF
               F8 AD D5   0DAC              tstl      -8(fp)
                  0E 12   0DAF              bneq      sym.105
            1046 C2 DF    0DB1              pushal    4166(r2)
               04 AC DD   0DB5              pushl     4(ap)
    00000000* EF 02 FB    0DB8              calls     #2,STRCPY
                          0DBF    sym.105:
               02 63 D1   0DBF              cmpl      (r3),#2
                  0E 12   0DC2              bneq      sym.106
               04 AC DD   0DC4              pushl     4(ap)
            105F C2 DF    0DC7              pushal    4191(r2)
    00000000* EF 02 FB    0DCB              calls     #2,PRINTF
                          0DD2    sym.106:
                     04   0DD2              ret
                          0DD3    setup:
                   0FFC   0DD3              .entry    setup,^m<r2,r3,r
        5E FC84 CE 9E     0DD5              movab     -892(sp),sp
    56 00000000 EF 9E     0DDA              movab     $CHAR_STRING_CON
    59 00000000 EF 9E     0DE1              movab     TRAILERSIZER,r9
    58 00000000 EF 9E     0DE8              movab     HDRSIZER,r8
    5A 00000000 EF 9E     0DEF              movab     HEYPRINT,r10
    5B 00000000 EF 9E     0DF6              movab     $DATA,r11
    02 00000000 EF D1     0DFD              cmpl      HEYPRINT2,#2
                  0E 12   0E04              bneq      sym.107
               0C AC DD   0E06              pushl     12(ap)
            1072 C6 DF    0E09              pushal    4210(r6)
    00000000* EF 02 FB    0E0D              calls     #2,PRINTF
                          0E14    sym.107:
    02 00000000 EF D1     0E14              cmpl      HEYPRINT2,#2
                  0D 12   0E1B              bneq      sym.108
                  69 DD   0E1D              pushl     (r9)
            10A1 C6 DF    0E1F              pushal    4257(r6)
    00000000* EF 02 FB    0E23              calls     #2,PRINTF
                          0E2A    sym.108:
            52 10 AC D0   0E2A              movl      16(ap),r2
                  50 D4   0E2E              clrl      r0
                  68 D5   0E30              tstl      (r8)
                  0A 15   0E32              bleq      sym.110
                          0E34    sym.109:
                  6240 94 0E34              clrb      (r2)[r0]
                  50 D6   0E37              incl      r0
               68 50 D1   0E39              cmpl      r0,(r8)
                  F6 19   0E3C              blss      sym.109
                          0E3E    sym.110:
            53 08 AC D0   0E3E              movl      8(ap),r3
                  51 D4   0E42              clrl      r1
                  69 D5   0E44              tstl      (r9)
                  0A 15   0E46              bleq      sym.112
                          0E48    sym.111:
                  6341 94 0E48              clrb      (r3)[r1]
                  51 D6   0E4B              incl      r1
               69 51 D1   0E4D              cmpl      r1,(r9)
                  F6 19   0E50              blss      sym.111
                          0E52    sym.112:
    02 00000000 EF D1     0E52              cmpl      HEYPRINT2,#2
                  0B 12   0E59              bneq      sym.113
```

| | | | | |
|---|---|---|---|---|
| 10DC C6 DF | 0E5B | | pushal | 4316(r6) |
| 00000000* EF 01 F3 | 0E5F | | calls | #1,PRINTF |
| | 0E66 | sym.113: | | |
| 01 0C AC D1 | 0E66 | | cmpl | 12(ap),#1 |
| 03 13 | 0E6A | | beql | gen.16 |
| 0329 31 | 0E6C | | brw | sym.119 |
| | 0E6F | gen.16: | | |
| 55 04 AC DE | 0E6F | | moval | 4(ap),r5 |
| 52 65 D0 | 0E73 | | movl | (r5),r2 |
| 06 A2 1E B0 | 0E76 | | movw | #30,6(r2) |
| 110E C6 DF | 0E7A | | pushal | 4366(r6) |
| 08 A2 9F | 0E7E | | pushab | 8(r2) |
| 53 00000000* EF 9E | 0E81 | | movab | STRCPY,r3 |
| 63 02 FB | 0E85 | | calls | #2,(r3) |
| 112A C6 DF | 0E88 | | pushal | 4394(r6) |
| 0260 C2 9F | 0E8F | | pushab | 608(r2) |
| 63 02 FB | 0E93 | | calls | #2,(r3) |
| 0310 C2 05 B0 | 0E96 | | movw | #5,784(r2) |
| 0338 C2 01 B0 | 0E9B | | movw | #1,824(r2) |
| 112C C6 DF | 0EA0 | | pushal | 4396(r6) |
| 26 A2 9F | 0EA4 | | pushab | 38(r2) |
| 63 02 FB | 0EA7 | | calls | #2,(r3) |
| 1148 C6 DF | 0EAA | | pushal | 4424(r6) |
| 0268 C2 9F | 0EAE | | pushab | 616(r2) |
| 63 02 FB | 0EB2 | | calls | #2,(r3) |
| 0312 C2 05 B0 | 0EB5 | | movw | #5,786(r2) |
| 033A C2 02 B0 | 0EBA | | movw | #2,826(r2) |
| 114A C6 DF | 0EBF | | pushal | 4426(r6) |
| 44 A2 9F | 0EC3 | | pushab | 68(r2) |
| 63 02 FB | 0EC6 | | calls | #2,(r3) |
| 1166 C6 DF | 0EC9 | | pushal | 4454(r6) |
| 0270 C2 9F | 0ECD | | pushab | 624(r2) |
| 63 02 FB | 0ED1 | | calls | #2,(r3) |
| 0314 C2 05 B0 | 0ED4 | | movw | #5,788(r2) |
| 033C C2 03 B0 | 0ED9 | | movw | #3,828(r2) |
| 1168 C6 DF | 0EDE | | pushal | 4456(r6) |
| 62 A2 9F | 0EE2 | | pushab | 98(r2) |
| 63 02 FB | 0EE5 | | calls | #2,(r3) |
| 1184 C6 DF | 0EE8 | | pushal | 4484(r6) |
| 0278 C2 9F | 0EEC | | pushab | 632(r2) |
| 63 02 FB | 0EF0 | | calls | #2,(r3) |
| 0316 C2 05 B0 | 0EF3 | | movw | #5,790(r2) |
| 033E C2 04 B0 | 0EF8 | | movw | #4,830(r2) |
| 1186 C6 DF | 0EFD | | pushal | 4486(r6) |
| 0080 C2 9F | 0F01 | | pushab | 128(r2) |
| 63 02 FB | 0F05 | | calls | #2,(r3) |
| 11A2 C6 DF | 0F08 | | pushal | 4514(r6) |
| 0280 C2 9F | 0F0C | | pushab | 640(r2) |
| 63 02 FB | 0F10 | | calls | #2,(r3) |
| 0318 C2 05 B0 | 0F13 | | movw | #5,792(r2) |
| 0340 C2 05 B0 | 0F18 | | movw | #5,832(r2) |
| 11A4 C6 DF | 0F1D | | pushal | 4516(r6) |
| 009E C2 9F | 0F21 | | pushab | 158(r2) |
| 63 02 FB | 0F25 | | calls | #2,(r3) |
| 11C0 C6 DF | 0F28 | | pushal | 4544(r6) |
| 0288 C2 9F | 0F2C | | pushab | 648(r2) |
| 63 02 FB | 0F30 | | calls | #2,(r3) |

```
031A C2 05 80      0F33        movw    #5,794(r2)
0342 C2 06 80      0F38        movw    #6,834(r2)
11C2 C6 DF         0F3D        pushal  4546(r6)
00BC C2 9F         0F41        pushab  188(r2)
     63 02 FB      0F45        calls   #2,(r3)
11DE C6 DF         0F48        pushal  4574(r6)
0290 C2 9F         0F4C        pushab  656(r2)
     63 02 FB      0F50        calls   #2,(r3)
031C C2 05 80      0F53        movw    #5,796(r2)
0344 C2 07 80      0F58        movw    #7,836(r2)
11E0 C6 DF         0F5D        pushal  4576(r6)
00DA C2 9F         0F61        pushab  218(r2)
     63 02 FB      0F65        calls   #2,(r3)
11FC C6 DF         0F68        pushal  4604(r6)
0298 C2 9F         0F6C        pushab  664(r2)
     63 02 FB      0F70        calls   #2,(r3)
031E C2 63 8F 9B   0F73        movzbw  #99,798(r2)
0346 C2 63 8F 9B   0F79        movzbw  #99,838(r2)
11FE C6 DF         0F7F        pushal  4606(r6)
00F8 C2 9F         0F83        pushab  248(r2)
     63 02 FB      0F87        calls   #2,(r3)
121A C6 DF         0F8A        pushal  4634(r6)
02A0 C2 9F         0F8E        pushab  672(r2)
     63 02 FB      0F92        calls   #2,(r3)
0320 C2 06 80      0F95        movw    #6,800(r2)
0348 C2 01 80      0F9A        movw    #1,840(r2)
121C C6 DF         0F9F        pushal  4636(r6)
0116 C2 9F         0FA3        pushab  278(r2)
     63 02 FB      0FA7        calls   #2,(r3)
1238 C6 DF         0FAA        pushal  4664(r6)
02A8 C2 9F         0FAE        pushab  680(r2)
     63 02 FB      0FB2        calls   #2,(r3)
0322 C2 06 80      0FB5        movw    #6,802(r2)
034A C2 02 80      0FBA        movw    #2,842(r2)
123A C6 DF         0FBF        pushal  4666(r6)
0134 C2 9F         0FC3        pushab  308(r2)
     63 02 FB      0FC7        calls   #2,(r3)
1256 C6 DF         0FCA        pushal  4694(r6)
02B0 C2 9F         0FCE        pushab  688(r2)
     63 02 FB      0FD2        calls   #2,(r3)
0324 C2 06 80      0FD5        movw    #6,804(r2)
034C C2 03 80      0FDA        movw    #3,844(r2)
1258 C6 DF         0FDF        pushal  4696(r6)
0152 C2 9F         0FE3        pushab  338(r2)
     63 02 FB      0FE7        calls   #2,(r3)
1274 C6 DF         0FEA        pushal  4724(r6)
02B8 C2 9F         0FEE        pushab  696(r2)
     63 02 FB      0FF2        calls   #2,(r3)
0326 C2 06 80      0FF5        movw    #6,806(r2)
034E C2 04 80      0FFA        movw    #4,846(r2)
1276 C6 DF         0FFF        pushal  4726(r6)
0170 C2 9F         1003        pushab  368(r2)
     63 02 FB      1007        calls   #2,(r3)
1292 C6 DF         100A        pushal  4754(r6)
02C0 C2 9F         100E        pushab  704(r2)
     63 02 FB      1012        calls   #2,(r3)
0328 C2 06 80      1015        movw    #6,808(r2)
```

| | | | | |
|---|---|---|---|---|
| 0350 C2 05 80 | 101A | movw | #5,848(r2) |
| 1294 C6 DF | 101F | pushal | 4756(r6) |
| 018E C2 9F | 1023 | pushab | 398(r2) |
| 63 02 FB | 1027 | calls | #2,(r3) |
| 1280 C6 DF | 102A | pushal | 4784(r6) |
| 02C8 C2 9F | 102E | pushab | 712(r2) |
| 63 02 FB | 1032 | calls | #2,(r3) |
| 032A C2 06 80 | 1035 | movw | #6,810(r2) |
| 0352 C2 06 80 | 103A | movw | #6,850(r2) |
| 12B2 C6 DF | 103F | pushal | 4786(r6) |
| 01AC C2 9F | 1043 | pushab | 428(r2) |
| 63 02 FB | 1047 | calls | #2,(r3) |
| 12CE C6 DF | 104A | pushal | 4814(r6) |
| 02D0 C2 9F | 104E | pushab | 720(r2) |
| 63 02 FB | 1052 | calls | #2,(r3) |
| 032C C2 06 80 | 1055 | movw | #6,812(r2) |
| 0354 C2 07 80 | 105A | movw | #7,852(r2) |
| 12D0 C6 DF | 105F | pushal | 4816(r6) |
| 01CA C2 9F | 1063 | pushab | 458(r2) |
| 63 02 FB | 1067 | calls | #2,(r3) |
| 12EC C6 DF | 106A | pushal | 4844(r6) |
| 02D8 C2 9F | 106E | pushab | 728(r2) |
| 63 02 FB | 1072 | calls | #2,(r3) |
| 032E C2 04 80 | 1075 | movw | #4,814(r2) |
| 0356 C2 FF 8F 9B | 107A | movzbw | #255,854(r2) |
| 12F0 C6 DF | 1080 | pushal | 4848(r6) |
| 01E8 C2 9F | 1084 | pushab | 488(r2) |
| 63 02 FB | 1088 | calls | #2,(r3) |
| 130C C6 DF | 108B | pushal | 4876(r6) |
| 02E0 C2 9F | 108F | pushab | 736(r2) |
| 63 02 FB | 1093 | calls | #2,(r3) |
| 0330 C2 04 80 | 1096 | movw | #4,816(r2) |
| 0358 C2 01 80 | 109B | movw | #1,856(r2) |
| 1312 C6 DF | 10A0 | pushal | 4882(r6) |
| 0206 C2 9F | 10A4 | pushab | 518(r2) |
| 63 02 FB | 10A8 | calls | #2,(r3) |
| 132E C6 DF | 10AB | pushal | 4910(r6) |
| 02E8 C2 9F | 10AF | pushab | 744(r2) |
| 63 02 FB | 10B3 | calls | #2,(r3) |
| 0332 C2 04 80 | 10B6 | movw | #4,818(r2) |
| 035A C2 02 80 | 10BB | movw | #2,858(r2) |
| 1334 C6 DF | 10C0 | pushal | 4916(r6) |
| 0224 C2 9F | 10C4 | pushab | 548(r2) |
| 63 02 FB | 10C8 | calls | #2,(r3) |
| 1350 C6 DF | 10CB | pushal | 4944(r6) |
| 02F0 C2 9F | 10CF | pushab | 752(r2) |
| 63 02 FB | 10D3 | calls | #2,(r3) |
| 0334 C2 04 80 | 10D6 | movw | #4,820(r2) |
| 035C C2 03 80 | 10DB | movw | #3,860(r2) |
| 1356 C6 DF | 10E0 | pushal | 4950(r6) |
| 0242 C2 9F | 10E4 | pushab | 578(r2) |
| 63 02 FB | 10E8 | calls | #2,(r3) |
| 1372 C6 DF | 10EB | pushal | 4978(r6) |
| 02F8 C2 9F | 10EF | pushab | 760(r2) |
| 63 02 FB | 10F3 | calls | #2,(r3) |
| 0336 C2 04 80 | 10F6 | movw | #4,822(r2) |
| 035E C2 04 80 | 10FB | movw | #4,862(r2) |

```
                53 D4        1100            clrl      r3
             50 65 D0        1102            movl      (r5),r0
    51 00000360 E0 9E        1105            movab     864(r0),r1
                             110C   sym.114:
             81 54 8F 90     110C            movb      #84,(r1)+
             F8 53 0E F3     1110            aobleq    #14,r3,sym.114
             52 04 AC DE     1114            moval     4(ap),r2
                50 62 D0     1118            movl      (r2),r0
       036F C0 53 8F 90      111B            movb      #83,879(r0)
                54 10 D0     1121            movl      #16,r4
                50 62 D0     1124            movl      (r2),r0
          51 0370 C0 9E      1127            movab     880(r0),r1
                             112C   sym.115:
             81 56 8F 90     112C            movb      #86,(r1)+
             F8 54 13 F3     1130            aobleq    #19,r4,sym.115
                02 6A D1     1134            cmpl      (r10),#2
                   0B 12     1137            bneq      sym.116
              1378 C6 DF     1139            pushal    4984(r6)
       00000000* EF 01 FB    113D            calls     #1,PRINTF
                             1144   sym.116:
                   55 D4     1144            clrl      r5
                57 04 AC DE  1146            moval     4(ap),r7
                52 00 A7 D0  114A            movl      0(r7),r2
              53 0310 C2 3E  114E            movaw     784(r2),r3
              54 0360 C2 9E  1153            movab     864(r2),r4
                             1158   sym.117:
                02 6A D1     1158            cmpl      (r10),#2
                   22 12     115B            bneq      sym.118
             51 55 1E C5     115D            mull3     #30,r5,r1
                50 67 D0     1161            movl      (r7),r0
              08 A041 9F     1164            pushab    8(r0)[r1]
                7E 64 98     1168            cvtbl     (r4),-(sp)
             7E 28 A3 32     116B            cvtwl     40(r3),-(sp)
                7E 63 32     116F            cvtwl     (r3),-(sp)
                   55 DD     1172            pushl     r5
              1384 C6 DF     1174            pushal    5044(r6)
       00000000* EF 06 FB    1178            calls     #6,PRINTF
                             117F   sym.118:
                53 02 C0     117F            addl2     #2,r3
                   54 D6     1182            incl      r4
             D0 55 13 F3     1184            aobleq    #19,r5,sym.117
             52 04 AC D0     1188            movl      4(ap),r2
          0300 C2 01 D0      118C            movl      #1,768(r2)
             0304 C2 D4      1191            clrl      772(r2)
                0180 31      1195            brw       donentry
                             1198   sym.119:
                54 01 D0     1198            movl      #1,r4
                             119B   more:
       00000000 EF DD        119B            pushl     FPTR
                   01 DD     11A1            pushl     #1
                   63 DD     11A3            pushl     (r3)
                04 AC DD     11A5            pushl     4(ap)
       00000000* EF 04 FB    11A8            calls     #4,FREAD
                52 50 D0     11AF            movl      r0,r2
    02 00000000 EF D1        11B2            cmpl      HEYPRINT2,#2
                   CD 12     11B9            bneq      sym.120
                   52 DD     11BB            pushl     r2
```

```
          13F2 C6 DF      11BD            pushal    5106(r6)
00000000* EF 02 FB        11C1            calls     #2,PRINTF
                          11C8   sym.120:
                52 D5     11C8            tstl      r2
                68 12     11CA            bneq      sym.125
             01 54 D1     11CC            cmpl      r4,#1
                12 12     11CF            bneq      sym.121
          1422 C6 DF      11D1            pushal    5154(r6)
00000000* EF 01 FB        11D5            calls     #1,PRINTF
00000000* EF 00 FB        11DC            calls     #0,EXIT
                          11E3   sym.121:
       53 FC86 CD 9E      11E3            movab     -890(fp),r3
                50 D4     11E8            clrl      r0
                68 D5     11EA            tstl      (r3)
                12 15     11EC            bleq      sym.123
       52 0010 CC D0      11EE            movl      16(ap),r2
                   01     11F3            nop
                          11F4   sym.122:
        6240 6340 90      11F4            movb      (r3)[r0],(r2)[r0
                50 D6     11F9            incl      r0
             68 50 D1     11FB            cmpl      r0,(r8)
                F4 19     11FE            blss      sym.122
                          1200   sym.123:
02 00000000 EF D1         1200            cmpl      HEYPRINT2,#2
                0B 12     1207            bneq      sym.124
          1456 C6 DF      1209            pushal    5206(r6)
00000000* EF 01 FB        120D            calls     #1,PRINTF
                          1214   sym.124:
                7E 7C     1214            clrq      -(sp)
                00 DD     1216            pushl     #0
             08 AC DD     1218            pushl     8(ap)
          52 04 AC D0     121B            movl      4(ap),r2
                52 DD     121F            pushl     r2
00000000* EF 05 FB        1221            calls     #5,SHOWLOGREC
           0300 C2 D6     1228            incl      768(r2)
           0304 C2 D4     122C            clrl      772(r2)
              0105 31     1230            brw       sym.133
                   01     1233            nop
                          1234   sym.125:
       00000000 EF DD     1234            pushl     FPTR
                01 DD     123A            pushl     #1
          50 04 AC D0     123C            movl      4(ap),r0
          7E 04 A0 32     1240            cvtwl     4(r0),-(sp)
             08 AC DD     1244            pushl     8(ap)
00000000* EF 04 FB        1247            calls     #4,FREAD
             52 50 D0     124E            movl      r0,r2
02 00000000 EF D1         1251            cmpl      HEYPRINT2,#2
                0D 12     1258            bneq      sym.126
                52 DD     125A            pushl     r2
          148D C6 DF      125C            pushal    5261(r6)
00000000* EF 02 FB        1260            calls     #2,PRINTF
                          1267   sym.126:
                52 D5     1267            tstl      r2
                12 12     1269            bneq      sym.127
          148F C6 DF      126B            pushal    5311(r6)
00000000* EF 01 FB        126F            calls     #1,PRINTF
00000000* EF 00 FB        1276            calls     #0,EXIT
```

```
                    127D   sym.127:
   53 FC86 CD 9E    127D            movab    -890(fp),r3
         50 D4      1282            clrl     r0
         68 D5      1284            tstl     (r8)
         10 15      1286            bleq     sym.129
   52 10 AC D0      1288            movl     16(ap),r2
                    128C   sym.128:
   6340 6240 90     128C            movb     (r2)[r0],(r3)[r0]
         50 D6      1291            incl     r0
         68 50 D1   1293            cmpl     r0,(r3)
         F4 19      1296            blss     sym.128
                    1298   sym.129:
         7E 7C      1298            clrq     -(sp)
         00 DD      129A            pushl    #0
         08 AC DD   129C            pushl    8(ap)
   52 04 AC D0      129F            movl     4(ap),r2
         52 DD      12A3            pushl    r2
   00000000* EF 05 FB  12A5         calls    #5,SHOWLOGREC
         02 6A D1   12AC            cmpl     (r10),#2
         19 12      12AF            bneq     sym.130
         0304 C2 DD 12B1            pushl    772(r2)
         0300 C2 DD 12B5            pushl    768(r2)
         7E 04 A2 32 12B9           cvtwl    4(r2),-(sp)
         54 DD      12BD            pushl    r4
         14EA C6 DF 12BF            pushal   5354(r6)
   00000000* EF 05 FB  12C3         calls    #5,PRINTF
                    12CA   sym.130:
         00 DD      12CA            pushl    #0
   50 04 AC D0      12CC            movl     4(ap),r0
         0308 C0 9F 12D0            pushab   776(r0)
         76 AB 9F   12D4            pushab   118(r11)
         FA AD 3F   12D7            pushaw   -6(fp)
   00000000* EF 04 FB  12DA         calls    #4,SYS$ASCTIM
   02 00000000 EF D1 12E1           cmpl     HEYPRINT2,#2
         0B 12      12E8            bneq     sym.131
         1526 C6 DF 12EA            pushal   5414(r6)
   00000000* EF 01 FB  12EE         calls    #1,PRINTF
                    12F5   sym.131:
   02 00000000 EF D1 12F5           cmpl     HEYPRINT4,#2
         0E 12      12FC            bneq     sym.132
         5C AB 9F   12FE            pushab   92(r11)
         1561 C6 DF 1301            pushal   5473(r6)
   00000000* EF 02 FB  1305         calls    #2,PRINTF
                    130C   sym.132:
         54 D6      130C            incl     r4
   50 04 AC D0      130E            movl     4(ap),r0
   02 04 A0 B1      1312            cmpw     4(r0),#2
         03 13      1316            beql     gen.17
         FE80 31    1318            brw      more
                    131B   gen.17:
   02 00000000 EF D1 131B           cmpl     HEYPRINT4,#2
         03 13      1322            beql     gen.18
         FE74 31    1324            brw      more
                    1327   gen.18:
         1574 C6 DF 1327            pushal   5492(r6)
   00000000* EF 01 FB  132B         calls    #1,PRINTF
         FE66 31    1332            brw      more
```

```
                50 D5       1335            tstl      r0
                   01       1337            nop
                            1338   sym.133:
             02 6A D1       1338            cmpl      (r10),#2
                03 12       133B            bneq      sym.134
           159E C6 DF       133D            pushal    5534(r6)
  00000000* EF 01 FB        1341            calls     #1,PRINTF
                            1348   sym.134:
                            1348   donentry:
           52 04 AC D0      1348            movl      4(ap),r2
          0308 C2 7C        134C            clrq      776(r2)
              50 02 D0      1350            movl      #2,r0
              69 02 D1      1353            cmpl      #2,(r9)
                 0E 18      1356            bgeq      sym.136
           52 08 AC D0      1358            movl      8(ap),r2
                            135C   sym.135:
                6240 94     135C            clrb      (r2)[r0]
                   50 D6    135F            incl      r0
                69 50 D1    1361            cmpl      r0,(r9)
                   F6 19    1364            blss      sym.135
                            1366   sym.136:
           52 08 AC D0      1366            movl      8(ap),r2
           62 42 8F 90      136A            movb      #66,(r2)
        01 A2 41 8F 90      136E            movb      #65,1(r2)
           52 10 AC D0      1373            movl      16(ap),r2
           62 41 8F 90      1377            movb      #65,(r2)
        01 A2 42 8F 90      137B            movb      #66,1(r2)
                 54 D4      1380            clrl      r4
              55 04 AC DE   1382            moval     4(ap),r5
                 53 65 D0   1386            movl      (r5),r3
     52 00000310 E3 3E      1389            movaw     784(r3),r2
                            1390   sym.137:
              02 6A D1      1390            cmpl      (r10),#2
                 23 12      1393            bneq      sym.138
           50 54 03 78      1395            ashl      #3,r4,r0
              51 65 D0      1399            movl      (r5),r1
          0260 C140 9F      139C            pushab    608(r1)[r0]
           50 54 1E C5      13A1            mull3     #30,r4,r0
             08 A140 9F     13A5            pushab    8(r1)[r0]
           7E 23 A2 32      13A9            cvtwl     40(r2),-(sp)
              7E 62 32      13AD            cvtwl     (r2),-(sp)
                 54 DD      13B0            pushl     r4
           15AD C6 DF       13B2            pushal    5549(r6)
  00000000* EF 06 FB        13B6            calls     #6,PRINTF
                            13BD   sym.138:
              52 02 C0      13BD            addl2     #2,r2
           CC 54 13 F3      13C0            aobleq    #19,r4,sym.137
                    04      13C4            ret
                            13C5   fillup:
                   01FC     13C5            .entry    fillup,^m<r2,r3,
                 5E 04 C2   13C7            subl2     #4,sp
        57 00000000 EF 9E   13CA            movab     $CHAR_STRING_CON
        58 00000000 EF 9E   13D1            movab     HEYPRINT2,r8
              50 10 AC D0   13D8            movl      16(ap),r0
     54 50 00000058 8F C5   13DC            mull3     #88,r0,r4
              53 08 AC D0   13E4            movl      8(ap),r3
              55 0C AC D0   13E8            movl      12(ap),r5
```

```
    52 02 A344 9E    13EC           movab     2(r3)[r4],r2
          62 65 DO    13F1           movl      (r5),(r2)
    52 06 A344 9E    13F4           movab     6(r3)[r4],r2
          62 04 A5 DO  13F9           movl      4(r5),(r2)
          56 04 AC DE  13FD           moval     4(ap),r6
             52 66 DO  1401           movl      (r6),r2
       0304 C2 50 DO  1404           movl      r0,772(r2)
                50 D5  1409           tstl      r0
                03 12  140B           bneq      sym.139
       0308 C2 65 DO  140D           movl      (r5),776(r2)
    030C C2 04 A5 DO  1412           movl      4(r5),780(r2)
                       1418  sym.139:
                55 D4  1418           clrl      r5
             53 66 DO  141A           movl      (r6),r3
    54 00000310 E3 3E  141D           movaw     734(r3),r4
                       1424  sym.140:
          0063 8F 84 B1  1424           cmpw      (r4)+,#99
                2D 13  1429           beql      sym.141
                55 DD  142B           pushl     r5
             10 AC DD  142D           pushl     16(ap)
             08 AC DD  1430           pushl     8(ap)
             52 66 DO  1433           movl      (r6),r2
                52 DD  1436           pushl     r2
    00000000* EF 04 FB  1438           calls     #4,READGUAGE
             02 68 D1  143F           cmpl      (r8),#2
                14 12  1442           bneq      sym.141
          0300 C2 DD  1444           pushl     768(r2)
             10 AC DD  1448           pushl     16(ap)
                55 DD  144B           pushl     r5
          15EC C7 DF  144D           pushal    5612(r7)
    00000000* EF 04 FB  1451           calls     #4,PRINTF
                       1458  sym.141:
          C8 55 13 F3  1458           aobleq    #19,r5,sym.140
             02 68 D1  145C           cmpl      (r8),#2
                0E 12  145F           bneq      sym.142
             10 AC DD  1461           pushl     16(ap)
          1632 C7 DF  1464           pushal    5682(r7)
    00000000* EF 02 FB  1468           calls     #2,PRINTF
                       146F  sym.142:
                   04  146F           ret
                       1470  showlogrec:
                 0FFC  1470           .entry    showlogrec,^m<r2
             5E 34 C2  1472           subl2     #52,sp
    55 00000000 EF 9E  1475           movab     $CHAR_STRING_CON
    02 00000000 EF D1  147C           cmpl      HEYPRINT2,#2
                13 12  1483           bneq      sym.143
          52 04 AC DO  1485           movl      4(ap),r2
          0304 C2 DD  1489           pushl     772(r2)
          1663 C5 DF  148D           pushal    5731(r5)
    00000000* EF 02 FB  1491           calls     #2,PRINTF
                       1498  sym.143:
                00 DD  1498           pushl     #0
          52 04 AC DO  149A           movl      4(ap),r2
          0308 C2 9F  149E           pushab    776(r2)
    00000076 EF 9F    14A2           pushab    $DATA+118
             F6 AD 3F  14A8           pushaw    -10(fp)
    00000000* EF 04 FB  14AB           calls     #4,SYSSASCTIM
```

```
52 50 FFFFFFFE 8F C9   14B2           bicl3    #-2,r0,r2
         01 52 D1      143A           cmpl     r2,#1
            09 13      14BD           beql     sym.144
            50 DD      143F           pushl    r0
  00000000* EF 01 FB   14C1           calls    #1,LIB$STOP
                       14C8   sym.144:
      00000073 EF 94   14C8           clrb     $DATA+115
   02 00000000 EF D1   14CE           cmpl     HEYPRINT2,#2
            11 12      14D5           bneq     sym.145
      0000005C EF DF   14D7           pushal   $DATA+92
         1697 C5 DF    14DD           pushal   5783(r5)
  00000000* EF 02 FB   14E1           calls    #2,PRINTF
                       14E8   sym.145:
            14 AC D5   14E8           tstl     20(ap)
            61 12      14EB           bneq     sym.150
            58 D4      14ED           clrl     r8
         54 04 AC D0   14EF           movl     4(ap),r4
            6E D4      14F3           clrl     (sp)
   57 00000000* EF 9E  14F5           movab    PRINTF,r7
         53 0310 C4 3E 14FC           movaw    784(r4),r3
   56 00000360 E4 9E   1501           movab    864(r4),r6
                       1508   sym.146:
         0063 8F 83 91 1508           cmpw     (r3)+,#99
            38 13      150D           beql     sym.149
            FE A3 B5   150F           tstw     -2(r3)
            06 19      1512           blss     sym.147
         1E FE A3 B1   1514           cmpw     -2(r3),#30
            10 15      1518           bleq     sym.148
                       151A   sym.147:
   02 00000000 EF D1   151A           cmpl     HEYPRINT2,#2
            07 12      1521           bneq     sym.148
         16CD C5 DF    1523           pushal   5837(r5)
            67 01 FB   1527           calls    #1,(r7)
                       152A   sym.148:
   02 00000000 EF D1   152A           cmpl     HEYPRINT2,#2
            14 12      1531           bneq     sym.149
            7E 66 98   1533           cvtbl    (r6),-(sp)
         7E 26 A3 32   1536           cvtwl    38(r3),-(sp)
         7E FE A3 32   153A           cvtwl    -2(r3),-(sp)
            58 DD      153E           pushl    r8
         16ED C5 DF    1540           pushal   5869(r5)
            67 05 FB   1544           calls    #5,(r7)
                       1547   sym.149:
            56 D6      1547           incl     r6
         BB 58 13 F3   1549           aobleq   #19,r8,sym.146
               04      154D           ret
                       154E   sym.150:
         01 10 AC D1   154E           cmpl     16(ap),#1
            03 13      1552           beql     gen.19
            0095 31    1554           brw      sym.154
                       1557   gen.19:
         52 04 AC D0   1557           movl     4(ap),r2
         02 04 A2 B1   155B           cmpw     4(r2),#2
            13 12      155F           bneq     sym.151
   02 00000000 EF D1   1561           cmpl     HEYPRINT4,#2
            03 13      1568           beql     gen.20
            0397 31    156A           brw      sym.174
```

```
                                    156D    gen.20:
               171E C5 DF           156D            pushal      5918(r5)
      00000000* EF 01 FB            1571            calls       #1,PRINTF
                  0389 31           1578            brw         sym.174
                        01          157B            nop
                                    157C    sym.151:
      02 00000000 EF D1             157C            cmpl        HEYPRINT2,#2
                     0B 12          1583            bneq        sym.152
                 1748 C5 DF         1585            pushal      5960(r5)
      00000000* EF 01 FB            1589            calls       #1,PRINTF
                                    1590    sym.152:
                        00 DD       1590            pushl       #0
                     52 04 AC D0    1592            movl        4(ap),r2
   53 0304 C2 00000058 8F C5        1596            mull3       #88,772(r2),r3
                     52 08 AC D0    15A0            movl        8(ap),r2
                     02 A243 9F     15A4            pushab      2(r2)[r3]
                 000000E8 EF 9F     15A8            pushab      $DATA+232
                        F6 AD 3F    15AE            pushaw      -10(fp)
      00000000* EF 04 FB            15B1            calls       #4,SYS$ASCTIM
      52 50 FFFFFFFE 8F CB          15B8            bicl3       #-2,r0,r2
                        01 52 D1    15C0            cmpl        r2,#1
                           09 13    15C3            beql        sym.153
                           50 DD    15C5            pushl       r0
      00000000* EF 01 FB            15C7            calls       #1,LIB$STOP
                                    15CE    sym.153:
                 000000E7 EF 94     15CE            clrb        $DATA+231
                     52 04 AC D0    15D4            movl        4(ap),r2
                     0304 C2 DD     15D8            pushl       772(r2)
                        08 AC DD    15DC            pushl       8(ap)
      00000000* EF 02 FB            15DF            calls       #2,UPDATE
                     031B 31        15E6            brw         sym.174
                        50 D5       15E9            tstl        r0
                           01       15EB            nop
                                    15EC    sym.154:
      02 00000000 EF D1             15EC            cmpl        HEYPRINT2,#2
                     0B 12          15F3            bneq        sym.155
                 1775 C5 DF         15F5            pushal      6005(r5)
      00000000* EF 01 FB            15F9            calls       #1,PRINTF
                                    1600    sym.155:
                     52 04 AC D0    1600            movl        4(ap),r2
                     02 04 A2 B1    1604            cmpw        4(r2),#2
                           1A 12    1608            bneq        sym.156
      02 00000000 EF D1             160A            cmpl        HEYPRINT4,#2
                           03 13    1611            beql        gen.21
                        02EE 31     1613            brw         sym.174
                                    1616    gen.21:
                 1733 C5 DF         1616            pushal      6067(r5)
      00000000* EF 01 FB            161A            calls       #1,PRINTF
                        02E0 31     1621            brw         sym.174
                                    1624    sym.156:
      02 00000000 EF D1             1624            cmpl        HEYPRINT2,#2
                        0F 12       1628            bneq        sym.157
                     0304 C2 DD     162D            pushl       772(r2)
                 17DD C5 DF         1631            pushal      6109(r5)
      00000000* EF 02 FB            1635            calls       #2,PRINTF
                                    163C    sym.157:
                        14 AE D4    163C            clrl        20(sp)
```

```
         5B 04 AC DE         163F              moval    4(ap),r11
            52 6B D0         1643              movl     (r11),r2
      52 0304 C2 01 C1       1646              addl3    #1,772(r2),r2
         52 14 AE D1         164C              cmpl     20(sp),r2
               03 19         1650              blss     gen.22
             02AF 31         1652              brw      sym.174
                             1655  gen.22:
      08 AE 08 AC DE         1655              moval    8(ap),8(sp)
      04 AE 08 BE D0         165A              movl     a8(sp),4(sp)
      5A 00000000* EF 9E     165F              movab    PRINTF,r10
   000C CE 00000000* EF 9E   1666              movab    TO_SHOW_TORR,12(
   0010 CE 00000000* EF 9E   166F              movab    FLATSTAT,16(sp)
                             1678  sym.158:
               00 DD         1678              pushl    #0
   50 18 AE 00000058 8F C5   167A              mull3    #88,24(sp),r0
         52 08 AE D0         1683              movl     8(sp),r2
         02 A240 9F          1687              pushab   2(r2)[r0]
         000000E8 EF 9F      168B              pushab   $DATA+232
            F6 AD 3F         1691              pushaw   -10(fp)
      00000000* EF 04 FB     1694              calls    #4,SYS$ASCTIM
      52 50 FFFFFFFE 8F CB   169B              bicl3    #-2,r0,r2
               01 52 D1      16A3              cmpl     r2,#1
               09 13         16A6              beql     sym.159
                50 DD        16A8              pushl    r0
      00000000* EF 01 FB     16AA              calls    #1,LIB$STOP
                             16B1  sym.159:
         000000E7 EF 94      16B1              clrb     $DATA+231
   50 14 AE 00000058 8F C5   16B7              mull3    #88,20(sp),r0
         52 04 AE D0         16C0              movl     4(sp),r2
         02 A240 9F          16C4              pushab   2(r2)[r0]
         00000000 EF 9F      16C8              pushab   OBSVDATE7
      00000000* EF 02 FB     16CE              calls    #2,SYS$NUMTIM
               0C AC D5      16D5              tstl     12(ap)
               03 12         16D8              bneq     gen.23
              008B 31         16DA              brw      nowprint
                             16DD  gen.23:
               54 01 90      16DD              movb     #1,r4
   00000006 EF 00000006 EF B1 16E0             cmpw     OBSVDATE7+6,LOWD
               2D 19         16E8              blss     sym.160
               52 B4         16ED              clrw     r2
   00000006 EF 00000006 EF B1 16EF             cmpw     OBSVDATE7+6,LOWD
               02 12         16FA              bneq     vcg.7
               52 B6         16FC              incw     r2
                             16FE  vcg.7:
               53 B4         16FE              clrw     r3
   00000008 EF 00000008 EF B1 1700             cmpw     OBSVDATE7+8,LOWD
               02 18         1709              bgeq     vcg.8
               53 B6         170B              incw     r3
                             170F  vcg.8:
               52 52 B2      170F              mcomw    r2,r2
            52 53 52 A8      1712              bicw3    r2,r3,r2
               02 12         1716              bneq     sym.160
               54 94         1718              clrb     r4
                             171A  sym.160:
               52 54 98      171A              cvtbl    r4,r2
               52 52 D2      171D              mcoml    r2,r2
      52 00000000 EF 52 C9   1720              bicl3    r2,SRCH_LOW,r2
```

```
                          03 13    1728            beql     gen.24
                         01B2 31   172A            brw      pastxxloop
                                   172D   gen.24:
                          53 01 90 172D            movb     #1,r3
00000006 EF 00000006 EF   B1       1730            cmpw     OBSVDATE7+6,HIGH
                          11 14    1738            bgtr     sym.162
                          0D 12    173D            bneq     sym.161
00000008 EF 00000008 EF   B1       173F            cmpw     OBSVDATE7+8,HIGH
                          02 14    1746            bgtr     sym.162
                                   174C   sym.161:
                          53 94    174C            clrb     r3
                                   174E   sym.162:
                       52 53 98    174E            cvtbl    r3,r2
                       52 52 D2    1751            mcoml    r2,r2
          52 00000000 EF 52 CB     1754            bicl3    r2,SRCH_HIGH,r2
                          0A 13    175C            beql     sym.163
             00000000 EF 01 D0     175E            movl     #1,FILE_PRINT_DO
                         019C 31   1765            brw      past_zz_loop
                                   1768   sym.163:
                                   1768   nowprint:
             000000D0 EF DF        1768            pushal   SDATA+208
                          18 AE DD 176E            pushl    24(sp)
                          50 68 D0 1771            movl     (r11),r0
                         0300 C0 DD 1774           pushl    768(r0)
                         17FE C5 DF 1778           pushal   6142(r5)
                          6A 04 FB 177C            calls    #4,(r10)
                         1833 C5 DF 177F           pushal   6195(r5)
                          6A 01 FB 1783            calls    #1,(r10)
                          53 D4    1786            clrl     r3
                       54 00 AB D0 1788            movl     0(r11),r4
                    58 0360 C4 9E  178C            movab    864(r4),r8
                 57 00000338 E4 3E 1791            movaw    824(r4),r7
                                   1798   sym.164:
          02 00000000 EF D1        1798            cmpl     HEYPRINT,#2
                          1E 12    179F            bneq     sym.165
                          50 68 D0 17A1            movl     (r11),r0
                    7E 0360 C043 98 17A4           cvtbl    864(r0)[r3],-(sp)
                    7E 0338 C043 32 17AA           cvtwl    824(r0)[r3],-(sp)
                    7E 0310 C043 32 17B0           cvtwl    784(r0)[r3],-(sp)
                          53 DD    17B6            pushl    r3
                         186F C5 DF 17B8           pushal   6255(r5)
                          6A 05 FB 17BC            calls    #5,(r10)
                                   17BF   sym.165:
                    52 0310 C443 B0 17BF           movw     784(r4)[r3],r2
                          50 84    17C5            clrw     r0
                         0063 8F 52 B1 17C7        cmpw     r2,#99
                          02 13    17CC            beql     vcg.9
                          50 B6    17CE            incw     r0
                                   17D0   vcg.9:
                          51 84    17D0            clrw     r1
                          52 B5    17D2            tstw     r2
                          02 19    17D4            blss     vcg.10
                          51 B6    17D6            incw     r1
                                   17D8   vcg.10:
                       50 50 B2    17D8            mcomw    r0,r0
                      50 51 50 A3  17DB            bicw3    r0,r1,r0
                          51 84    17DF            clrw     r1
```

```
            1E 52 81   17E1            cmpw      r2,#30
               02 14   17E4            bgtr      vcg.11
                51 86  17E6            incw      r1
                       17E8   vcg.11:
            50 50 82   17E8            mcomw     r0,r0
         50 51 50 A8   17EB            bicw3     r0,r1,r0
               03 12   17EF            bneq      gen.25
             00E0 31   17F1            brw       sym.172
                       17F4   gen.25:
         52 D3 A7 32   17F4            cvtwl     -40(r7),r2
   52 00000064 8F C4   17F8            mull2     #100,r2
            50 67 32   17FF            cvtwl     (r7),r0
            52 50 C0   1802            addl2     r0,r2
50 14 AE 00000058 8F C5  1805          mull3     #88,20(sp),r0
         51 53 02 78   180E            ashl      #2,r3,r1
            51 50 C0   1812            addl2     r0,r1
         50 08 8E D0   1815            movl      a8(sp),r0
         51 0A A041 9E 1819            movab     10(r0)[r1],r1
            59 61 4A   181E            cvtfl     (r1),r9
            56 61 50   1821            movf      (r1),r6
         56 8F 68 91   1824            cmpb      (r8),#86
               06 13   1828            beql      sym.166
         76 8F 68 91   182A            cmpb      (r8),#118
               3C 12   182E            bneq      sym.168
                       1830   sym.166:
   02 00000000 EF D1   1830            cmpl      HEYPRINT,#2
               09 12   1837            bneq      sym.167
                53 DD  1839            pushl     r3
           18A0 C5 DF  183B            pushal    6304(r5)
            6A 02 FB   183F            calls     #2,(r10)
                       1842   sym.167:
               F0 AD 9F 1842           pushab    -16(fp)
               F8 AD DF 1845           pushal    -8(fp)
               7E 56 56 1848           cvtfd     r6,-(sp)
            1C 3E 04 FB 184B           calls     #4,a28(sp)
                 52 DD 184F            pushl     r2
               F0 AD DF 1851           pushal    -16(fp)
               F8 AD DD 1854           pushl     -8(fp)
            51 53 1E C5 1857           mull3     #30,r3,r1
                 50 6B D0 185B         movl      (r11),r0
               08 A041 9F 185E         pushab    8(r0)[r1]
               18B9 C5 DF 1862         pushal    6329(r5)
                 6A 05 FB 1866         calls     #5,(r10)
                    69 11 1869         brb       sym.172
                       01 186B         nop
                       186C   sym.168:
               53 8F 68 91 186C        cmpb      (r8),#83
                    06 13 1870         beql      sym.169
               73 8F 68 91 1872        cmpb      (r8),#115
                    38 12 1876         bneq      sym.171
                       1878   sym.169:
   02 00000000 EF D1   1878            cmpl      HEYPRINT,#2
               09 12   187F            bneq      sym.170
                53 DD  1881            pushl     r3
           18D4 C5 DF  1883            pushal    6356(r5)
            6A 02 FB   1887            calls     #2,(r10)
                       188A   sym.170:
```

```
         E6 AD 9F   188A            pushab   -26(fp)
            59 DD   188D            pushl    r9
      18 BE 02 FB   188F            calls    #2,a24(sp)
            52 DD   1893            pushl    r2
         1908 C5 DF 1895            pushal   6408(r5)
         E6 AD 9F   1899            pushab   -26(fp)
      51 53 1E C5   189C            mull3    #30,r3,r1
         50 6B D0   18A0            movl     (r11),r0
         08 A041 9F 18A3            pushab   8(r0)[r1]
         18ED C5 DF 18A7            pushal   6381(r5)
         6A 05 FB   18AB            calls    #5,(r10)
            24 11   18AE            brb      sym.172
                    18B0   sym.171:
         07 53 D1   18B0            cmpl     r3,#7
            1F 13   18B3            beql     sym.172
            52 DD   18B5            pushl    r2
      50 53 03 78   18B7            ashl     #3,r3,r0
         51 6B D0   18BB            movl     (r11),r1
         0260 C140 9F 18BE          pushab   608(r1)[r0]
            59 DD   18C3            pushl    r9
      50 53 1E C5   18C5            mull3    #30,r3,r0
         08 A140 9F 18C9            pushab   8(r1)[r0]
         1903 C5 DF 18CD            pushal   6411(r5)
         6A 05 FB   18D1            calls    #5,(r10)
                    18D4   sym.172:
            58 D6   18D4            incl     r8
         57 02 C0   18D6            addl2    #2,r7
FEB9 53 01 13 F1   18D9            acbl     #19,#1,r3,sym.16
                    18DF   pastxxloop:
02 00000000 EF D1   18DF            cmpl     HEYPRINT2,#2
            07 12   18E6            bneq     sym.173
         1926 C5 DF 18E8            pushal   6438(r5)
         6A 01 FB   18EC            calls    #1,(r10)
                    18EF   sym.173:
         14 AE D6   18EF            incl     20(sp)
         50 6B D0   18F2            movl     (r11),r0
52 0304 C0 01 C1   18F5            addl3    #1,772(r0),r2
      52 14 AE D1   18FB            cmpl     20(sp),r2
            03 18   18FF            bgeq     gen.26
         FD74 31    1901            brw      sym.158
                    1904   gen.26:
                    1904   sym.174:
                    1904   past_zz_loop:
02 00000000 EF D1   1904            cmpl     HEYPRINT2,#2
            0B 12   190B            bneq     sym.175
         194F C5 DF 190D            pushal   6479(r5)
00000000* EF 01 FB 1911            calls    #1,PRINTF
                    1918   sym.175:
               04   1918            ret
                    1919   dailywrite:
            007C    1919            .entry   dailywrite,^m<r2
         5E 04 C2   191B            subl2    #4,sp
53 00000000 EF 9E   191E            movab    $CHAR_STRING_CON
56 00000000 EF 9E   1925            movab    HEYPRINT2,r6
55 00000000 EF 9E   192C            movab    FPTR,r5
         197A C3 DF 1933            pushal   6522(r3)
00000000 EF DD     1937            pushl    FILE_SPEC
```

```
00000000* EF 02 FB    193D          calls    #2,FOPEN
         65 50 D0     1944          movl     r0,(r5)
            23 12     1947          bneq     sym.176
         197D C3 DF   1949          pushal   6525(r3)
52 00000000* EF 9E    194D          movab    PRINTF,r2
         62 01 FB     1954          calls    #1,(r2)
         19AD C3 DF   1957          pushal   6573(r3)
         62 01 FB     195B          calls    #1,(r2)
         19D8 C3 DF   195E          pushal   6616(r3)
         62 01 FB     1962          calls    #1,(r2)
00000000* EF 00 FB    1965          calls    #0,EXIT
                      196C  sym.176:
         02 66 D1     196C          cmpl     (r6),#2
            0D 12     196F          bneq     sym.177
            65 DD     1971          pushl    (r5)
         1A0A C3 DF   1973          pushal   6666(r3)
00000000* EF 02 FB    1977          calls    #2,PRINTF
                      197E  sym.177:
         54 08 AC D0  197E          movl     8(ap),r4
            52 D4     1982          clrl     r2
         01 64 D1     1984          cmpl     (r4),#1
            02 12     1987          bneq     vcg.12
            52 D6     1989          incl     r2
                      198B  vcg.12:
            51 D4     198B          clrl     r1
         01 0C 8C D1  198D          cmpl     a12(ap),#1
            02 12     1991          bneq     vcg.13
            51 D6     1993          incl     r1
                      1995  vcg.13:
         52 52 D2     1995          mcoml    r2,r2
         52 51 52 C8  1998          bicl3    r2,r1,r2
            02 13     199C          beql     sym.178
            64 D4     199E          clrl     (r4)
                      19A0  sym.178:
                      19A0  putrecord:
         02 66 D1     19A0          cmpl     (r6),#2
            0B 12     19A3          bneq     sym.179
         1A33 C3 DF   19A5          pushal   6707(r3)
00000000* EF 01 FB    19A9          calls    #1,PRINTF
                      19B0  sym.179:
         02 66 D1     19B0          cmpl     (r6),#2
            13 12     19B3          bneq     sym.180
         50 04 AC D0  19B5          movl     4(ap),r0
         7E 04 A0 32  19B9          cvtwl    4(r0),-(sp)
         1A6A C3 DF   19BD          pushal   6762(r3)
00000000* EF 02 FB    19C1          calls    #2,PRINTF
                      19C8  sym.180:
            65 DD     19C8          pushl    (r5)
            01 DD     19CA          pushl    #1
         00000000 EF DD 19CC        pushl    HDRSIZER
            04 AC DD  19D2          pushl    4(ap)
00000000* EF 04 FB    19D5          calls    #4,FWRITE
            52 50 D0  19DC          movl     r0,r2
         02 66 D1     19DF          cmpl     (r6),#2
            0D 12     19E2          bneq     sym.181
            52 DD     19E4          pushl    r2
         1A9E C3 DF   19E6          pushal   6814(r3)
```

```
00000000* EF 02 FB    19EA            calls    #2,PRINTF
                      19F1   sym.181:
           52 D5       19F1            tstl     r2
           07 12       19F3            bneq     sym.182
00000000* EF 00 FB    19F5            calls    #0,EXIT
                      19FC   sym.182:
           65 DD       19FC            pushl    (r5)
           01 DD       19FE            pushl    #1
        50 04 AC DO   1A00            movl     4(ap),r0
        7E 04 A0 32   1A04            cvtwl    4(r0),-(sp)
           10 AC DD   1A08            pushl    16(ap)
00000000* EF 04 FB    1A09            calls    #4,FWRITE
           52 50 D0   1A12            movl     r0,r2
           02 66 D1   1A15            cmpl     (r6),#2
           0D 12      1A18            bneq     sym.183
           52 DD      1A1A            pushl    r2
        1AD0 C3 DF    1A1C            pushal   6864(r3)
00000000* EF 02 FB    1A20            calls    #2,PRINTF
                      1A27   sym.183:
           52 D5      1A27            tstl     r2
           07 12      1A29            bneq     sym.184
00000000* EF 00 FB    1A2B            calls    #0,EXIT
                      1A32   sym.184:
           02 66 D1   1A32            cmpl     (r6),#2
           09 12      1A35            bneq     sym.185
        1B02 C3 DF    1A37            pushal   6914(r3)
00000000* EF 01 FB    1A3B            calls    #1,PRINTF
                      1A42   sym.185:
        50 04 AC D0   1A42            movl     4(ap),r0
        0300 C0 D6    1A46            incl     768(r0)
           65 DD      1A4A            pushl    (r5)
00000000* EF 01 FB    1A4C            calls    #1,FCLOSE
           02 66 D1   1A53            cmpl     (r6),#2
           0D 12      1A56            bneq     sym.186
           50 DD      1A58            pushl    r0
        1B2B C3 DF    1A5A            pushal   6955(r3)
00000000* EF 02 FB    1A5E            calls    #2,PRINTF
                      1A65   sym.186:
           04         1A65            ret
                      1A66   call_read_recd:
           003C       1A66            .entry   call_read_recd,^
           5E 04 C2   1A68            subl2    #4,sp
     53 00000000 EF 9E  1A6B          movab    $CHAR_STRING_CON
     55 00000000 EF 9E  1A72          movab    HEYPRINT2,r5
     54 00000000 EF 9E  1A79          movab    DATE7,r4
           10 BC DD   1A80            pushl    a16(ap)
           01 DD      1A83            pushl    #1
           0C BC DD   1A85            pushl    a12(ap)
           04 AC DD   1A88            pushl    4(ap)
00000000* EF 04 FB    1A89            calls    #4,FREAD
           52 50 D0   1A92            movl     r0,r2
           02 65 D1   1A95            cmpl     (r5),#2
           0D 12      1A98            bneq     sym.187
           52 DD      1A9A            pushl    r2
        135F C3 DF    1A9C            pushal   7007(r3)
00000000* EF 02 FB    1AA0            calls    #2,PRINTF
                      1AA7   sym.187:
```

```
            52 D5   1AA7           tstl    r2
            15 12   1AA9           bneq    sym.189
         02 65 D1   1AAB           cmpl    (r5),#2
            0B 12   1AAE           bneq    sym.188
        1B84 C3 DF  1AB0           pushal  7044(r3)
   00000000* EF 01 FB  1AB4        calls   #1,PRINTF
                    1ABB   sym.188:
         14 BC 01 D0  1ABB         movl    #1,a20(ap)
               04   1ABF           ret
                    1AC0   sym.189:
         02 65 D1   1AC0           cmpl    (r5),#2
            0E 12   1AC3           bneq    sym.190
         18 AC DD   1AC5           pushl   24(ap)
        1BB5 C3 DF  1AC8           pushal  7093(r3)
   00000000* EF 02 FB  1ACC        calls   #2,PRINTF
                    1AD3   sym.190:
         10 BC DD   1AD3           pushl   a16(ap)
            01 DD   1AD6           pushl   #1
         50 04 AC D0  1AD8         movl    4(ap),r0
         7E 04 A0 32  1ADC         cvtwl   4(r0),-(sp)
         03 AC DD   1AE0           pushl   8(ap)
   00000000* EF 04 FB  1AE3        calls   #4,FREAD
         52 50 D0   1AEA           movl    r0,r2
         02 65 D1   1AED           cmpl    (r5),#2
            0D 12   1AF0           bneq    sym.191
            52 DD   1AF2           pushl   r2
        1BDC C3 DF  1AF4           pushal  7132(r3)
   00000000* EF 02 FB  1AF8        calls   #2,PRINTF
                    1AFF   sym.191:
            52 D5   1AFF           tstl    r2
            15 12   1B01           bneq    sym.192
        1C0E C3 DF  1B03           pushal  7182(r3)
   00000000* EF 01 FB  1B07        calls   #1,PRINTF
   00000000* EF 00 FB  1B0E        calls   #0,EXIT
               04   1B15           ret
            50 D5   1B16           tstl    r0
                    1B18   sym.192:
   02 00000000 EF D1  1B18         cmpl    HEYPRINT,#2
            0B 12   1B1F           bneq    sym.193
        1C30 C3 DF  1B21           pushal  7216(r3)
   00000000* EF 01 FB  1B25        calls   #1,PRINTF
                    1B2C   sym.193:
         50 04 AC D0  1B2C         movl    4(ap),r0
         0308 C0 9F  1B30          pushab  776(r0)
            64 9F   1B34           pushab  (r4)
   00000000* EF ?? FB  1B36        calls   #2,SYS$NUMTIM
         02 ?? D1   1B3D           cmpl    (r5),#2
            0B 12   1B40           bneq    sym.194
        1C51 C3 DF  1B42           pushal  7249(r3)
   00000000* EF 01 FB  1B46        calls   #1,PRINTF
                    1B4D   sym.194:
         02 65 D1   1B4D           cmpl    (r5),#2
            26 12   1B50           bneq    sym.195
         7E 0C A4 32  1B52         cvtwl   12(r4),-(sp)
         7E 0A A4 32  1B56         cvtwl   10(r4),-(sp)
         7E 08 A4 32  1B5A         cvtwl   8(r4),-(sp)
         7E 06 A4 32  1B5E         cvtwl   6(r4),-(sp)
```

```
           7E 64 32    1862            cvtwl    (r4),-(sp)
        7E 02 A4 32    1865            cvtwl    2(r4),-(sp)
        7E 04 A4 32    1869            cvtwl    4(r4),-(sp)
           1C98 C3 DF  186D            pushal   7320(r3)
  00000000* EF 08 FB   1871            calls    #8,PRINTF
                       1878   sym.195:
                       1878   end_subr:
                  04   1878            ret
                       1879   screenchoice:
                OFFC   1879            .entry   screenchoice,^m<
              5E 04 C2 187B            subl2    #4,sp
     52 00000000 EF 9E 187E            movab    $CHAR_STRING_CON
     54 00000000 EF 9E 1885            movab    GN_LOWER,r4
     53 00000000 EF 9E 188C            movab    GN_UPPER,r3
     5B 00000000 EF 9E 1893            movab    OUTFILE4,r11
     5A 00000000 EF 9E 189A            movab    OUTFILE3,r10
     59 00000000 EF 9E 18A1            movab    OUTFILE2,r9
     57 00000000 EF 9E 18A8            movab    OUTFILE,r7
      00000000* EF 00 FB 18AF          calls    #0,INISH
              55 F5 8F 9A 18B6         movzbl   #245,r5
                  1B DD 18BA           pushl    #27
              1CC6 C2 DF 18BC          pushal   7366(r2)
                  67 DD 18C0           pushl    (r7)
     58 00000000* EF 9E 18C2           movab    FPRINTF,r8
              68 03 FB 18C9            calls    #3,(r8)
                  1B DD 18CC           pushl    #27
              1CCA C2 DF 18CE          pushal   7370(r2)
                  67 DD 18D2           pushl    (r7)
              68 03 FB 18D4            calls    #3,(r8)
                  1B DD 18D7           pushl    #27
              1CD2 C2 DF 18D9          pushal   7378(r2)
                  69 DD 18DD           pushl    (r9)
              68 03 FB 18DF            calls    #3,(r8)
                  1B DD 18E2           pushl    #27
              1CD6 C2 DF 18E4          pushal   7382(r2)
                  69 DD 18E8           pushl    (r9)
              68 03 FB 18EA            calls    #3,(r8)
                  1B DD 18ED           pushl    #27
              1CDE C2 DF 18EF          pushal   7390(r2)
                  6A DD 18F3           pushl    (r10)
              68 03 FB 18F5            calls    #3,(r8)
                  1B DD 18F8           pushl    #27
              1CE2 C2 DF 18FA          pushal   7394(r2)
                  6A DD 18FE           pushl    (r10)
              68 03 FB 1C00            calls    #3,(r8)
                  1B DD 1C03           pushl    #27
              1CEA C2 DF 1C05          pushal   7402(r2)
                  6B DD 1C09           pushl    (r11)
              68 03 FB 1C0B            calls    #3,(r8)
                  1B DD 1C0E           pushl    #27
              1CEE C2 DF 1C10          pushal   7406(r2)
                  6B DD 1C14           pushl    (r11)
              68 03 FB 1C16            calls    #3,(r8)
                  1B DD 1C19           pushl    #27
              1CF6 C2 DF 1C1B          pushal   7414(r2)
                  67 DD 1C1F           pushl    (r7)
              68 03 FB 1C21            calls    #3,(r8)
```

```
            50 63 9E    1C24       movab    (r3),r0
            5C 64 9E    1C27       movab    (r4),ap
               67 DD    1C2A       pushl    (r7)
               55 DD    1C2C       pushl    r5
               5C DD    1C2E       pushl    ap
               50 DD    1C30       pushl    r0
 56 00000000* EF 9E     1C32       movab    WRITE_SCR1,r6
               66 04 FB 1C39       calls    #4,(r6)
               55 D6    1C3C       incl     r5
               1B DD    1C3E       pushl    #27
       1CFE C2 DF       1C40       pushal   7422(r2)
               67 DD    1C44       pushl    (r7)
               68 03 FB 1C46       calls    #3,(r8)
            50 2C A3 9E 1C49       movab    44(r3),r0
            5C 2C A4 9E 1C4D       movab    44(r4),ap
               67 DD    1C51       pushl    (r7)
               55 DD    1C53       pushl    r5
               5C DD    1C55       pushl    ap
               50 DD    1C57       pushl    r0
               66 04 FB 1C59       calls    #4,(r6)
               55 D6    1C5C       incl     r5
               1B DD    1C5E       pushl    #27
       1D06 C2 DF       1C60       pushal   7430(r2)
               67 DD    1C64       pushl    (r7)
               68 03 FB 1C66       calls    #3,(r8)
            50 58 A3 9E 1C69       movab    88(r3),r0
            5C 58 A4 9E 1C6D       movab    88(r4),ap
               67 DD    1C71       pushl    (r7)
               55 DD    1C73       pushl    r5
               5C DD    1C75       pushl    ap
               50 DD    1C77       pushl    r0
               66 04 FB 1C79       calls    #4,(r6)
               55 D6    1C7C       incl     r5
               1B DD    1C7E       pushl    #27
       1D0E C2 DF       1C80       pushal   7438(r2)
               67 DD    1C84       pushl    (r7)
               68 03 FB 1C86       calls    #3,(r8)
         50 0084 C3 9E  1C89       movab    132(r3),r0
         5C 0084 C4 9E  1C8E       movab    132(r4),ap
               67 DD    1C93       pushl    (r7)
               55 DD    1C95       pushl    r5
               5C DD    1C97       pushl    ap
               50 DD    1C99       pushl    r0
               66 04 FB 1C9B       calls    #4,(r6)
               55 D6    1C9E       incl     r5
               1B DD    1CA0       pushl    #27
       1D17 C2 DF       1CA2       pushal   7447(r2)
               67 DD    1CA6       pushl    (r7)
               68 03 FB 1CA8       calls    #3,(r8)
         50 00B0 C3 9E  1CAB       movab    176(r3),r0
         5C 00B0 C4 9E  1CB0       movab    176(r4),ap
               67 DD    1CB5       pushl    (r7)
               55 DD    1CB7       pushl    r5
               5C DD    1CB9       pushl    ap
               50 DD    1CBB       pushl    r0
               66 04 FB 1CBD       calls    #4,(r6)
               55 D6    1CC0       incl     r5
```

```
         1B DD    1CC2      pushl    #27
   1D20 C2 DF    1CC4      pushal   7456(r2)
         67 DD    1CC8      pushl    (r7)
         68 03 FB 1CCA      calls    #3,(r8)
50 00DC C3 9E    1CCD      movab    220(r3),r0
5C 00DC C4 9E    1CD2      movab    220(r4),ap
         67 DD    1CD7      pushl    (r7)
         55 DD    1CD9      pushl    r5
         5C DD    1CDB      pushl    ap
         50 DD    1CDD      pushl    r0
         66 04 FB 1CDF      calls    #4,(r6)
         55 D6    1CE2      incl     r5
         1B DD    1CE4      pushl    #27
   1D29 C2 DF    1CE6      pushal   7465(r2)
         67 DD    1CEA      pushl    (r7)
         68 03 FB 1CEC      calls    #3,(r8)
50 0108 C3 9E    1CEF      movab    264(r3),r0
5C 0108 C4 9E    1CF4      movab    264(r4),ap
         67 DD    1CF9      pushl    (r7)
         55 DD    1CFB      pushl    r5
         5C DD    1CFD      pushl    ap
         50 DD    1CFF      pushl    r0
         66 04 FB 1D01      calls    #4,(r6)
         55 D6    1D04      incl     r5
         1B DD    1D06      pushl    #27
   1D32 C2 DF    1D08      pushal   7474(r2)
         69 DD    1D0C      pushl    (r9)
         68 03 FB 1D0E      calls    #3,(r8)
50 0160 C3 9E    1D11      movab    352(r3),r0
5C 0160 C4 9E    1D16      movab    352(r4),ap
         69 DD    1D1B      pushl    (r9)
         55 DD    1D1D      pushl    r5
         5C DD    1D1F      pushl    ap
         50 DD    1D21      pushl    r0
         66 04 FB 1D23      calls    #4,(r6)
         55 D6    1D26      incl     r5
         1B DD    1D28      pushl    #27
   1D3A C2 DF    1D2A      pushal   7482(r2)
         69 DD    1D2E      pushl    (r9)
         68 03 FB 1D30      calls    #3,(r8)
50 018C C3 9E    1D33      movab    396(r3),r0
5C 018C C4 9E    1D38      movab    396(r4),ap
         69 DD    1D3D      pushl    (r9)
         55 DD    1D3F      pushl    r5
         5C DD    1D41      pushl    ap
         50 DD    1D43      pushl    r0
         66 04 FB 1D45      calls    #4,(r6)
         55 D6    1D48      incl     r5
         1B DD    1D4A      pushl    #27
   1D42 C2 DF    1D4C      pushal   7490(r2)
         69 DD    1D50      pushl    (r9)
         68 03 FB 1D52      calls    #3,(r8)
50 01B8 C3 9E    1D55      movab    440(r3),r0
5C 01B8 C4 9E    1D5A      movab    440(r4),ap
         69 DD    1D5F      pushl    (r9)
         55 DD    1D61      pushl    r5
         5C DD    1D63      pushl    ap
```

```
                         0337  sym.9:
      7E 4B 8F 9A        0337          movzbl   #75,-(sp)
00000000* EF 01 FB       033B          calls    #1,SYS$CLREF
            66 50 D0     0342          movl     r0,(r6)
52 50 FFFFFFFE 8F CB     0345          bicl3    #-2,r0,r2
            01 52 D1     034D          cmpl     r2,#1
               09 13     0350          beql     sym.10
               66 DD     0352          pushl    (r6)
00000000* EF 01 FB       0354          calls    #1,EXIT
                         035B  sym.10:
      00000114 EF DF     035B          pushal   SCHAR_STRING_CON
00000000* EF 01 FB       0361          calls    #1,PRINTF
               55 D4     0368          clrl     r5
               6C D5     036A          tstl     (ap)
               03 14     036C          bgtr     gen.1
              0167 31    036E          brw      sym.23
                         0371  gen.1:
59 00000000* EF 9E       0371          movab    SYS$WAITFR,r9
54 00000000* EF 9E       0378          movab    EXIT,r4
5B 00000000* EF 9E       037F          movab    SYS$CLREF,r11
               50 D5     0386          tstl     r0
                         0388  sym.11:
      53 55 04 AC C5     0388          mull3    4(ap),r5,r3
         08 AC 55 D1     038D          cmpl     r5,8(ap)
               3F 15     0391          bleq     sym.15
                  01     0393          nop
                         0394  sym.12:
      7E 48 8F 9A        0394          movzbl   #75,-(sp)
            69 01 FB     0398          calls    #1,(r9)
            66 50 D0     039B          movl     r0,(r6)
52 50 FFFFFFFE 8F CB     039E          bicl3    #-2,r0,r2
            01 52 D1     03A6          cmpl     r2,#1
               05 13     03A9          beql     sym.13
               66 DD     03AB          pushl    (r6)
            64 01 FB     03AD          calls    #1,(r4)
                         03B0  sym.13:
      7E 4B 8F 9A        03B0          movzbl   #75,-(sp)
            6B 01 FB     03B4          calls    #1,(r11)
            66 50 D0     03B7          movl     r0,(r6)
52 50 FFFFFFFE 8F CB     03BA          bicl3    #-2,r0,r2
            01 52 D1     03C2          cmpl     r2,#1
               05 13     03C5          beql     sym.14
               66 DD     03C7          pushl    (r6)
            64 01 FB     03C9          calls    #1,(r4)
                         03CC  sym.14:
         08 AC 55 D1     03CC          cmpl     r5,8(ap)
               C2 14     03D0          bgtr     sym.12
                         03D2  sym.15:
               6A D4     03D2          clrl     (r10)
               68 53 D0  03D4          movl     r3,(r8)
      52 53 04 AC C1     03D7          addl3    4(ap),r3,r2
         52 68 D1        03DC          cmpl     (r8),r2
               44 13     03DF          bgeq     sym.19
               50 D5     03E1          tstl     r0
                  01     03E3          nop
                         03E4  sym.16:
            52 63 D0     03E4          movl     (r3),r2
```

```
       52 00 BE42 32    03E7           cvtwl    a0(sp)[r2],r2
 52 00000000 EF C2       03EC           subl2    L0,r2
 52 00000000 EF C6       03F3           divl2    MAPBIN,r2
             52 D6       03FA           incl     r2
          67 52 F6       03FC           cvtlb    r2,(r7)
             03 14       03FF           bgtr     sym.17
          67 01 90       0401           movb     #1,(r7)
                         0404   sym.17:
          12 67 91       0404           cmpb     (r7),#18
             03 19       0407           blss     sym.18
          67 12 90       0409           movb     #18,(r7)
                         040C   sym.18:
             52 6A D0    040C           movl     (r10),r2
 00000000 EF42 67 90     040F           movb     (r7),DATABUF[r2]
             6A D6       0417           incl     (r10)
             68 D6       0419           incl     (r8)
       52 53 04 AC C1    041B           addl3    4(ap),r3,r2
             52 69 D1    0420           cmpl     (r3),r2
             BF 19       0423           blss     sym.16
                         0425   sym.19:
             6A D4       0425           clrl     (r10)
             7E 7C       0427           clrq     -(sp)
       00000000 EF DF    0429           pushal   TBUF
       00000000 EF DD    042F           pushl    TFLAG
    00000000* EF 04 FB   0435           calls    #4,SYS$SETIMR
    00000000  EF 50 D0   043C           movl     r0,TSTAT
 52 50 FFFFFFFE 8F CB    0443           bicl3    #-2,r0,r2
             01 52 D1    044B           cmpl     r2,#1
             09 13       044E           beql     sym.20
       00000000 EF DD    0450           pushl    TSTAT
             64 01 FB    0456           calls    #1,(r4)
                         0459   sym.20:
       00000000 EF DD    0459           pushl    TFLAG
             69 01 FB    045F           calls    #1,(r9)
    00000000  EF 50 D0   0462           movl     r0,TSTAT
 52 50 FFFFFFFE 8F CB    0469           bicl3    #-2,r0,r2
             01 52 D1    0471           cmpl     r2,#1
             09 13       0474           beql     sym.21
       00000000 EF DD    0476           pushl    TSTAT
             64 01 FB    047C           calls    #1,(r4)
                         047F   sym.21:
       00000000 EF DD    047F           pushl    BUFLEN
             52 6A D0    0485           movl     (r10),r2
    00000000 EF42 9F     0488           pushab   DATABUF[r2]
       00000000 EF DD    048F           pushl    CHANNEL
    00000000* EF 03 FB   0495           calls    #3,NETWRITE
    00000000  EF 50 D0   049C           movl     r0,SOCKSTAT
 FFFFFFFF 8F
       00000000 EF D1    04A3           cmpl     SOCKSTAT,#-1
             10 12       04AE           bneq     sym.22
       00000000 EF DD    04B0           pushl    CHANNEL
    00000000* EF 01 FB   04B6           calls    #1,NETCLOSE
       00000124 EF DF    04BD           pushal   SCHAR_STRING_CON
    00000000* EF 01 FB   04C3           calls    #1,PRINTF
             55 6C D0    04CA           movl     (ap),r5
                         04CD   sym.22:
```

```
                55 02 C0    04CD            addl2    #2,r5
                6C 55 D1    04D0            cmpl     r5,(ap)
                   03 18    04D3            bgeq     gen.2
                 FEB0 31    04D5            brw      sym.11
                            04D8  gen.2:
                            04D8  sym.23:
       00000000 EF DD       04D8            pushl    CHANNEL
    00000000* EF 01 FB      04DE            calls    #1,NETCLOSE
       00000143 EF DF       04E5            pushal   $CHAR_STRING_CON
    00000000* EF 01 FB      04EB            calls    #1,PRINTF
           7E 42 8F 9A      04F2            movzbl   #66,-(sp)
    00000000* EF 01 FB      04F6            calls    #1,SYS$SETEF
                66 50 D0    04FD            movl     r0,(r6)
    52 50 FFFFFFFE 8F CB    0500            bicl3    #-2,r0,r2
                01 52 D1    0508            cmpl     r2,#1
                   09 13    050B            beql     sym.24
                   66 DD    050D            pushl    (r6)
    00000000* EF 01 FB      050F            calls    #1,EXIT
                            0516  sym.24:
       00000160 EF DF       0516            pushal   $CHAR_STRING_CON
    00000000* EF 01 FB      051C            calls    #1,PRINTF
                50 01 D0    0523            movl     #1,r0
                      04    0526            ret 0000  main:
                    0FFC    0000            .entry   main,^m<r2,r3,r4
                5E 04 C2    0002            subl2    #4,sp
      00000000* EF 16       0005            jsb      C$MAIN
   59 00000000 EF 9E        000B            movab    $CHAR_STRING_CON
   5B 00000000 EF 9E        0012            movab    BUF4,r11
   55 00000000 EF 9E        0019            movab    L3PARAMS,r5
   5A 00000000 EF 9E        0020            movab    CUR_PIXB,r10
   58 00000000 EF 9E        0027            movab    CUR_PIXA,r8
   56 00000000 EF 9E        002E            movab    CURDATE7,r6
   54 00000000 EF 9E        0035            movab    PREVDATE7,r4
   57 00000000 EF 9E        003C            movab    $DATA,r7
                   64 B4    0043            clrw     (r4)
                02 A4 7C    0045            clrq     2(r4)
                0A A4 D4    0048            clrl     10(r4)
                   66 B4    004B            clrw     (r6)
                02 A6 7C    004D            clrq     2(r6)
                0A A6 D4    0050            clrl     10(r6)
                18 A7 9F    0053            pushab   24(r7)
    00000000* EF 01 FB      0056            calls    #1,LIB$DATE_TIME
                52 50 D0    005D            movl     r0,r2
   5C 52 FFFFFFFE 8F CB     0060            bicl3    #-2,r2,ap
                01 5C D1    0068            cmpl     ap,#1
                   12 13    006B            beql     sym.1
                   69 DF    006D            pushal   (r9)
    00000000* EF 01 FB      006F            calls    #1,PRINTF
                   52 DD    0076            pushl    r2
    00000000* EF 01 FB      0078            calls    #1,LIB$STOP
                            007F  sym.1:
```

```
           65 2000 8F 3C    007F           movzwl   #8192,(r5)
        04 A5 0258 8F 3C    0084           movzwl   #600,4(r5)
           08 A5 68 9E      008A           movab    (r8),8(r5)
           0C A5 6A 9E      008E           movab    (r10),12(r5)
        68 00000000 EF 9E   0092           movab    THRESH_HITS_OUT,
00000000 EF
              03E9 8F 3C    0099           movzwl   #1001,THRESH
00000000 EF
          02F95115 8F 56    00A2           cvtfd    #49893653,SCALE
                 52 D4      00AD           clrl     r2
              50 00 AA DE   00AF           moval    0(r10),r0
              5C 0000 C8 DE 00B3           moval    0(r8),ap
                            00B8    sym.2:
           8C 03E8 8F 3C    00B8           movzwl   #1000,(ap)+
           80 03E8 8F 3C    00BD           movzwl   #1000,(r0)+
      EE 52 00001FFF 8F F3  00C2           aobleq   #8191,r2,sym.2
        4000 C8 03EA 8F 3C  00CA           movzwl   #1002,16384(r8)
                 5C 6B D0   00D1           movl     (r11),ap
        00000000 EF 5C D0   00D4           movl     ap,THRESHPREFBLO
        00000000 EF 08 AC 9E 00D9          movab    8(ap),THRESHHITS
00000000 EF
           00000000 EF 9E   00E3           movab    WORKPIX,BADPIX
                 40 A7 9F   00EE           pushab   64(r7)
        00000000* EF 01 FB  00F1           calls    #1,LIB$DATE_TIME
                 52 50 D0   00F8           movl     r0,r2
        5C 52 FFFFFFFE 8F C8 00FB          bicl3    #-2,r2,ap
                    01 5C D1 0103          cmpl     ap,#1
                    13 13   0106           beql     sym.3
                    2B A9 DF 0108          pushal   43(r9)
        00000000* EF 01 FB  010B           calls    #1,PRINTF
                    52 DD   0112           pushl    r2
        00000000* EF 01 FB  0114           calls    #1,LIB$STOP
                            011B    sym.3:
                    3F A7 94 011B          clrb     63(r7)
                    17 A7 94 011E          clrb     23(r7)
                    00 DD   0121           pushl    #0
        00000000* EF 01 FB  0123           calls    #1,TO_SCREEN
                    4A A9 DF 012A          pushal   74(r9)
        00000000* EF 01 FB  012D           calls    #1,PRINTF
                    18 A7 9F 0134          pushab   24(r7)
        00000000* EF 01 FB  0137           calls    #1,LIB$DATE_TIME
                    52 50 D0 013E          movl     r0,r2
        5C 52 FFFFFFFE 8F C8 0141          bicl3    #-2,r2,ap
                    01 5C D1 0149          cmpl     ap,#1
                    13 13   014C           beql     sym.4
                    7A A9 DF 014E          pushal   122(r9)
        00000000* EF 01 FB  0151           calls    #1,PRINTF
                    52 DD   0158           pushl    r2
        00000000* EF 01 FB  015A           calls    #1,LIB$STOP
                            0161    sym.4:
                    52 D4   0161           clrl     r2
                    04 A5 D5 0163          tstl     4(r5)
                    2B 15   0166           bleq     sym.8
        53 00000000* EF 9E  0168           movab    RUNCALC,r3
                       01   016F           nop
                            0170    sym.5:
```

```
              0D 52 E8    0170            blbs    r2,sym.6
              08 A5 DD    0173            pushl   8(r5)
                 65 DD    0176            pushl   (r5)
              63 02 FB    0178            calls   #2,(r3)
                 09 11    017B            brb     sym.7
                 50 D5    017D            tstl    r0
                    01    017F            nop
                          0180    sym.6:
              0C A5 DD    0180            pushl   12(r5)
                 65 DD    0183            pushl   (r5)
              63 02 FB    0185            calls   #2,(r3)
                          0188    sym.7:
                 52 D6    0188            incl    r2
           04 A5 52 D1    018A            cmpl    r2,4(r5)
                 E0 19    018E            blss    sym.5
                          0190    sym.8:
              40 A7 9F    0190            pushab  64(r7)
     00000000* EF 01 FB   0193            calls   #1,LIB$DATE_TIME
              52 50 D0    019A            movl    r0,r2
   5C 52 FFFFFFFE 8F C8   019D            bicl3   #-2,r2,ap
              01 5C D1    01A5            cmpl    ap,#1
                 14 13    01A8            beql    sym.9
              009A C9 DF  01AA            pushal  154(r9)
     00000000* EF 01 FB   01AE            calls   #1,PRINTF
                 52 DD    01B5            pushl   r2
     00000000* EF 01 FB   01B7            calls   #1,LIB$STOP
                          01BE    sym.9:
              3F A7 94    01BE            clrb    63(r7)
              17 A7 94    01C1            clrb    23(r7)
                 01 DD    01C4            pushl   #1
     00000000* EF 01 FB   01C6            calls   #1,TO_SCREEN
              67 04 FB    2419            calls   #4,(r7)
                 1B DD    241E            pushl   #27
           2178 C4 DF     2420            pushal  8568(r4)
                 6A DD    2424            pushl   (r10)
              67 03 FB    2426            calls   #3,(r7)
              F8 AD DD    2429            pushl   -8(fp)
                 1B DD    242C            pushl   #27
           2182 C4 DF     242E            pushal  8578(r4)
                 6A DD    2432            pushl   (r10)
              67 04 FB    2434            calls   #4,(r7)
           52 3E A643 9E  2437            movab   62(r6)[r3],r2
           F8 AD 62 4A    243C            cvtfl   (r2),-8(fp)
                 1B DD    2440            pushl   #27
           218A C4 DF     2442            pushal  8586(r4)
                 6A DD    2446            pushl   (r10)
              67 03 FB    2448            calls   #3,(r7)
              F8 AD DD    244B            pushl   -8(fp)
                 1B DD    244E            pushl   #27
           2194 C4 DF     2450            pushal  8596(r4)
                 6A DD    2454            pushl   (r10)
              67 04 FB    2456            calls   #4,(r7)
                 1B DD    2459            pushl   #27
           219C C4 DF     245B            pushal  8604(r4)
                 6A DD    245F            pushl   (r10)
              67 03 FB    2461            calls   #3,(r7)
```

```
      F8 AD DD    2464    pushl   -8(fp)
         1B DD    2467    pushl   #27
      21A6 C4 DF  2469    pushal  8614(r4)
         6A DD    246D    pushl   (r10)
         67 04 FB 246F    calls   #4,(r7)
   52 42 A643 9E  2472    movab   66(r6)[r3],r2
      F8 AD 62 4A 2477    cvtfl   (r2),-8(fp)
         1B DD    247B    pushl   #27
      21AE C4 DF  247D    pushal  8622(r4)
         6A DD    2481    pushl   (r10)
         67 03 FB 2483    calls   #3,(r7)
      F8 AD DD    2486    pushl   -8(fp)
         1B DD    2489    pushl   #27
      21B8 C4 DF  248B    pushal  8632(r4)
         6A DD    248F    pushl   (r10)
         67 04 FB 2491    calls   #4,(r7)
         1B DD    2494    pushl   #27
      21C0 C4 DF  2496    pushal  8640(r4)
         6A DD    249A    pushl   (r10)
         67 03 FB 249C    calls   #3,(r7)
      F8 AD DD    249F    pushl   -8(fp)
         1B DD    24A2    pushl   #27
      21CA C4 DF  24A4    pushal  8650(r4)
         6A DD    24A8    pushl   (r10)
         67 04 FB 24AA    calls   #4,(r7)
   52 4A A643 9E  24AD    movab   74(r6)[r3],r2
      52 62 50    24B2    movf    (r2),r2
      E6 AD 9F    24B5    pushab  -26(fp)
      F8 AD DF    24B8    pushal  -8(fp)
      7E 52 56    24BB    cvtfd   r2,-(sp)
   53 00000000* EF 9E 24BE  movab TO_SHOW_TORR,r3
      68 04 FB    24C5    calls   #4,(r8)
         1B DD    24C8    pushl   #27
      21D2 C4 DF  24CA    pushal  8658(r4)
         6B DD    24CE    pushl   (r11)
         67 03 FB 24D0    calls   #3,(r7)
      E6 AD DF    24D3    pushal  -26(fp)
      F8 AD DD    24D6    pushl   -8(fp)
         1B DD    24D9    pushl   #27
      21DB C4 DF  24DB    pushal  8667(r4)
         6B DD    24DF    pushl   (r11)
         67 05 FB 24E1    calls   #5,(r7)
         1B DD    24E4    pushl   #27
      21E3 C4 DF  24E6    pushal  8680(r4)
         6B DD    24EA    pushl   (r11)
         67 03 FB 24EC    calls   #3,(r7)
      E6 AD DF    24EF    pushal  -26(fp)
      F8 AD DD    24F2    pushl   -8(fp)
         1B DD    24F5    pushl   #27
      21F1 C4 DF  24F7    pushal  8689(r4)
         6B DD    24FB    pushl   (r11)
         67 05 FB 24FD    calls   #5,(r7)
   52 4E A643 9E  2500    movab   78(r6)[r3],r2
      52 62 50    2505    movf    (r2),r2
      E6 AD 9F    2508    pushab  -26(fp)
      F8 AD DF    250B    pushal  -8(fp)
```

| | | | | |
|---|---|---|---|---|
| | 7E 52 56 | 250E | cvtfd | r2,-(sp) |
| | 68 04 FB | 2511 | calls | #4,(r8) |
| | 1B DD | 2514 | pushl | #27 |
| 21FE C4 DF | | 2516 | pushal | 8702(r4) |
| | 68 DD | 251A | pushl | (r11) |
| | 67 03 FB | 251C | calls | #3,(r7) |
| | E6 AD DF | 251F | pushal | -26(fp) |
| | F8 AD DD | 2522 | pushl | -8(fp) |
| | 1B DD | 2525 | pushl | #27 |
| 2207 C4 DF | | 2527 | pushal | 8711(r4) |
| | 68 DD | 252B | pushl | (r11) |
| | 67 05 FB | 252D | calls | #5,(r7) |
| | 1B DD | 2530 | pushl | #27 |
| 2214 C4 DF | | 2532 | pushal | 8724(r4) |
| | 68 DD | 2536 | pushl | (r11) |
| | 67 03 FB | 2538 | calls | #3,(r7) |
| | E6 AD DF | 253B | pushal | -26(fp) |
| | F8 AD DD | 253E | pushl | -8(fp) |
| | 1B DD | 2541 | pushl | #27 |
| 221D C4 DF | | 2543 | pushal | 8733(r4) |
| | 68 DD | 2547 | pushl | (r11) |
| | 67 05 FB | 2549 | calls | #5,(r7) |
| 52 52 A643 9E | | 254C | movab | 82(r6)[r3],r2 |
| | 52 62 50 | 2551 | movf | (r2),r2 |
| | E6 AD 9F | 2554 | pushab | -26(fp) |
| | F8 AD DF | 2557 | pushal | -8(fp) |
| | 7E 52 56 | 255A | cvtfd | r2,-(sp) |
| | 68 04 FB | 255D | calls | #4,(r8) |
| | 1B DD | 2560 | pushl | #27 |
| 222A C4 DF | | 2562 | pushal | 8746(r4) |
| | 68 DD | 2566 | pushl | (r11) |
| | 67 03 FB | 2568 | calls | #3,(r7) |
| | E6 AD DF | 256B | pushal | -26(fp) |
| | F8 AD DD | 256E | pushl | -8(fp) |
| | 1B DD | 2571 | pushl | #27 |
| 2233 C4 DF | | 2573 | pushal | 8755(r4) |
| | 68 DD | 2577 | pushl | (r11) |
| | 67 05 FB | 2579 | calls | #5,(r7) |
| | 1B DD | 257C | pushl | #27 |
| 2240 C4 DF | | 257E | pushal | 8768(r4) |
| | 68 DD | 2582 | pushl | (r11) |
| | 67 03 FB | 2584 | calls | #3,(r7) |
| | E6 AD DF | 2587 | pushal | -26(fp) |
| | F8 AD DD | 258A | pushl | -8(fp) |
| | 1B DD | 258D | pushl | #27 |
| 2249 C4 DF | | 258F | pushal | 8777(r4) |
| | 68 DD | 2593 | pushl | (r11) |
| | 67 05 FB | 2595 | calls | #5,(r7) |
| 52 56 A643 9E | | 2598 | movab | 86(r6)[r3],r2 |
| | 52 62 50 | 259D | movf | (r2),r2 |
| | E6 AD 9F | 25A0 | pushab | -26(fp) |
| | F8 AD DF | 25A3 | pushal | -8(fp) |
| | 7E 52 56 | 25A6 | cvtfd | r2,-(sp) |
| | 68 04 FB | 25A9 | calls | #4,(r8) |
| | 1B DD | 25AC | pushl | #27 |

```
      2256 C4 DF      25AE           pushal   8790(r4)
            6B DD     25B2           pushl    (r11)
         67 03 FB     25B4           calls    #3,(r7)
         E6 AD DF     25B7           pushal   -26(fp)
         F8 AD DD     25BA           pushl    -8(fp)
            1B DD     25BD           pushl    #27
      2260 C4 DF      25BF           pushal   8800(r4)
            6B DD     25C3           pushl    (r11)
         67 05 FB     25C5           calls    #5,(r7)
            1B DD     25C8           pushl    #27
      226D C4 DF      25CA           pushal   8813(r4)
            6B DD     25CE           pushl    (r11)
         67 03 FB     25D0           calls    #3,(r7)
         E6 AD DF     25D3           pushal   -26(fp)
         F8 AD DD     25D6           pushl    -8(fp)
            1B DD     25D9           pushl    #27
      2277 C4 DF      25DB           pushal   8823(r4)
            6B DD     25DF           pushl    (r11)
         67 05 FB     25E1           calls    #5,(r7)
      52 46 A643 9E   25E4           movab    70(r6)[r3],r2
         F8 AD 62 4A  25E9           cvtfl    (r2),-8(fp)
         DC AD 9F     25ED           pushab   -36(fp)
         F8 AD DD     25F0           pushl    -8(fp)
   00000000* EF 02 FB 25F3           calls    #2,FLATSTAT
            1B DD     25FA           pushl    #27
      2284 C4 DF      25FC           pushal   8836(r4)
    00000000 EF DD    2600           pushl    OUTFILE4
         67 03 FB     2606           calls    #3,(r7)
         DC AD 9F     2609           pushab   -36(fp)
            1B DD     260C           pushl    #27
      228D C4 DF      260E           pushal   8845(r4)
    00000000 EF DD    2612           pushl    OUTFILE4
         67 04 FB     2618           calls    #4,(r7)
            1B DD     261B           pushl    #27
      2295 C4 DF      261D           pushal   8853(r4)
    00000000 EF DD    2621           pushl    OUTFILE4
         67 03 FB     2627           calls    #3,(r7)
         DC AD 9F     262A           pushab   -36(fp)
            1B DD     262D           pushl    #27
      229E C4 DF      262F           pushal   8862(r4)
    00000000 EF DD    2633           pushl    OUTFILE4
         67 04 FB     2639           calls    #4,(r7)
            51 D4     263C           clrl     r1
      3A 5C A541 91   263E           cmpb     92(r5)[r1],#58
            0C 13     2643           beql     sym.201
            50 D5     2645           tstl     r0
               01     2647           nop
                      2648   sym.200:
            51 D6     2648           incl     r1
      3A 5C A541 91   264A           cmpb     92(r5)[r1],#58
            F7 12     264F           bneq     sym.200
                      2651   sym.201:
         51 02 C2     2651           subl2    #2,r1
            53 D4     2654           clrl     r3
      52 FFEE CD 9E   2656           movab    -18(fp),r2
```

```
                  01      265B            nop
                          265C   sym.202:
         50 51  D0        265C            movl     r1,r0
            51  D6        265F            incl     r1
      82 5C A540 90       2661            movb     92(r5)[r0],(r2)+
         F2 53  04 F3     2666            aobleq   #4,r3,sym.202
            F3  AD 94     266A            clrb     -13(fp)
            1B  DD        266D            pushl    #27
         22A6 C4 DF       266F            pushal   8870(r4)
            69  DD        2673            pushl    (r9)
52 00000000* EF 9E        2675            movab    FPRINTF,r2
         62 03  FB        267C            calls    #3,(r2)
            EE  AD 9F     267F            pushab   -18(fp)
            1B  DD        2682            pushl    #27
         22AF C4 DF       2684            pushal   8879(r4)
            69  DD        2688            pushl    (r9)
         62 04  FB        268A            calls    #4,(r2)
            1B  DD        268D            pushl    #27
         22B9 C4 DF       268F            pushal   8889(r4)
            69  DD        2693            pushl    (r9)
         62 03  FB        2695            calls    #3,(r2)
            EE  AD 9F     2698            pushab   -18(fp)
            1B  DD        269B            pushl    #27
         22C2 C4 DF       269D            pushal   8898(r4)
            69  DD        26A1            pushl    (r9)
         62 04  FB        26A3            calls    #4,(r2)
            1B  DD        26A6            pushl    #27
         22CC C4 DF       26A8            pushal   8908(r4)
            6A  DD        26AC            pushl    (r10)
         62 03  FB        26AE            calls    #3,(r2)
            EE  AD 9F     26B1            pushab   -18(fp)
            1B  DD        26B4            pushl    #27
         22D5 C4 DF       26B6            pushal   8917(r4)
            6A  DD        26BA            pushl    (r10)
         62 04  FB        26BC            calls    #4,(r2)
            1B  DD        26BF            pushl    #27
         22E2 C4 DF       26C1            pushal   8930(r4)
            6A  DD        26C5            pushl    (r10)
         62 03  FB        26C7            calls    #3,(r2)
            EE  AD 9F     26CA            pushab   -18(fp)
            1B  DD        26CD            pushl    #27
         22EB C4 DF       26CF            pushal   8939(r4)
            6A  DD        26D3            pushl    (r10)
         62 04  FB        26D5            calls    #4,(r2)
            1B  DD        26D8            pushl    #27
         22F8 C4 DF       26DA            pushal   8952(r4)
            6B  DD        26DE            pushl    (r11)
         62 03  FB        26E0            calls    #3,(r2)
            EE  AD 9F     26E3            pushab   -18(fp)
            1B  DD        26E6            pushl    #27
         2301 C4 DF       26E8            pushal   8961(r4)
            6B  DD        26EC            pushl    (r11)
         62 04  FB        26EE            calls    #4,(r2)
            1B  DD        26F1            pushl    #27
         230B C4 DF       26F3            pushal   8971(r4)
            6B  DD        26F7            pushl    (r11)
         62 03  FB        26F9            calls    #3,(r2)
```

```
         EE AD 9F       26FC              pushab    -18(fp)
            1B DD       26FF              pushl     #27
      2314 C4 DF        2701              pushal    8980(r4)
            6B DD       2705              pushl     (r11)
         62 04 FB       2707              calls     #4,(r2)
            1B DD       270A              pushl     #27
      231E C4 DF        270C              pushal    8990(r4)
  00000000 EF DD        2710              pushl     OUTFILE4
         62 03 FB       2716              calls     #3,(r2)
         EE AD 9F       2719              pushab    -18(fp)
            1B DD       271C              pushl     #27
      2327 C4 DF        271E              pushal    8999(r4)
  00000000 EF DD        2722              pushl     OUTFILE4
         62 04 FB       2728              calls     #4,(r2)
            1B DD       272B              pushl     #27
      2331 C4 DF        272D              pushal    9009(r4)
  00000000 EF DD        2731              pushl     OUTFILE4
         62 03 FB       2737              calls     #3,(r2)
         EE AD 9F       273A              pushab    -18(fp)
            1B DD       273D              pushl     #27
      233A C4 DF        273F              pushal    9018(r4)
  00000000 EF DD        2743              pushl     OUTFILE4
         62 04 FB       2749              calls     #4,(r2)
               04       274C              ret
                        274D    snooze:
             0FFC       274D              .entry    snooze,^m<r2,r3,
         5E 10 C2       274F              subl2     #16,
  58 00000000 EF 9E     2752              movab     SCHAR_TRING_CON
  5A 00000000 EF 9E     2759              movab     HEYPRINT,r10
  57 00000000 EF 9E     2760              movab     DATE7,r7
  58 00000000 EF 9E     2767              movab     NUMB_READINGS,r1
  59 00000000 EF 9E     276E              movab     PREVDATE7,r9
  56 00000000 EF 9E     2775              movab     SDATA,r6
  F0 AD 2344 C8 0C 28   277C              movc3     #12,9023(r8),-16
         02 6A D1       2783              cmpl      (r10),#2
            0E 12       2786              bneq      sym.203
         0C AC DD       2788              pushl     12(ap)
      2350 C8 DF        278B              pushal    9040(r8)
  00000000* EF 02 FB    278F              calls     #2,PRINTF
                        2796    sym.203:
         0C AC D5       2796              tstl      12(ap)
            1D 13       2799              beql      tod
         08 AC DD       279B              pushl     8(ap)
  00000000* EF 01 FB    279E              calls     #1,SLEEP
         02 6A D1       27A5              cmpl      (r10),#2
            0E 12       27A8              bneq      sym.204
         08 AC DD       27AA              pushl     8(ap)
      236E C8 DF        27AD              pushal    9070(r8)
  00000000* EF 02 FB    27B1              calls     #2,PRINTF
                        27B8    sym.204:
                        27B8    tod:
         76 A6 9F       27B8              pushab    118(r6)
  00000000* EF 01 FB    27BB              calls     #1,LIB$DATE_TIME
            53 50 D0    27C2              movl      r0,r3
  52 53 FFFFFFFE 8F CB  27C5              bicl3     #-2,r3,r2
            01 52 D1    27CD              cmpl      r2,#1
               14 13    27D0              beql      sym.205
```

| | | | |
|---|---|---|---|
| 23A3 C8 DF | 27D2 | pushal | 9123(r8) |
| 00000000* EF 01 FB | 27D6 | calls | #1,PRINTF |
| 53 DD | 27DD | pushl | r3 |
| 00000000* EF 01 FB | 27DF | calls | #1,LIB$STOP |
| | 27E6 | sym.205: | |
| 73 A6 94 | 27E6 | clrb | 115(r6) |
| 00000000 EF 9F | 27E9 | pushab | CUR_INT |
| 76 A6 9F | 27EF | pushab | 118(r6) |
| 00000000* EF 02 FB | 27F2 | calls | #2,SYS$BINTIM |
| 52 50 FFFFFFFE 8F CB | 27F9 | bicl3 | #-2,r0,r2 |
| 01 52 D1 | 2801 | cmpl | r2,#1 |
| 09 13 | 2804 | beql | sym.206 |
| 50 DD | 2806 | pushl | r0 |
| 00000000* EF 01 FB | 2808 | calls | #1,LIB$STOP |
| | 280F | sym.206: | |
| 02 6A D1 | 280F | cmpl | (r10),#2 |
| 0E 12 | 2812 | bneq | sym.207 |
| 5C A6 DF | 2814 | pushal | 92(r6) |
| 23CB C8 DF | 2817 | pushal | 9163(r8) |
| 00000000* EF 02 FB | 281B | calls | #2,PRINTF |
| | 2822 | sym.207: | |
| 00000000 EF 9F | 2822 | pushab | CUR_INT |
| 67 9F | 2828 | pushab | (r7) |
| 00000000* EF 02 FB | 282A | calls | #2,SYS$NUMTIM |
| 02 6A D1 | 2831 | cmpl | (r10),#2 |
| 0B 12 | 2834 | bneq | sym.208 |
| 23F1 C8 DF | 2836 | pushal | 9201(r8) |
| 00000000* EF 01 FB | 283A | calls | #1,PRINTF |
| | 2841 | sym.208: | |
| 02 6A D1 | 2841 | cmpl | (r10),#2 |
| 26 12 | 2844 | bneq | sym.209 |
| 7E 0C A7 32 | 2846 | cvtwl | 12(r7),-(sp) |
| 7E 0A A7 32 | 284A | cvtwl | 10(r7),-(sp) |
| 7E 08 A7 32 | 284E | cvtwl | 8(r7),-(sp) |
| 7E 06 A7 32 | 2852 | cvtwl | 6(r7),-(sp) |
| 7E 67 32 | 2856 | cvtwl | (r7),-(sp) |
| 7E 02 A7 32 | 2859 | cvtwl | 2(r7),-(sp) |
| 7E 04 A7 32 | 285D | cvtwl | 4(r7),-(sp) |
| 2436 C8 DF | 2861 | pushal | 9270(r8) |
| 00000000* EF 08 FB | 2865 | calls | #8,PRINTF |
| | 286C | sym.209: | |
| 6B D6 | 286C | incl | (r11) |
| 00000000 EF 6B D1 | 286E | cmpl | (r11),MAX_READS |
| 31 12 | 2875 | bneq | sym.212 |
| 02 00000000 EF D1 | 2877 | cmpl | HEYPRINT4,#2 |
| 0B 12 | 287E | bneq | sym.210 |
| 2465 C8 DF | 2880 | pushal | 9317(r8) |
| 00000000* EF 01 FB | 2884 | calls | #1,PRINTF |
| | 288B | sym.210: | |
| 02 00000000 EF D1 | 288B | cmpl | HEYPRINT4,#2 |
| 0B 12 | 2892 | bneq | sym.211 |
| 24A8 C8 DF | 2894 | pushal | 9384(r8) |
| 00000000* EF 01 FB | 2898 | calls | #1,PRINTF |
| | 289F | sym.211: | |
| 04 BC 03 D0 | 289F | movl | #3,a4(ap) |
| 009E 31 | 28A3 | brw | endsnooze |
| 50 D5 | 28A6 | tstl | r0 |

```
                          28A8  sym.212:
     53 0A A7 32          28A8        cvtwl   10(r7),r3
     52 08 A7 32          28AC        cvtwl   8(r7),r2
        52 3C C4          28B0        mull2   #60,r2
        53 52 C0          28B3        addl2   r2,r3
     52 06 A7 32          28B6        cvtwl   6(r7),r2
  52 00000E10 8F C4       28BA        mull2   #3600,r2
        53 52 C0          28C1        addl2   r2,r3
     53 08 AC C0          28C4        addl2   8(ap),r3
  00015180 8F 53 D1       28C8        cmpl    r3,#86400
           06 18          28CF        bgeq    sym.213
     1D 0C AC D1          28D1        cmpl    12(ap),#29
           49 12          28D5        bneq    sym.216
                          28D7  sym.213:
        02 6A D1          28D7        cmpl    (r10),#2
           03 12          28DA        bneq    sym.214
        24F0 C8 DF        28DC        pushal  9456(r8)
  00000000* EF 01 FB      28E0        calls   #1,PRINTF
                          28E7  sym.214:
     04 8C 02 D0          28E7        movl    #2,a4(ap)
        02 6A D1          28EB        cmpl    (r10),#2
           08 12          28EE        bneq    sym.215
        251F C8 DF        28F0        pushal  9503(r8)
  00000000* EF 01 FB      28F4        calls   #1,PRINTF
                          28FB  sym.215:
           69 67 80       28FB        movw    (r7),(r9)
     02 A9 02 A7 80       28FE        movw    2(r7),2(r9)
     04 A9 04 A7 80       2903        movw    4(r7),4(r9)
     06 A9 06 A7 80       2908        movw    6(r7),6(r9)
     08 A9 08 A7 80       290D        movw    8(r7),8(r9)
     0A A9 0A A7 80       2912        movw    10(r7),10(r9)
     0C A9 0C A7 80       2917        movw    12(r7),12(r9)
           26 11          291C        brb     sym.218
           50 D5          291E        tstl    r0
                          2920  sym.216:
        02 6A D1          2920        cmpl    (r10),#2
           08 12          2923        bneq    sym.217
        2541 C8 DF        2925        pushal  9537(r8)
  00000000* EF 01 FB      2929        calls   #1,PRINTF
                          2930  sym.217:
     04 8C 01 D0          2930        movl    #1,a4(ap)
        02 6A D1          2934        cmpl    (r10),#2
           08 12          2937        bneq    sym.218
        256A C8 DF        2939        pushal  9578(r8)
  00000000* EF 01 FB      293D        calls   #1,PRINTF
                          2944  sym.218:
                          2944  endsnooze:
        02 6A D1          2944        cmpl    (r10),#2
           0B 12          2947        bneq    sym.219
        258B C8 DF        2949        pushal  9611(r8)
  00000000* EF 01 FB      294D        calls   #1,PRINTF
                          2954  sym.219:
              04          2954        ret
                          2955  get_snooze_time:
            001C          2955        .entry  get_snooze_time,
        5E 10 C2          2957        subl2   #16,sp
  53 00000000 EF 9E       295A        movab   SCHAR_STRING_CON
```

```
         54 00000000 EF 9E    2961         movab    HEYPRINT4,r4
                  02 64 D1    2968         cmpl     (r4),#2
                     0B 12    296B         bneq     sym.220
                  25A3 C3 DF  296D         pushal   9635(r3)
         00000000* EF 01 FB   2971         calls    #1,PRINTF
                              2978  sym.220:
                  02 64 D1    2978         cmpl     (r4),#2
                     0B 12    297B         bneq     sym.221
                  25CA C3 DF  297D         pushal   9674(r3)
         00000000* EF 01 FB   2981         calls    #1,PRINTF
                              2988  sym.221:
                     F0 AD DF 2988         pushal   -16(fp)
                     F4 AD DF 298B         pushal   -12(fp)
                     F8 AD DF 298E         pushal   -8(fp)
                  25F5 C3 DF  2991         pushal   9717(r3)
         00000000* EF 04 FB   2995         calls    #4,SCANF
                        52 D4 299C         clrl     r2
                     F8 AD D5 299E         tstl     -8(fp)
                        02 12 29A1         bneq     vcg.14
                        52 D6 29A3         incl     r2
                              29A5  vcg.14:
                        50 D4 29A5         clrl     r0
                     F4 AD D5 29A7         tstl     -12(fp)
                        02 12 29AA         bneq     vcg.15
                        50 D6 29AC         incl     r0
                              29AE  vcg.15:
                     52 52 D2 29AE         mcoml    r2,r2
                  52 50 52 CB 29B1         bicl3    r2,r0,r2
                        50 D4 29B5         clrl     r0
                     F0 AD D5 29B7         tstl     -16(fp)
                        02 12 29BA         bneq     vcg.16
                        50 D6 29BC         incl     r0
                              29BE  vcg.16:
                     52 52 D2 29BE         mcoml    r2,r2
                  52 50 52 CB 29C1         bicl3    r2,r0,r2
                        09 13 29C5         beql     sym.222
                  04 BC 08 D0 29C7         movl     #8,34(ap)
                        1A 11 29CB         brb      sym.223
                        50 D5 29CD         tstl     r0
                           01 29CF         nop
                              29D0  sym.222:
               52 F4 AD 3C C5 29D0         mull3    #60,-12(fp),r2
                  52 F0 AD C0 29D5         addl2    -16(fp),r2
        51 F8 AD 00000E10 8F C5 29D9        mull3    #3600,-8(fp),r1
                  04 BC 51 52 C1 29E2      addl3    r2,r1,34(ap)
                              29E7  sym.223:
                  02 64 D1    29E7         cmpl     (r4),#2
                     0E 12    29EA         bneq     sym.224
                  04 BC DD    29EC         pushl    34(ap)
                  25FE C3 DF  29EF         pushal   9726(r3)
         00000000* EF 02 FB   29F3         calls    #2,PRINTF
                              29FA  sym.224:
                           04 29FA         ret
                              29FB  readguage:
```

```
                       03FC    29FB            .entry   readguage,^m<r2,
              5E 18 C2         29FD            subl2    #24,sp
      53 00000000 EF 9E        2A00            movab    $CHAR_STRING_CON
      57 00000000 EF 9E        2A07            movab    HEYPRINT2,r7
                    F8 AD DF   2A0E            pushal   -8(fp)
              52 10 AC D0      2A11            movl     16(ap),r2
                       52 DD   2A15            pushl    r2
         00000000* EF 02 FB    2A17            calls    #2,RD_OMEGA
                    0F 52 D1   2A1E            cmpl     r2,#15
                       3C 12   2A21            bneq     sym.225
      50 0C AC 00000058 8F C5  2A23            mull3    #88,12(ap),r0
              51 52 02 78      2A2C            ashl     #2,r2,r1
                 51 50 C0      2A30            addl2    r0,r1
              50 08 AC D0      2A33            movl     8(ap),r0
              50 0A A041 9E    2A37            movab    10(r0)[r1],r0
                 60 F8 AD 50   2A3C            movf     -8(fp),(r0)
                 50 F8 AD 4A   2A40            cvtfl    -8(fp),r0
      02 00000000 EF D1        2A44            cmpl     HEYPRINT,#2
                       12 12   2A48            bneq     sym.225
                       50 DD   2A4D            pushl    r0
                       52 DD   2A4F            pushl    r2
                    0C AC DD   2A51            pushl    12(ap)
                 2626 C3 DF    2A54            pushal   9766(r3)
         00000000* EF 04 FB    2A58            calls    #4,PRINTF
                                2A5F   sym.225:
              56 10 AC D0      2A5F            movl     16(ap),r6
                       50 D4   2A63            clrl     r0
                    10 56 D1   2A65            cmpl     r6,#16
                       02 19   2A68            blss     vcg.17
                       50 D6   2A6A            incl     r0
                                2A6C   vcg.17:
                       51 D4   2A6C            clrl     r1
                    13 56 D1   2A6E            cmpl     r6,#19
                       02 14   2A71            bgtr     vcg.18
                       51 D6   2A73            incl     r1
                                2A75   vcg.18:
                    50 50 D2   2A75            mcoml    r0,r0
                 50 51 50 CA   2A78            bicl3    r0,r1,r0
                       03 12   2A7C            bneq     gen.27
                     00E7 31   2A7E            brw      sym.232
                                2A81   gen.27:
                 52 F8 AD 50   2A81            movf     -8(fp),r2
                    54 52 56   2A85            cvtfd    r2,r4
                 D58B CF 54 71 2A88            cmpd     r4,$CODE+24
                       1D 18   2A8D            bgeq     sym.226
      58 54 000000006B234F6E 8F 65  2A8F       muld3    #1797803886,r4,r
                 2644 C3 DF    2A98            pushal   9796(r3)
                    E9 AD DF   2A9F            pushal   -23(fp)
         00000000* EF 02 FB    2AA2            calls    #2,STRCPY
                       57 11   2AA9            brb      show
                          01   2AAB            nop
                                2AAC   sym.226:
                 D56F CF 54 71 2AAC            cmpd     r4,$CODE+32
                       1D 18   2A91            bgeq     sym.227
      58 54 0000000024004A74 8F 65  2A93       muld3    #603993836,r4,r8
                 2650 C3 DF    2ABF            pushal   9808(r3)
```

```
                    E9 AD DF   2AC3           pushal  -23(fp)
           00000000* EF 02 FB  2AC6           calls   #2,STRCPY
                       33 11   2ACD           brb     show
                          01   2ACF           nop
                               2AD0   sym.227:
                    08 52 51   2AD0           cmpf    r2,#8
                       1F 18   2AD3           bgeq    sym.228
  58 54 000000000000457A 8F 65 2AD5           muld3   #17786,r4,r3
                    265C C3 DF 2AE1           pushal  9820(r3)
                    E9 AD DF   2AE5           pushal  -23(fp)
           00000000* EF 02 FB  2AE8           calls   #2,STRCPY
                       11 11   2AEF           brb     show
                       50 D5   2AF1           tstl    r0
                          01   2AF3           nop
                               2AF4   sym.228:
                    2668 C3 DF 2AF4           pushal  9832(r3)
                    E9 AD DF   2AF8           pushal  -23(fp)
           00000000* EF 02 FB  2AFB           calls   #2,STRCPY
                               2B02   show:
                    50 58 6A   2B02           cvtdl   r8,r0
                    02 67 D1   2B05           cmpl    (r7),#2
                       16 12   2B08           bneq    sym.229
                    E9 AD DF   2B0A           pushal  -23(fp)
                       50 DD   2B0D           pushl   r0
                    10 AC DD   2B0F           pushl   16(ap)
                    0C AC DD   2B12           pushl   12(ap)
                    2674 C3 DF 2B15           pushal  9844(r3)
           00000000* EF 05 FB  2B19           calls   #5,PRINTF
                               2B20   sym.229:
                    02 67 D1   2B20           cmpl    (r7),#2
                       0F 12   2B23           bneq    sym.230
                    7E F8 AD 56 2B25          cvtfd   -8(fp),-(sp)
                    26A0 C3 DF 2B29           pushal  9888(r3)
           00000000* EF 03 FB  2B2D           calls   #3,PRINTF
                               2B34   sym.230:
                    02 67 D1   2B34           cmpl    (r7),#2
                       0E 12   2B37           bneq    sym.231
                    7E 53 70   2B39           movd    r8,-(sp)
                    26D8 C3 DF 2B3C           pushal  9944(r3)
           00000000* EF 03 FB  2B40           calls   #3,PRINTF
                               2B47   sym.231:
  50 0C AC 00000058 8F C5      2B47           mull3   #88,12(ap),r0
  51 10 AC 02 78               2B50           ashl    #2,16(ap),r1
           51 50 C0            2B55           addl2   r0,r1
           50 08 AC D0         2B58           movl    8(ap),r0
           50 0A A041 9E       2B5C           movab   10(r0)[r1],r0
           60 F8 AD 50         2B61           movf    -8(fp),(r0)
                       04      2B65           ret
                       50 D5   2B66           tstl    r0
                               2B68   sym.232:
  50 0C AC 00000058 8F C5      2B68           mull3   #88,12(ap),r0
           56 56 02 78         2B71           ashl    #2,r6,r6
              56 50 C0         2B75           addl2   r0,r6
           50 08 AC D0         2B78           movl    8(ap),r0
           50 0A A046 9E       2B7C           movab   10(r0)[r6],r0
           60 F8 AD 50         2B81           movf    -8(fp),(r0)
```

```
                     04        2B85            ret
                               2B86    to_show_torr:
                     00FC      2B86            .entry  to_show_torr,^m<
             5E 04 C2          2B88            subl2   #4,sp
    53 00000000 EF 9E          2B89            movab   $CHAR_STRING_CON
             54 04 AC 70       2B92            movd    4(ap),r4
           D47D CF 54 71       2B96            cmpd    r4,$CODE+24
                     1F 18     2B9B            bgeq    sym.233
 5654 0000000068284F6E 8F 65   2B9D            muld3   #1797803886,r4,r
                  2710 C3 DF   2BA9            pushal  10000(r3)
                     10 AC DD  2BAD            pushl   16(ap)
          00000000* EF 02 FB   2BB0            calls   #2,STRCPY
                     5C 11     2BB7            brb     show
                     50 D5     2BB9            tstl    r0
                     01        2BBB            nop
                               2BBC    sym.233:
           D45F CF 54 71       2BBC            cmpd    r4,$CODE+32
                     1D 18     2BC1            bgeq    sym.234
 5654 0000000024004A74 8F 65   2BC3            muld3   #603998836,r4,r6
                  2717 C3 DF   2BCF            pushal  10007(r3)
                     10 AC DD  2BD3            pushl   16(ap)
          00000000* EF 02 FB   2BD6            calls   #2,STRCPY
                     36 11     2BDD            brb     show
                     01        2BDF            nop
                               2BE0    sym.234:
                     08 54 71  2BE0            cmpd    r4,#8
                     1F 18     2BE3            bgeq    sym.235
 5654 000000000000457A 8F 65   2BE5            muld3   #17786,r4,r6
                  271E C3 DF   2BF1            pushal  10014(r3)
                     10 AC DD  2BF5            pushl   16(ap)
          00000000* EF 02 FB   2BF8            calls   #2,STRCPY
                     14 11     2BFF            brb     show
                     50 D5     2C01            tstl    r0
                     01        2C03            nop
                               2C04    sym.235:
                     56 54 70  2C04            movd    r4,r6
                  2725 C3 DF   2C07            pushal  10021(r3)
                     10 AC DD  2C0B            pushl   16(ap)
          00000000* EF 02 FB   2C0E            calls   #2,STRCPY
                               2C15    show:
                     52 56 6A  2C15            cvtdl   r6,r2
       02 00000000 EF D1       2C18            cmpl    HEYPRINT2,#2
                     10 12     2C1F            bneq    sym.236
                     10 AC DD  2C21            pushl   16(ap)
                     52 DD     2C24            pushl   r2
                  272C C3 DF   2C26            pushal  10028(r3)
          00000000* EF 03 FB   2C2A            calls   #3,PRINTF
                               2C31    sym.236:
                     0C BC 52 D0 2C31         movl    r2,a12(ap)
       02 00000000 EF D1       2C35            cmpl    HEYPRINT2,#2
                     0B 12     2C3C            bneq    sym.237
                  2743 C3 DF   2C3E            pushal  10056(r3)
          00000000* EF 01 FB   2C42            calls   #1,PRINTF
                               2C49    sym.237:
                     04        2C49            ret
                               2C4A    w_omega:
```

```
                    000C    2C4A           .entry   w_omega,^m<r2,r3
         5E AC AE 9E        2C4C           movab    -84(sp),sp
52 00000000 EF 9E           2C50           movab    $CHAR_STRING_CON
53 00000000 EF 9E           2C57           movab    HEYPRINT,r3
            2761 C2 DF      2C5E           pushal   10081(r2)
                  AC AD DF  2C62           pushal   -84(fp)
   00000000* EF 02 FB       2C65           calls    #2,STRCPY
            B8 AD 0D 90     2C6C           movb     #13,-72(fp)
            BA AD 0A 90     2C70           movb     #10,-70(fp)
               B3 AD 94     2C74           clrb     -69(fp)
            BC AD 0D 90     2C77           movb     #13,-68(fp)
            BD AD 0D 90     2C7B           movb     #13,-67(fp)
               BE AD 94     2C7F           clrb     -66(fp)
               02 63 D1     2C82           cmpl     (r3),#2
                  0E 12     2C85           bneq     sym.238
                AC AD 9F    2C87           pushab   -84(fp)
            276E C2 DF      2C8A           pushal   10094(r2)
   00000000* EF 02 FB       2C8E           calls    #2,PRINTF
                            2C95  sym.238:
                  AC AD DF  2C95           pushal   -84(fp)
          00000000 EF DD    2C98           pushl    OUTFILE6
   00000000* EF 02 FB       2C9E           calls    #2,FPRINTF
               02 63 D1     2CA5           cmpl     (r3),#2
                  0B 12     2CA8           bneq     sym.239
            2783 C2 DF      2CAA           pushal   10123(r2)
   00000000* EF 01 FB       2CAE           calls    #1,PRINTF
                            2CB5  sym.239:
               02 63 D1     2CB5           cmpl     (r3),#2
                  0B 12     2CB8           bneq     sym.240
            27B0 C2 DF      2CBA           pushal   10160(r2)
   00000000* EF 01 FB       2CBE           calls    #1,PRINTF
                            2CC5  sym.240:
            27E4 C2 DF      2CC5           pushal   10212(r2)
                  AC AD DF  2CC9           pushal   -84(fp)
   00000000* EF 02 FB       2CCC           calls    #2,STRCPY
            DA AD 0D 90     2CD3           movb     #13,-3^'fp)
            D9 AD 0A 90     2CD7           movb     #10,-3. fp)
               DC AD 94     2CDB           clrb     -36(fp)
               02 63 D1     2CDE           cmpl     (r3),#2
                  0E 12     2CE1           bneq     sym.241
                AC AD 9F    2CE3           pushab   -84(fp)
            2313 C2 DF      2CE6           pushal   10259(r2)
   00000000* EF 02 FB       2CEA           calls    #2,PRINTF
                            2CF1  sym.241:
                  AC AD DF  2CF1           pushal   -84(fp)
          00000000 EF DD    2CF4           pushl    OUTFILE6
   00000000* EF 02 FB       2CFA           calls    #2,FPRINTF
               02 63 D1     2D01           cmpl     (r3),#2
                  0B 12     2D04           bneq     sym.242
            2830 C2 DF      2D06           pushal   10238(r2)
   00000000* EF 01 FB       2D0A           calls    #1,PRINTF
                            2D11  sym.242:
                     04     2D11           ret
                            2D12  rd_omega:
                   07FC     2D12           .entry   rd_omega,^m<r2,r
               5E 24 C2     2D14           subl2    #36,sp
```

```
55 00000000 EF 9E   2D17              movab    PEEKING,r5
53 00000000 EF 9E   2D1E              movab    T,r3
58 00000000 EF 9E   2D25              movab    COMMAND,r8
54 00000000 EF 9E   2D2C              movab    $CHAR_STRING_CON
57 00000000 EF 9E   2D33              movab    HEYPRINT,r7
         02 67 D1   2D3A              cmpl     (r7),#2
            0B 12   2D3D              bneq     sym.243
         2368 C4 DF 2D3F              pushal   10344(r4)
00000000* EF 01 FB  2D43              calls    #1,PRINTF
                    2D4A  sym.243:
            52 D4   2D4A              clrl     r2
         02 67 D1   2D4C              cmpl     (r7),#2
            0B 12   2D4F              bneq     sym.244
         238C C4 DF 2D51              pushal   10380(r4)
00000000* EF 01 FB  2D55              calls    #1,PRINTF
                    2D5C  sym.244:
            59 7C   2D5C              clrq     r9
         02 67 D1   2D5E              cmpl     (r7),#2
            0D 12   2D61              bneq     sym.245
            52 DD   2D63              pushl    r2
         238E C4 DF 2D65              pushal   10382(r4)
00000000* EF 02 FB  2D69              calls    #2,PRINTF
                    2D70  sym.245:
            52 D6   2D70              incl     r2
         51 04 AC D0 2D72             movl     4(ap),r1
            08 13   2D76              beql     new_command
         08 BC 6341 50 2D78           movf     (r3)[r1],8(ap)
            0390 31 2D7D              brw      alldone
                    2D80  new_command:
            50 5A D0 2D80              movl     r10,r0
            5A D6   2D83              incl     r10
         56 00000000 EF40 32 2D85     cvtwl    PRIME[r0],r6
            07 56 D1 2D8D              cmpl    r6,#7
            0E 12   2D90              bneq     sym.246
            05 DD   2D92              pushl    #5
00000000* EF 01 FB  2D94              calls    #1,SLEEP
            E3 11   2D9B              brb      new_command
            50 D5   2D9D              tstl     r0
               01   2D9F              nop
                    2DA0  sym.246:
            06 56 D1 2DA0              cmpl    r6,#6
            03 12   2DA3              bneq     gen.28
            0363 31 2DA5              brw      alldone
                    2DA8  gen.28:
            05 56 D1 2DA8              cmpl    r6,#5
            03 12   2DAB              bneq     gen.29
            0298 31 2DAD              brw      showit
                    2DB0  gen.29:
            04 56 D1 2DB0              cmpl    r6,#4
            03 12   2DB3              bneq     gen.30
            0358 31 2DB5              brw      snooze
                    2DB8  gen.30:
            01 56 D1 2DB8              cmpl    r6,#1
            03 13   2DBB              beql     gen.31
            0084 31 2DBD              brw      sym.251
                    2DC0  gen.31:
         02 67 D1   2DC0              cmpl     (r7),#2
```

```
              0B 12      2DC3             bneq     sym.247
         28AE C4 DF      2DC5             pushal   10414(r4)
   00000000* EF 01 FB    2DC9             calls    #1,PRINTF
                         2DD0    sym.247:
              15 59 D1   2DD0             cmpl     r9,#21
                 17 19   2DD3             blss     sym.249
              02 67 D1   2DD5             cmpl     (r7),#2
                 08 12   2DD8             bneq     sym.248
         28DF C4 DF      2DDA             pushal   10463(r4)
   00000000* EF 01 FB    2DDE             calls    #1,PRINTF
                         2DE5    sym.248:
   00000000* EF 00 FB    2DE5             calls    #0,EXIT
                         2DEC    sym.249:
           50 59 24 C5   2DEC             mull3    #36,r9,r0
   00000000 EF40 9F      2DF0             pushab   LITTLE_LIST[r0]
                 63 9F   2DF7             pushab   (r8)
   00000000* EF 02 FB    2DF9             calls    #2,STRCPY
                 59 D6   2E00             incl     r9
                 52 D4   2E02             clrl     r2
                         2E04    loopkb:
              50 52 D0   2E04             movl     r2,r0
                 52 D6   2E07             incl     r2
           50 6840 90    2E09             movb     (r8)[r0],r0
           7A 8F 50 91   2E0D             cmpb     r0,#122
                 F1 12   2E11             bneq     loopkb
                 52 D7   2E13             decl     r2
              6842 0D 90 2E15             movb     #13,(r8)[r2]
                 52 D6   2E19             incl     r2
              50 52 D0   2E1B             movl     r2,r0
                 52 D6   2E1E             incl     r2
              6840 0A 90 2E20             movb     #10,(r8)[r0]
                 6842 94 2E24             clrb     (r8)[r2]
              02 67 D1   2E27             cmpl     (r7),#2
                 0D 12   2E2A             bneq     sym.250
                 63 9F   2E2C             pushab   (r8)
              2905 C4 DF 2E2E             pushal   10501(r4)
   00000000* EF 02 FB    2E32             calls    #2,PRINTF
                         2E39    sym.250:
                 01 DD   2E39             pushl    #1
   00000000* EF 01 FB    2E3B             calls    #1,SLEEP
   00000000  EF DD       2E42             pushl    OUTFILE6
                 68 DF   2E48             pushal   (r8)
   00000000* EF 02 FB    2E4A             calls    #2,FPUTS
   00000000  EF 50 D0    2E51             movl     r0,FPUTS_STAT
              02 67 D1   2E58             cmpl     (r7),#2
                 03 13   2E5B             beql     gen.32
                 FF20 31 2E5D             brw      new_command
                         2E60    gen.32:
   00000000  EF DD       2E60             pushl    FPUTS_STAT
         291E C4 DF      2E66             pushal   10526(r4)
   00000000* EF 02 FB    2E6A             calls    #2,PRINTF
                 FF0C 31 2E71             brw      new_command
                         2E74    sym.251:
              02 56 D1   2E74             cmpl     r6,#2
                 12 13   2E77             beql     sym.252
              03 56 D1   2E79             cmpl     r6,#3
```

```
            0D 13      2E7C              beql    sym.252
         03 56 D1      2E7E              cmpl    r6,#8
            0B 13      2E81              beql    sym.252
         09 56 D1      2E83              cmpl    r6,#9
            03 13      2E86              beql    gen.33
         01BD 31       2E88              brw     sym.265
                       2E8B   gen.33:
                       2E8B   sym.252:
         02 67 D1      2E8B              cmpl    (r7),#2
            0B 12      2E8E              bneq    sym.253
         2938 C4 DF    2E90              pushal  10552(r4)
00000000* EF 01 FB     2E94              calls   #1,PRINTF
                       2E9B   sym.253:
                       2E9B   getagain:
            51 D4      2E9B              clrl    r1
            50 65 9E   2E9D              movab   (r5),r0
                       2EA0   sym.254:
            80 94      2EA0              clrb    (r0)+
F6 51 0000004F 8F F3   2EA2              aobleq  #79,r1,sym.254
         02 67 D1      2EAA              cmpl    (r7),#2
            0B 12      2EAD              bneq    sym.255
         295E C4 DF    2EAF              pushal  10590(r4)
00000000* EF 01 FB     2EB3              calls   #1,PRINTF
                       2EBA   sym.255:
            01 DD      2EBA              pushl   #1
00000000* EF 01 FB     2EBC              calls   #1,SLEEP
         02 67 D1      2EC3              cmpl    (r7),#2
            0B 12      2EC6              bneq    sym.256
         299E C4 DF    2EC8              pushal  10654(r4)
00000000* EF 01 FB     2ECC              calls   #1,PRINTF
                       2ED3   sym.256:
   00000000 EF DD      2ED3              pushl   INFILE6
      7E 50 8F 9A      2ED9              movzbl  #80,-(sp)
            65 9F      2EDD              pushab  (r5)
00000000* EF 03 FB     2EDF              calls   #3,FGETS
   00000000 EF 50 D0   2EE6              movl    r0,FGETS_STAT
         02 67 D1      2EED              cmpl    (r7),#2
            13 12      2EF0              bneq    sym.257
   00000000 EF DD      2EF2              pushl   FGETS_STAT
            65 9F      2EF3              pushab  (r5)
         29C7 C4 DF    2EFA              pushal  10695(r4)
00000000* EF 03 FB     2EFE              calls   #3,PRINTF
                       2F05   sym.257:
            65 95      2F05              tstb    (r5)
            05 13      2F07              beql    sym.258
         23 65 91      2F09              cmpb    (r5),#35
            16 12      2F0C              bneq    sym.259
                       2F0E   sym.258:
         02 67 D1      2F0E              cmpl    (r7),#2
            89 12      2F11              bneq    getagain
         29ED C4 DF    2F13              pushal  10733(r4)
00000000* EF 01 FB     2F17              calls   #1,PRINTF
            FF7A 31    2F1E              brw     getagain
            50 D5      2F21              tstl    r0
               01      2F23              nop
                       2F24   sym.259:
```

```
            02 67 D1    2F24           cmpl    (r7),#2
               0D 12    2F27           bneq    sym.260
               65 9F    2F29           pushab  (r5)
         29EF C4 DF     2F2B           pushal  10735(r4)
00000000* EF 02 FB      2F2F           calls   #2,PRINTF
                        2F36   sym.260:
            02 56 D1    2F36           cmpl    r6,#2
               25 12    2F39           bneq    sym.261
            18 A3 9F    2F3B           pushab  24(r3)
            14 A3 9F    2F3E           pushab  20(r3)
            10 A3 9F    2F41           pushab  16(r3)
            0C A3 9F    2F44           pushab  12(r3)
            08 A3 9F    2F47           pushab  8(r3)
            04 A3 9F    2F4A           pushab  4(r3)
               63 9F    2F4D           pushab  (r3)
         29F3 C4 DF     2F4F           pushal  10739(r4)
               65 9F    2F53           pushab  (r5)
00000000* EF 09 FB      2F55           calls   #9,SSCANF
              FE21 31   2F5C           brw     new_command
                  01    2F5F           nop
                        2F60   sym.261:
            03 56 D1    2F60           cmpl    r6,#3
               27 12    2F63           bneq    sym.262
            38 A3 9F    2F65           pushab  56(r3)
            34 A3 9F    2F68           pushab  52(r3)
            30 A3 9F    2F6B           pushab  48(r3)
            2C A3 9F    2F6E           pushab  44(r3)
            28 A3 9F    2F71           pushab  40(r3)
            24 A3 9F    2F74           pushab  36(r3)
            20 A3 9F    2F77           pushab  32(r3)
         2A08 C4 DF     2F7A           pushal  10760(r4)
               65 9F    2F7E           pushab  (r5)
00000000* EF 09 FB      2F80           calls   #9,SSCANF
              FDF6 31   2F87           brw     new_command
                50 D5   2F8A           tstl    r0
                        2F8C   sym.262:
            09 56 D1    2F8C           cmpl    r6,#9
               03 13    2F8F           beql    gen.34
              0090 31   2F91           brw     sym.264
                        2F94   gen.34:
            DC AD 9F    2F94           pushab  -36(fp)
            E0 AD 9F    2F97           pushab  -32(fp)
            E4 AD 9F    2F9A           pushab  -28(fp)
            E8 AD 9F    2F9D           pushab  -24(fp)
            EC AD 9F    2FA0           pushab  -20(fp)
            F0 AD 9F    2FA3           pushab  -16(fp)
            F4 AD 9F    2FA6           pushab  -12(fp)
            F8 AD 9F    2FA9           pushab  -8(fp)
         2A1D C4 DF     2FAC           pushal  10781(r4)
               65 9F    2FB0           pushab  (r5)
00000000* EF 0A FB      2FB2           calls   #10,SSCANF
         52 F8 AD 07 78 2FB9           ashl    #7,-8(fp),r2
         50 F4 AD 06 78 2FBE           ashl    #6,-12(fp),r0
             52 50 C0   2FC3           addl2   r0,r2
         50 F0 AD 05 78 2FC6           ashl    #5,-16(fp),r0
             52 50 C0   2FCB           addl2   r0,r2
         50 EC AD 04 78 2FCE           ashl    #4,-20(fp),r0
```

```
            52 50 C0      2FD3           addl2    r0,r2
         50 E3 AD 03 73   2FD6           ashl     #3,-24(fp),r0
            52 50 C0      2FDB           addl2    r0,r2
         50 E4 AD 02 78   2FDE           ashl     #2,-28(fp),r0
            52 50 C0      2FE3           addl2    r0,r2
         50 E0 AD E0 AD C1 2FE6          addl3    -32(fp),-32(fp),
            52 50 C0      2FEC           addl2    r0,r2
            52 DC AD C0   2FEF           addl2    -36(fp),r2
            3C A3 52 4E   2FF3           cvtlf    r2,60(r3)
               02 67 D1   2FF7           cmpl     (r7),#2
                  0D 12   2FFA           bneq     sym.263
                  65 9F   2FFC           pushab   (r5)
            2A35 C4 DF    2FFE           pushal   10805(r4)
       00000000* EF 02 FB 3002           calls    #2,PRINTF
                          3009   sym.263:
               02 67 D1   3009           cmpl     (r7),#2
                  03 13   300C           beql     gen.35
                 FD 6F 31 300E           brw      new_command
                          3011   gen.35:
                  52 DD   3011           pushl    r2
                  52 DD   3013           pushl    r2
            2A57 C4 DF    3015           pushal   10839(r4)
       00000000* EF 03 FB 3019           calls    #3,PRINTF
                 FD 5D 31 3020           brw      new_command
                     01   3023           nop
                          3024   sym.264:
               08 56 D1   3024           cmpl     r6,#8
                  1F 12   3027           bneq     sym.265
                  4C A3 9F 3029          pushab   76(r3)
                  48 A3 9F 302C          pushab   72(r3)
                  44 A3 9F 302F          pushab   68(r3)
                  40 A3 9F 3032          pushab   64(r3)
            2A7E C4 DF    3035           pushal   10878(r4)
                  65 9F   3039           pushab   (r5)
       00000000* EF 06 FB 303B           calls    #6,SSCANF
                 FD 39 31 3042           brw      new_command
                  50 D5   3045           stl      r0
                     01   3047           nop
                          3048   sym.265:
                          3048   showit:
                  51 D4   3048           clrl     r1
            50 0000 C5 9E 304A          movab    0(r5),r0
                     01   304F           nop
                          3050   sym.266:
                  80 94   3050           clrb     (r0)+
        F6 51 0000004F 8F F3 3052       aobleq   #79,r1,sym.266
               02 67 D1   305A           cmpl     (r7),#2
                  1A 12   305D           bneq     sym.267
              7E 0C A3 56 305F           cvtfd    12(r3),-(sp)
              7E 08 A3 56 3063           cvtfd    8(r3),-(sp)
              7E 04 A3 56 3067           cvtfd    4(r3),-(sp)
                 7E 63 56 306B           cvtfd    (r3),-(sp)
            2A8A C4 DF    306E           pushal   10890(r4)
       00000000* EF 09 FB 3072           calls    #9,PRINTF
                          3079   sym.267:
               02 67 D1   3079           cmpl     (r7),#2
```

```
              17 12   307C           bneq      sym.268
       7E 18 A3 56   307E           cvtfd     24(r3),-(sp)
       7E 14 A3 56   3082           cvtfd     20(r3),-(sp)
       7E 10 A3 56   3086           cvtfd     16(r3),-(sp)
          2AAB C4 DF 303A           pushal    10923(r4)
00000000* EF 07 FB   303E           calls     #7,PRINTF
                     3095  sym.268:
          02 67 D1   3095           cmpl      (r7),#2
              19 12  3098           bneq      sym.269
       7E 2C A3 56   309A           cvtfd     44(r3),-(sp)
       7E 28 A3 56   309E           cvtfd     40(r3),-(sp)
       7E 24 A3 56   30A2           cvtfd     36(r3),-(sp)
       7E 20 A3 56   30A6           cvtfd     32(r3),-(sp)
          2AC8 C4 DF 30AA           pushal    10952(r4)
00000000* EF 09 FB   30AE           calls     #9,PRINTF
                     30B5  sym.269:
          02 67 D1   30B5           cmpl      (r7),#2
              17 12  30B8           bneq      sym.270
       7E 38 A3 56   30BA           cvtfd     56(r3),-(sp)
       7E 34 A3 56   30BE           cvtfd     52(r3),-(sp)
       7E 30 A3 56   30C2           cvtfd     48(r3),-(sp)
          2AE9 C4 DF 30C6           pushal    10985(r4)
00000000* EF 07 FB   30CA           calls     #7,PRINTF
                     30D1  sym.270:
          02 67 D1   30D1           cmpl      (r7),#2
              19 12  30D4           bneq      sym.271
       7E 4C A3 56   30D6           cvtfd     76(r3),-(sp)
       7E 48 A3 56   30DA           cvtfd     72(r3),-(sp)
       7E 44 A3 56   30DE           cvtfd     68(r3),-(sp)
       7E 40 A3 56   30E2           cvtfd     64(r3),-(sp)
          2B06 C4 DF 30E6           pushal    11014(r4)
00000000* EF 09 FB   30EA           calls     #9,PRINTF
                     30F1  sym.271:
        50 3C A3 4A  30F1           cvtfl     60(r3),r0
          02 67 D1   30F5           cmpl      (r7),#2
              03 13  30F8           beql      gen.36
             FC83 31 30FA           brw       new_command
                     30FD  gen.36:
              50 DD  30FD           pushl     r0
          2B33 C4 DF 30FF           pushal    11064(r4)
00000000* EF 02 FB   3103           calls     #2,PRINTF
             FC73 31 310A           brw       new_command
              50 D5  310D           tstl      r0
                 01  310F           nop
                     3110  snooze:
                     3110  alldone:
        50 04 AC D0  3110           movl      4(ap),r0
     08 8C 6340 50   3114           movf      (r3)[r0],a8(ap)
                 04  3119           ret
                     311A  openinput:
               0004  311A           .entry    openinput,^m<r2>
           5E 04 C2  311C           subl2     #4,sp
  5C 00000000 EF 9E  311F           movab     $CHAR_STRING_CON
  52 00000000 EF 9E  3126           movab     INFILE6,r2
  02 00000000 EF D1  312D           cmpl      HEYPRINT,#2
              09 12  3134           bneq      sym.272
```

```
          2B69 CC DF      3136           pushal    11113(ap)
00000000* EF 01 FB        313A           calls     #1,PRINTF
                          3141   sym.272:
00000000 EF 2B92 CC DE    3141           moval     11154(ap),DEV_6I
          2B98 CC DF      314A           pushal    11160(ap)
00000000 EF DD            314E           pushl     DEV_6IN
00000000* EF 02 FB        3154           calls     #2,FOPEN
          62 50 D0        3159           movl      r0,(r2)
          12 12           315E           bneq      sym.273
          2B9A CC DF      3160           pushal    11162(ap)
00000000* EF 01 FB        3164           calls     #1,PRINTF
00000000* EF 00 FB        3168           calls     #0,EXIT
                          3172   sym.273:
02 00000000 EF D1         3172           cmpl      HEYPRINT,#2
          OD 12           3179           bneq      sym.274
          62 DD           317B           pushl     (r2)
          2BC2 CC DF      317D           pushal    11202(ap)
00000000* EF 02 FB        3181           calls     #2,PRINTF
                          3183   sym.274:
          04              3188           ret
                          3189   openoutput:
          0004            3189           .entry    openoutput,^m<r2
          5E 04 C2        318B           subl2     #4,sp
5C 00000000 EF 9E         318E           movab     SCHAR_STRING_CON
52 00000000 EF 9E         3195           movab     OUTFILE6,r2
02 00000000 EF D1         319C           cmpl      HEYPRINT,#2
          0B 12           31A3           bneq      sym.275
          2BEE CC DF      31A5           pushal    11246(ap)
00000000* EF 01 FB        31A9           calls     #1,PRINTF
                          31B0   sym.275:
00000000 EF 2C18 CC DE    31B0           moval     11288(ap),DEV_6O
          2C1E CC DF      31B9           pushal    11294(ap)
00000000 EF DD            31BD           pushl     DEV_6OUT
00000000* EF 02 FB        31C3           calls     #2,FOPEN
          62 50 D0        31CA           movl      r0,(r2)
          12 12           31CD           bneq      sym.276
          2C21 CC DF      31CF           pushal    11297(ap)
00000000* EF 01 FB        31D3           calls     #1,PRINTF
00000000* EF 00 FB        31DA           calls     #0,EXIT
                          31E1   sym.276:
02 00000000 EF D1         31E1           cmpl      HEYPRINT,#2
          0D 12           31E8           bneq      sym.277
          62 DD           31EA           pushl     (r2)
          2C49 CC DF      31EC           pushal    11337(ap)
00000000* EF 02 FB        31F0           calls     #2,PRINTF
                          31F7   sym.277:
          04              31F7           ret
                          31F8   flatstat:
          001C            31F8           .entry    flatstat,^m<r2,r
          5E 04 C2        31FA           subl2     #4,sp
          51 08 AC D0     31FD           movl      8(ap),r1
          54 04 AC D0     3201           movl      4(ap),r4
          07 54 07 E1     3205           bbc       #7,r4,sym.278
          52 31 90        3209           movb      #49,r2
          05 11           320C           brb       sym.279
          50 D5           320E           tstl      r0
```

```
                    3210  sym.278:
      52 30 90      3210          movb    #48,r2
                    3213  sym.279:
      61 52 90      3213          movb    r2,(r1)
   06 54 06 E1      3216          bbc     #6,r4,sym.280
      53 31 90      321A          movb    #49,r3
         04 11      321D          brb     sym.281
            01      321F          nop
                    3220  sym.280:
      53 30 90      3220          movb    #48,r3
                    3223  sym.281:
   01 A1 53 90      3223          movb    r3,1(r1)
   05 54 05 E1      3227          bbc     #5,r4,sym.282
      52 31 90      322B          movb    #49,r2
         03 11      322E          brb     sym.283
                    3230  sym.282:
      52 30 90      3230          movb    #48,r2
                    3233  sym.283:
   02 A1 52 90      3233          movb    r2,2(r1)
   05 54 04 E1      3237          bbc     #4,r4,sym.284
      53 31 90      323B          movb    #49,r3
         03 11      323E          brb     sym.285
                    3240  sym.284:
      53 30 90      3240          movb    #48,r3
                    3243  sym.285:
   03 A1 53 90      3243          movb    r3,3(r1)
   05 54 03 E1      3247          bbc     #3,r4,sym.286
      52 31 90      324B          movb    #49,r2
         03 11      324E          brb     sym.287
                    3250  sym.286:
      52 30 90      3250          movb    #48,r2
                    3253  sym.287:
   04 A1 52 90      3253          movb    r2,4(r1)
   05 54 02 E1      3257          bbc     #2,r4,sym.288
      53 31 90      325B          movb    #49,r3
         03 11      325E          brb     sym.289
                    3260  sym.288:
      53 30 90      3260          movb    #48,r3
                    3263  sym.289:
   05 A1 53 90      3263          movb    r3,5(r1)
   05 54 01 E1      3267          bbc     #1,r4,sym.290
      50 31 90      326B          movb    #49,r0
         03 11      326E          brb     sym.291
                    3270  sym.290:
      50 30 90      3270          movb    #48,r0
                    3273  sym.291:
   06 A1 50 90      3273          movb    r0,6(r1)
      06 54 E9      3277          blbc    r4,sym.292
      52 31 90      327A          movb    #49,r2
         04 11      327D          brb     sym.293
            01      327F          nop
                    3280  sym.292:
      52 30 90      3280          movb    #48,r2
                    3283  sym.293:
   07 A1 52 90      3283          movb    r2,7(r1)
      08 A1 B4      3287          clrw    8(r1)
            04      328A          ret
```

```
           50 DD    1D65        pushl    r0
        66 04 F3    1D67        calls    #4,(r6)
           55 D6    1D6A        incl     r5
           1B DD    1D6C        pushl    #27
     1D4A C2 DF     1D6E        pushal   7498(r2)
           69 DD    1D72        pushl    (r9)
        68 03 F8    1D74        calls    #3,(r8)
   50 01E4 C3 9E    1D77        movab    484(r3),r0
   5C 01E4 C4 9E    1D7C        movab    484(r4),ap
           69 DD    1D81        pushl    (r9)
           55 DD    1D83        pushl    r5
           5C DD    1D85        pushl    ap
           50 DD    1D87        pushl    r0
        66 04 F8    1D89        calls    #4,(r6)
           55 D6    1D8C        incl     r5
           1B DD    1D8E        pushl    #27
     1D53 C2 DF     1D90        pushal   7507(r2)
           69 DD    1D94        pushl    (r9)
        68 03 F8    1D96        calls    #3,(r8)
   50 0210 C3 9E    1D99        movab    528(r3),r0
   5C 0210 C4 9E    1D9E        movab    528(r4),ap
           69 DD    1DA3        pushl    (r9)
           55 DD    1DA5        pushl    r5
           5C DD    1DA7        pushl    ap
           50 DD    1DA9        pushl    r0
        66 04 F8    1DAB        calls    #4,(r6)
           55 D6    1DAE        incl     r5
           1B DD    1DB0        pushl    #27
     1D5C C2 DF     1DB2        pushal   7516(r2)
           69 DD    1DB6        pushl    (r9)
        68 03 F8    1DB8        calls    #3,(r8)
   50 023C C3 9E    1DBB        movab    572(r3),r0
   5C 023C C4 9E    1DC0        movab    572(r4),ap
           69 DD    1DC5        pushl    (r9)
           55 DD    1DC7        pushl    r5
           5C DD    1DC9        pushl    ap
           50 DD    1DCB        pushl    r0
        66 04 F8    1DCD        calls    #4,(r6)
           55 D6    1DD0        incl     r5
           1B DD    1DD2        pushl    #27
     1D65 C2 DF     1DD4        pushal   7525(r2)
           69 DD    1DD8        pushl    (r9)
        68 03 F8    1DDA        calls    #3,(r8)
   50 0268 C3 9E    1DDD        movab    616(r3),r0
   5C 0268 C4 9E    1DE2        movab    616(r4),ap
           69 DD    1DE7        pushl    (r9)
           55 DD    1DE9        pushl    r5
           5C DD    1DEB        pushl    ap
           50 DD    1DED        pushl    r0
        66 04 F8    1DEF        calls    #4,(r6)
           55 D6    1DF2        incl     r5
           1B DD    1DF4        pushl    #27
     1D6E C2 DF     1DF6        pushal   7534(r2)
           68 DD    1DFA        pushl    (r11)
        68 03 F8    1DFC        calls    #3,(r8)
   50 0294 C3 9E    1DFF        movab    660(r3),r0
   5C 0294 C4 9E    1E04        movab    660(r4),ap
```

```
              6B DD      1E09           pushl    (r11)
              55 DD      1E0B           pushl    r5
              5C DD      1E0D           pushl    ap
              50 DD      1E0F           pushl    r0
           66 04 FB      1E11           calls    #4,(r6)
              55 D6      1E14           incl     r5
              1B DD      1E16           pushl    #27
        1D76 C2 DF       1E18           pushal   7542(r2)
              6A DD      1E1C           pushl    (r10)
           68 03 FB      1E1E           calls    #3,(r8)
        50 02C0 C3 9E    1E21           movab    704(r3),r0
        5C 02C0 C4 9E    1E26           movab    704(r4),ap
              6A DD      1E2B           pushl    (r10)
              55 DD      1E2D           pushl    r5
              5C DD      1E2F           pushl    ap
              50 DD      1E31           pushl    r0
    56 00000000* EF 9E   1E33           movab    WRITE_SCR2,r6
           66 04 FB      1E3A           calls    #4,(r6)
              55 D6      1E3D           incl     r5
              1B DD      1E3F           pushl    #27
        1D7E C2 DF       1E41           pushal   7550(r2)
              6A DD      1E45           pushl    (r10)
           68 03 FB      1E47           calls    #3,(r8)
        50 02EC C3 9E    1E4A           movab    748(r3),r0
        5C 02EC C4 9E    1E4F           movab    748(r4),ap
              6A DD      1E54           pushl    (r10)
              55 DD      1E56           pushl    r5
              5C DD      1E58           pushl    ap
              50 DD      1E5A           pushl    r0
           66 04 FB      1E5C           calls    #4,(r6)
              55 D6      1E5F           incl     r5
              1B DD      1E61           pushl    #27
        1D86 C2 DF       1E63           pushal   7558(r2)
              6A DD      1E67           pushl    (r10)
           68 03 FB      1E69           calls    #3,(r8)
        50 0318 C3 9E    1E6C           movab    792(r3),r0
        5C 0318 C4 9E    1E71           movab    792(r4),ap
              6A DD      1E76           pushl    (r10)
              55 DD      1E78           pushl    r5
              5C DD      1E7A           pushl    ap
              50 DD      1E7C           pushl    r0
           66 04 FB      1E7E           calls    #4,(r6)
              55 D6      1E81           incl     r5
              1B DD      1E83           pushl    #27
        1D8E C2 DF       1E85           pushal   7566(r2)
              6A DD      1E89           pushl    (r10)
           68 03 FB      1E8B           calls    #3,(r8)
        50 0344 C3 9E    1E8E           movab    836(r3),r0
        5C 0344 C4 9E    1E93           movab    836(r4),ap
              6A DD      1E98           pushl    (r10)
              55 DD      1E9A           pushl    r5
              5C DD      1E9C           pushl    ap
              50 DD      1E9E           pushl    r0
           66 04 FB      1EA0           calls    #4,(r6)
                 04      1EA3           ret
                         1EA4   inish:
                 007C    1EA4           .entry   inish,^m<r2,r3,r
```

```
              5E 04 C2    1EA6            subl2   #4,sp
  5C 00000000 EF 9E       1EA9            movab   $CHAR_STRING_CON
  56 00000000 EF 9E       1EB0            movab   OUTFILE4,r6
  55 00000000 EF 9E       1EB7            movab   OUTFILE3,r5
  53 00000000 EF 9E       1EBE            movab   OUTFILE2,r3
  54 00000000 EF 9E       1EC5            movab   OUTFILE,r4
         1D9D CC DF       1ECC            pushal  7581(ap)
         1D97 CC DF       1ED0            pushal  7575(ap)
  52 00000000* EF 9E      1ED4            movab   FOPEN,r2
              62 02 FB    1ED8            calls   #2,(r2)
              64 50 DO    1EDE            movl    r0,(r4)
         1DA5 CC DF       1EE1            pushal  7589(ap)
         1D9F CC DF       1EE5            pushal  7583(ap)
              62 02 FB    1EE9            calls   #2,(r2)
              63 50 DO    1EEC            movl    r0,(r3)
         1DAD CC DF       1EEF            pushal  7597(ap)
         1DA7 CC DF       1EF3            pushal  7591(ap)
              62 02 FB    1EF7            calls   #2,(r2)
              65 50 DO    1EFA            movl    r0,(r5)
         1DB5 CC DF       1EFD            pushal  7605(ap)
         1DAF CC DF       1F01            pushal  7599(ap)
              62 02 FB    1F05            calls   #2,(r2)
              66 50 DO    1F08            movl    r0,(r6)
              64 D5       1F0B            tstl    (r4)
              14 12       1F0D            bneq    sym.196
              64 DD       1F0F            pushl   (r4)
         1DB7 CC DF       1F11            pushal  7607(ap)
  00000000* EF 02 FB      1F15            calls   #2,PRINTF
  00000000* EF 00 FB      1F1C            calls   #0,EXIT
                          1F23    sym.196:
              63 D5       1F23            tstl    (r3)
              14 12       1F25            bneq    sym.197
              63 DD       1F27            pushl   (r3)
         1DF8 CC DF       1F29            pushal  7672(ap)
  00000000* EF 02 FB      1F2D            calls   #2,PRINTF
  00000000* EF 00 FB      1F34            calls   #0,EXIT
                          1F3B    sym.197:
              65 D5       1F3B            tstl    (r5)
              14 12       1F3D            bneq    sym.198
              65 DD       1F3F            oushl   (r5)
         1E39 CC DF       1F41            pushal  7739(ap)
  00000000* EF 02 FB      1F45            calls   #2,PRINTF
  00000000* EF 00 FB      1F4C            calls   #0,EXIT
                          1F53    sym.198:
              66 D5       1F53            tstl    (r6)
              14 12       1F55            bneq    sym.199
              66 DD       1F57            pushl   (r6)
         1E7E CC DF       1F59            pushal  7806(ap)
  00000000* EF 02 FB      1F5D            calls   #2,PRINTF
  00000000* EF 00 FB      1F64            calls   #0,EXIT
                          1F6B    sym.199:
              13 DD       1F6B            pushl   #27
         1EC2 CC DF       1F6D            pushal  7374(ap)
              64 DD       1F71            pushl   (r4)
  52 00000000* EF 9E      1F73            movab   FPRINTF,r2
              62 03 FB    1F7A            calls   #3,(r2)
              13 DD       1F7D            pushl   #27
```

| | | | | |
|---|---|---|---|---|
| 1EC9 | CC DF | 1F7F | pushal | 7881(ap) |
| | 63 DD | 1F83 | pushl | (r3) |
| | 62 03 FB | 1F85 | calls | #3,(r2) |
| | 1B DD | 1F89 | pushl | #27 |
| 1ED0 | CC DF | 1F8A | pushal | 7888(ap) |
| | 65 DD | 1F8E | pushl | (r5) |
| | 62 03 FB | 1F90 | calls | #3,(r2) |
| | 1B DD | 1F93 | pushl | #27 |
| 1ED7 | CC DF | 1F95 | pushal | 7895(ap) |
| | 66 DD | 1F99 | pushl | (r6) |
| | 62 03 FB | 1F9B | calls | #3,(r2) |
| | 1B DD | 1F9E | pushl | #27 |
| 1EDE | CC DF | 1FA0 | pushal | 7902(ap) |
| | 64 DD | 1FA4 | pushl | (r4) |
| | 62 03 FB | 1FA6 | calls | #3,(r2) |
| | 1B DD | 1FA9 | pushl | #27 |
| 1EE4 | CC DF | 1FAB | pushal | 7908(ap) |
| | 63 DD | 1FAF | pushl | (r3) |
| | 62 03 FB | 1FB1 | calls | #3,(r2) |
| | 1B DD | 1FB4 | pushl | #27 |
| 1EEA | CC DF | 1FB6 | pushal | 7914(ap) |
| | 65 DD | 1FBA | pushl | (r5) |
| | 62 03 FB | 1FBC | calls | #3,(r2) |
| | 1B DD | 1FBF | pushl | #27 |
| 1EF0 | CC DF | 1FC1 | pushal | 7920(ap) |
| | 66 DD | 1FC5 | pushl | (r6) |
| | 62 03 FB | 1FC7 | calls | #3,(r2) |
| | 1B DD | 1FCA | pushl | #27 |
| 1EF6 | CC DF | 1FCC | pushal | 7926(ap) |
| | 64 DD | 1FD0 | pushl | (r4) |
| | 62 03 FB | 1FD2 | calls | #3,(r2) |
| | 1B DD | 1FD5 | pushl | #27 |
| 1EFD | CC DF | 1FD7 | pushal | 7933(ap) |
| | 63 DD | 1FDB | pushl | (r3) |
| | 62 03 FB | 1FDD | calls | #3,(r2) |
| | 1B DD | 1FE0 | pushl | #27 |
| 1F04 | CC DF | 1FE2 | pushal | 7940(ap) |
| | 65 DD | 1FE6 | pushl | (r5) |
| | 62 03 FB | 1FE8 | calls | #3,(r2) |
| | 1B DD | 1FEB | pushl | #27 |
| 1F0B | CC DF | 1FED | pushal | 7947(ap) |
| | 66 DD | 1FF1 | pushl | (r6) |
| | 62 03 FB | 1FF3 | calls | #3,(r2) |
| | 1B DD | 1FF6 | pushl | #27 |
| | 1B DD | 1FF8 | pushl | #27 |
| 1F12 | CC DF | 1FFA | pushal | 7954(ap) |
| | 64 DD | 1FFE | pushl | (r4) |
| | 62 04 FB | 2000 | calls | #4,(r2) |
| | 1B DD | 2003 | pushl | #27 |
| | 1B DD | 2005 | pushl | #27 |
| 1F23 | CC DF | 2007 | pushal | 7979(ap) |
| | 63 DD | 200B | pushl | (r3) |
| | 62 04 FB | 200D | calls | #4,(r2) |
| | 1B DD | 2010 | pushl | #27 |
| | 1B DD | 2012 | pushl | #27 |
| 1F44 | CC DF | 2014 | pushal | 8004(ap) |
| | 65 DD | 2018 | pushl | (r5) |

|          |    |       |        |           |
|----------|----|-------|--------|-----------|
| 62 04    | FB | 201A  | calls  | #4,(r2)   |
| 1B       | DD | 201D  | pushl  | #27       |
| 1B       | DD | 201F  | pushl  | #27       |
| 1F5D CC  | DF | 2021  | pushal | 8029(ap)  |
| 66       | DD | 2025  | pushl  | (r6)      |
| 62 04    | FB | 2027  | calls  | #4,(r2)   |
| 1B       | DD | 202A  | pushl  | #27       |
| 1F76 CC  | DF | 202C  | pushal | 8054(ap)  |
| 64       | DD | 2030  | pushl  | (r4)      |
| 62 03    | FB | 2032  | calls  | #3,(r2)   |
| 1B       | DD | 2035  | pushl  | #27       |
| 1F7E CC  | DF | 2037  | pushal | 8062(ap)  |
| 63       | DD | 203B  | pushl  | (r3)      |
| 62 03    | FB | 203D  | calls  | #3,(r2)   |
| 1B       | DD | 2040  | pushl  | #27       |
| 1F86 CC  | DF | 2042  | pushal | 8070(ap)  |
| 65       | DD | 2046  | pushl  | (r5)      |
| 62 03    | FB | 2048  | calls  | #3,(r2)   |
| 1B       | DD | 204B  | pushl  | #27       |
| 1F8E CC  | DF | 204D  | pushal | 8078(ap)  |
| 66       | DD | 2051  | pushl  | (r6)      |
| 62 03    | FB | 2053  | calls  | #3,(r2)   |
| 1B       | DD | 2056  | pushl  | #27       |
| 1F96 CC  | DF | 2058  | pushal | 8086(ap)  |
| 64       | DD | 205C  | pushl  | (r4)      |
| 62 03    | FB | 205E  | calls  | #3,(r2)   |
| 1B       | DD | 2061  | pushl  | #27       |
| 1F9D CC  | DF | 2063  | pushal | 8093(ap)  |
| 63       | DD | 2067  | pushl  | (r3)      |
| 62 03    | FB | 2069  | calls  | #3,(r2)   |
| 1B       | DD | 206C  | pushl  | #27       |
| 1FA4 CC  | DF | 206E  | pushal | 8100(ap)  |
| 65       | DD | 2072  | pushl  | (r5)      |
| 62 03    | FB | 2074  | calls  | #3,(r2)   |
| 1B       | DD | 2077  | pushl  | #27       |
| 1FAB CC  | DF | 2079  | pushal | 8107(ap)  |
| 66       | DD | 207D  | pushl  | (r6)      |
| 62 03    | FB | 207F  | calls  | #3,(r2)   |
| 1B       | DD | 2082  | pushl  | #27       |
| 1FB2 CC  | DF | 2084  | pushal | 8114(ap)  |
| 64       | DD | 2088  | pushl  | (r4)      |
| 62 03    | FB | 208A  | calls  | #3,(r2)   |
| 1B       | DD | 208D  | pushl  | #27       |
| 1FBA CC  | DF | 208F  | pushal | 8122(ap)  |
| 63       | DD | 2093  | pushl  | (r3)      |
| 62 03    | FB | 2095  | calls  | #3,(r2)   |
| 1B       | DD | 2098  | pushl  | #27       |
| 1FC2 CC  | DF | 209A  | pushal | 8130(ap)  |
| 65       | DD | 209E  | pushl  | (r5)      |
| 62 03    | FB | 20A0  | calls  | #3,(r2)   |
| 1B       | DD | 20A3  | pushl  | #27       |
| 1FCA CC  | DF | 20A5  | pushal | 8138(ap)  |
| 66       | DD | 20A9  | pushl  | (r6)      |
| 62 03    | FB | 20AB  | calls  | #3,(r2)   |
| 1B       | DD | 20AE  | pushl  | #27       |
| 1FD2 CC  | DF | 20B0  | pushal | 8146(ap)  |
| 64       | DD | 20B4  | pushl  | (r4)      |

```
         62 03 FB    20B6          calls    #3,(r2)
            1B DD    20B9          pushl    #27
      1FD7 CC DF     20BB          pushal   8151(ap)
            63 DD    20BF          pushl    (r3)
         62 03 FB    20C1          calls    #3,(r2)
            1B DD    20C4          pushl    #27
      1FDC CC DF     20C6          pushal   8156(ap)
            65 DD    20CA          pushl    (r5)
         62 03 FB    20CC          calls    #3,(r2)
            1B DD    20CF          pushl    #27
      1FE1 CC DF     20D1          pushal   8161(ap)
            66 DD    20D5          pushl    (r6)
         62 03 FB    20D7          calls    #3,(r2)
               04    20DA          ret
                     20D8  write_scr1:
             0000    20DB          .entry   write_scr1,^m<>
         5E 04 C2    20DD          subl2    #4,sp
      7E 80 8F 9A    20E0          movzbl   #176,-(sp)
         0C AC DD    20E4          pushl    12(ap)
            1B DD    20E7          pushl    #27
         04 AC DD    20E9          pushl    4(ap)
         10 AC DD    20EC          pushl    16(ap)
00000000* EF 05 FB   20EF          calls    #5,FPRINTF
      7E 80 8F 9A    20F6          movzbl   #176,-(sp)
         0C AC DD    20FA          pushl    12(ap)
            1B DD    20FD          pushl    #27
         08 AC DD    20FF          pushl    8(ap)
         10 AC DD    2102          pushl    16(ap)
00000000* EF 05 FB   2105          calls    #5,FPRINTF
               04    210C          ret
                     210D  write_scr2:
             0000    210D          .entry   write_scr2,^m<>
         5E 04 C2    210F          subl2    #4,sp
         0C AC DD    2112          pushl    12(ap)
            1B DD    2115          pushl    #27
         04 AC DD    2117          pushl    4(ap)
         10 AC DD    211A          pushl    16(ap)
00000000* EF 04 FB   211D          calls    #4,FPRINTF
         0C AC DD    2124          pushl    12(ap)
            1B DD    2127          pushl    #27
         08 AC DD    2129          pushl    8(ap)
         10 AC DD    212C          pushl    16(ap)
00000000* EF 04 FB   212F          calls    #4,FPRINTF
               04    2136          ret
                     2137  update:
             OFFC    2137          .entry   update,^m<r2,r3,
         5E 24 C2    2139          subl2    #36,sp
    54 00000000 EF 9E 213C         movab    $CHAR_STRING_CON
    5B 00000000 EF 9E 2143         movab    OUTFILE3,r11
    5A 00000000 EF 9E 214A         movab    OUTFILE2,r10
    59 00000000 EF 9E 2151         movab    OUTFILE,r9
    55 00000000 EF 9E 2153         movab    $DATA,r5
 53 08 AC 00000053 3F C5 215F      mull3    #88,8(ap),r3
         56 04 AC D0 2163          movl     4(ap),r6
         52 0A A643 9E 216C         movab    10(r6)[r3],r2
            F8 AD 62 4A 2171        cvtfl    (r2),-8(fp)
            1B DD    2175          pushl    #27
```

|             |       |      |       |        |               |
|-------------|-------|------|-------|--------|---------------|
|             | 1FE6  | C4 DF| 2177  | pushal | 8166(r4)      |
|             |       | 69 DD| 217B  | pushl  | (r9)          |
| 57 00000000*|       | EF 9E| 217D  | movab  | FPRINTF,r7    |
|             | 67 03 | FB   | 2184  | calls  | #3,(r7)       |
|             | F8 AD | DD   | 2187  | pushl  | -8(fp)        |
|             | 1B    | DD   | 218A  | pushl  | #27           |
|             | 1FEF  | C4 DF| 218C  | pushal | 8175(r4)      |
|             |       | 69 DD| 2190  | pushl  | (r9)          |
|             | 67 04 | FB   | 2192  | calls  | #4,(r7)       |
|             | 1B    | DD   | 2195  | pushl  | #27           |
|             | 1FF7  | C4 DF| 2197  | pushal | 8183(r4)      |
|             |       | 69 DD| 219B  | pushl  | (r9)          |
|             | 67 03 | FB   | 219D  | calls  | #3,(r7)       |
|             | F8 AD | DD   | 21A0  | pushl  | -8(fp)        |
|             | 1B    | DD   | 21A3  | pushl  | #27           |
|             | 2000  | C4 DF| 21A5  | pushal | 8192(r4)      |
|             |       | 69 DD| 21A9  | pushl  | (r9)          |
|             | 67 04 | FB   | 21AB  | calls  | #4,(r7)       |
| 52 0E A643  |       | 9E   | 21AE  | movab  | 14(r6)[r3],r2 |
|             | F8 AD | 62 4A| 21B3  | cvtfl  | (r2),-8(fp)   |
|             | 1B    | DD   | 21B7  | pushl  | #27           |
|             | 2003  | C4 DF| 21B9  | pushal | 8200(r4)      |
|             |       | 69 DD| 21BD  | pushl  | (r9)          |
|             | 67 03 | FB   | 21BF  | calls  | #3,(r7)       |
|             | F8 AD | DD   | 21C2  | pushl  | -8(fp)        |
|             | 1B    | DD   | 21C5  | pushl  | #27           |
|             | 2011  | C4 DF| 21C7  | pushal | 8209(r4)      |
|             |       | 69 DD| 21CB  | pushl  | (r9)          |
|             | 67 04 | FB   | 21CD  | calls  | #4,(r7)       |
|             | 1B    | DD   | 21D0  | pushl  | #27           |
|             | 2019  | C4 DF| 21D2  | pushal | 8217(r4)      |
|             |       | 69 DD| 21D6  | pushl  | (r9)          |
|             | 67 03 | FB   | 21D8  | calls  | #3,(r7)       |
|             | F8 AD | DD   | 21DB  | pushl  | -8(fp)        |
|             | 1B    | DD   | 21DE  | pushl  | #27           |
|             | 2022  | C4 DF| 21E0  | pushal | 8226(r4)      |
|             |       | 69 DD| 21E4  | pushl  | (r9)          |
|             | 67 04 | FB   | 21E6  | calls  | #4,(r7)       |
| 52 12 A643  |       | 9E   | 21E9  | movab  | 18(r6)[r3],r2 |
|             | F8 AD | 62 4A| 21EE  | cvtfl  | (r2),-8(fp)   |
|             | 1B    | DD   | 21F2  | pushl  | #27           |
|             | 202A  | C4 DF| 21F4  | pushal | 8234(r4)      |
|             |       | 69 DD| 21F8  | pushl  | (r9)          |
|             | 67 03 | FB   | 21FA  | calls  | #3,(r7)       |
|             | F8 AD | DD   | 21FD  | pushl  | -8(fp)        |
|             | 1B    | DD   | 2200  | pushl  | #27           |
|             | 2033  | C4 DF| 2202  | pushal | 8243(r4)      |
|             |       | 69 DD| 2206  | pushl  | (r9)          |
|             | 67 0  | B    | 2208  | calls  | #4,(r7)       |
|             | 1B    | DD   | 2208  | pushl  | #27           |
|             | 2033  | C4 DF| 220D  | pushal | 8251(r4)      |
|             |       | 69 DD| 2211  | pushl  | (r9)          |
|             | 67 03 | FB   | 2213  | calls  | #3,(r7)       |
|             | F8 AD | DD   | 2216  | pushl  | -8(fp)        |
|             | 1B    | DD   | 2219  | pushl  | #27           |
|             | 2044  | C4 DF| 221B  | pushal | 8260(r4)      |
|             |       | 69 DD| 221F  | pushl  | (r9)          |

| | | | |
|---|---|---|---|
| 67 04 FB | 2221 | calls | #4,(r7) |
| 52 16 A643 9E | 2224 | movab | 22(r6)[r3],r2 |
| F8 AD 62 4A | 2229 | cvtfl | (r2),-8(fp) |
| 1B DD | 222D | pushl | #27 |
| 204C C4 DF | 222F | pushal | 8268(r4) |
| 69 DD | 2233 | pushl | (r9) |
| 67 03 FB | 2235 | calls | #3,(r7) |
| F8 AD DD | 2238 | pushl | -8(fp) |
| 1B DD | 223B | pushl | #27 |
| 2056 C4 DF | 223D | pushal | 8278(r4) |
| 69 DD | 2241 | pushl | (r9) |
| 67 04 FB | 2243 | calls | #4,(r7) |
| 1B DD | 2246 | pushl | #27 |
| 205E C4 DF | 2248 | pushal | 8286(r4) |
| 69 DD | 224C | pushl | (r9) |
| 67 03 FB | 224E | calls | #3,(r7) |
| F8 AD DD | 2251 | pushl | -8(fp) |
| 1B DD | 2254 | pushl | #27 |
| 2068 C4 DF | 2256 | pushal | 8296(r4) |
| 69 DD | 225A | pushl | (r9) |
| 67 04 FB | 225C | calls | #4,(r7) |
| 52 1A A643 9E | 225F | movab | 26(r6)[r3],r2 |
| F8 AD 62 4A | 2264 | cvtfl | (r2),-8(fp) |
| 1B DD | 2268 | pushl | #27 |
| 2070 C4 DF | 226A | pushal | 8304(r4) |
| 69 DD | 226E | pushl | (r9) |
| 67 03 FB | 2270 | calls | #3,(r7) |
| F8 AD DD | 2273 | pushl | -8(fp) |
| 1B DD | 2276 | pushl | #27 |
| 207A C4 DF | 2278 | pushal | 8314(r4) |
| 69 DD | 227C | pushl | (r9) |
| 67 04 FB | 227E | calls | #4,(r7) |
| 1B DD | 2281 | pushl | #27 |
| 2082 C4 DF | 2283 | pushal | 8322(r4) |
| 69 DD | 2287 | pushl | (r9) |
| 67 03 FB | 2289 | calls | #3,(r7) |
| F8 AD DD | 228C | pushl | -8(fp) |
| 1B DD | 228F | pushl | #27 |
| 208C C4 DF | 2291 | pushal | 8332(r4) |
| 69 DD | 2295 | pushl | (r9) |
| 67 04 FB | 2297 | calls | #4,(r7) |
| 52 1E A643 9E | 229A | movab | 30(r6)[r3],r2 |
| F8 AD 62 4A | 229F | cvtfl | (r2),-8(fp) |
| 1B DD | 22A3 | pushl | #27 |
| 2094 C4 DF | 22A5 | pushal | 8340(r4) |
| 69 DD | 22A9 | pushl | (r9) |
| 67 03 FB | 22AB | calls | #3,(r7) |
| F8 AD DD | 22AE | pushl | -8(fp) |
| 1B DD | 22B1 | pushl | #27 |
| 209E C4 DF | 22B3 | pushal | 8350(r4) |
| 69 DD | 22B7 | pushl | (r9) |
| 67 04 FB | 22B9 | calls | #4,(r7) |
| 1B DD | 22BC | pushl | #27 |
| 20A6 C4 DF | 22BE | pushal | 8358(r4) |
| 69 DD | 22C2 | pushl | (r9) |
| 67 03 FB | 22C4 | calls | #3,(r7) |
| F8 AD DD | 22C7 | pushl | -8(fp) |

```
          1B DD     22CA       pushl    #27
2080 C4   DF       22CC       pushal   8368(r4)
          69 DD     22D0       pushl    (r9)
       67 04 FB    22D2       calls    #4,(r7)
52 22 A643 9E      22D5       movab    34(r6)[r3],r2
    F8 AD 62 4A    22DA       cvtfl    (r2),-8(fp)
          1B DD     22DE       pushl    #27
2088 C4   DF       22E0       pushal   8376(r4)
          69 DD     22E4       pushl    (r9)
       67 03 FB    22E6       calls    #3,(r7)
       F8 AD DD    22E9       pushl    -8(fp)
          1B DD     22EC       pushl    #27
20C2 C4   DF       22EE       pushal   8386(r4)
          69 DD     22F2       pushl    (r9)
       67 04 FB    22F4       calls    #4,(r7)
          1B DD     22F7       pushl    #27
20CA C4   DF       22F9       pushal   8394(r4)
          69 DD     22FD       pushl    (r9)
       67 03 FB    22FF       calls    #3,(r7)
       F8 AD DD    2302       pushl    -8(fp)
          1B DD     2305       pushl    #27
20D4 C4   DF       2307       pushal   8404(r4)
          69 DD     230B       pushl    (r9)
       67 04 FB    230D       calls    #4,(r7)
52 2A A643 9E      2310       movab    42(r6)[r3],r2
    F8 AD 62 4A    2315       cvtfl    (r2),-8(fp)
          1B DD     2319       pushl    #27
20DC C4   DF       231B       pushal   8412(r4)
          6A DD     231F       pushl    (r10)
       67 03 FB    2321       calls    #3,(r7)
       F8 AD DD    2324       pushl    -8(fp)
          1B DD     2327       pushl    #27
20E5 C4   DF       2329       pushal   8421(r4)
          6A DD     232D       pushl    (r10)
       67 04 FB    232F       calls    #4,(r7)
          1B DD     2332       pushl    #27
20ED C4   DF       2334       pushal   8429(r4)
          6A DD     2338       pushl    (r10)
       67 03 FB    233A       calls    #3,(r7)
       F8 AD DD    233D       pushl    -8(fp)
          1B DD     2340       pushl    #27
20F6 C4   DF       2342       pushal   8438(r4)
          6A DD     2346       pushl    (r10)
       67 04 FB    2348       calls    #4,(r7)
52 2E A643 9E      234B       movab    46(r6)[r3],r2
    F8 AD 62 4A    2350       cvtfl    (r2),-8(fp)
          1B DD     2354       pushl    #27
20FE C4   DF       2356       pushal   8446(r4)
          6A DD     235A       pushl    (r10)
       67 03 FB    235C       calls    #3,(r7)
       F8 AD DD    235F       pushl    -8(fp)
          1B DD     2362       pushl    #27
2107 C4   DF       2364       pushal   8455(r4)
          6A DD     2368       pushl    (r10)
       67 04 FB    236A       calls    #4,(r7)
          1B DD     236D       pushl    #27
210F C4   DF       236F       pushal   8463(r4)
```

|  |  |  |
|---|---|---|
| 6A DD | 2373 | pushl (r10) |
| 67 03 FB | 2375 | calls #3,(r7) |
| F8 AD DD | 2378 | pushl -8(fp) |
| 1B DD | 237B | pushl #27 |
| 2118 C4 DF | 237D | pushal 8472(r4) |
| 6A DD | 2381 | pushl (r10) |
| 67 04 FB | 2383 | calls #4,(r7) |
| 52 32 A643 9E | 2386 | movab 50(r6)[r3],r2 |
| F8 AD 62 4A | 238B | cvtfl (r2),-8(fp) |
| 1B DD | 238F | pushl #27 |
| 2120 C4 DF | 2391 | pushal 8480(r4) |
| 6A DD | 2395 | pushl (r10) |
| 67 03 FB | 2397 | calls #3,(r7) |
| F8 AD DD | 239A | pushl -8(fp) |
| 1B DD | 239D | pushl #27 |
| 2129 C4 DF | 239F | pushal 8489(r4) |
| 6A DD | 23A3 | pushl (r10) |
| 67 04 FB | 23A5 | calls #4,(r7) |
| 1B DD | 23A8 | pushl #27 |
| 2131 C4 DF | 23AA | pushal 8497(r4) |
| 6A DD | 23AE | pushl (r10) |
| 67 03 FB | 23B0 | calls #3,(r7) |
| F8 AD DD | 23B3 | pushl -8(fp) |
| 1B DD | 23B6 | pushl #27 |
| 213A C4 DF | 23B8 | pushal 8506(r4) |
| 6A DD | 23BC | pushl (r10) |
| 67 04 FB | 23BE | calls #4,(r7) |
| 52 36 A643 9E | 23C1 | movab 54(r6)[r3],r2 |
| F8 AD 62 4A | 23C6 | cvtfl (r2),-8(fp) |
| 1B DD | 23CA | pushl #27 |
| 2142 C4 DF | 23CC | pushal 8514(r4) |
| 6A DD | 23D0 | pushl (r10) |
| 67 03 FB | 23D2 | calls #3,(r7) |
| F8 AD DD | 23D5 | pushl -8(fp) |
| 1B DD | 23D8 | pushl #27 |
| 214C C4 DF | 23DA | pushal 8524(r4) |
| 6A DD | 23DE | pushl (r10) |
| 67 04 FB | 23E0 | calls #4,(r7) |
| 1B DD | 23E3 | pushl #27 |
| 2154 C4 DF | 23E5 | pushal 8532(r4) |
| 6A DD | 23E9 | pushl (r10) |
| 67 03 FB | 23EB | calls #3,(r7) |
| F8 AD DD | 23EE | pushl -8(fp) |
| 1B DD | 23F1 | pushl #27 |
| 215E C4 DF | 23F3 | pushal 8542(r4) |
| 6A DD | 23F7 | pushl (r10) |
| 67 04 FB | 23F9 | calls #4,(r7) |
| 52 3A A643 9E | 23FC | movab 58(r6)[r3],r2 |
| F8 AD 62 4A | 2401 | cvtfl (r2),-8(fp) |
| 1B DD | 2405 | pushl #27 |
| 2166 C4 DF | 2407 | pushal 8550(r4) |
| 6A DD | 240B | pushl (r10) |
| 67 03 FB | 240D | calls #3,(r7) |
| F8 AD DD | 2410 | pushl -8(fp) |
| 1B DD | 2413 | pushl #27 |
| 2170 C4 DF | 2415 | pushal 8560(r4) |
| 6A DD | 2419 | pushl (r10) |

We claim:

1. An optical scene test generator (OSTG) useful in testing the operation of detector modules designed to be placed in earth orbit, the module having a first surface upon which an image may be formed, the OSTG comprising:
   a first source of IR frequency light;
   a first template having at least one aperture formed therein through which IR frequency light from the first source of IR frequency light may be transmitted to generate a first IR frequency light signal representative of the earth's surface;
   a second source of IR frequency light;
   a second template having at least one aperture formed therein through which IR frequency light from the second source of IR frequency light may be transmitted to generate a second IR frequency light signal representative of a target;
   an optical image combiner for receiving and combining the first and second IR frequency light signals, and for directing the combined first and second IR frequency light signals to the detector module to be tested; and
   template positioning apparatus connected to each of said first and second templates for positioning each of said first and second templates relative to one another and relative to said detector modules such that the independent motions of a target and background may be simulated.

2. The system as recited in claim 1 wherein said optical image combiner comprises a moveable lens disposed along the path of said first and second light signals, said lens being adapted to direct the combined first and second light signals towards the detector module first surface.

3. The system as recited in claim 1 wherein movement of said first template results in relative movement between the first and second light signals on the first surface of the detector module.

4. The system as recited in claim 1 wherein movement of said second tamplate results in relative movement between the first and second light signals on the first surface of the detector module.

5. The system as recited in claim 1 further comprising a moveable toggle mirror disposed within the OSTG, the toggle mirror being operative to direct the combined first and second light signals to different locations upon the first surface of the detector module.

6. The system as recited in claim 5 wherein the toggle mirror is operable to affect movement of the combined first and second light signals with respect to different detector elements formed on the detector module first surface.

7. The system s recited in claim 6 wherein the toggle mirror is operable to vary the location of the combined first and second light signals by a distance corresponding to the space between adjacent detector elements.

8. The system as recited in claim 1 wherein said template positioning apparatus comprises first and second template servo mechanisms, said first and second template servo mechanisms being connected to said first and second templates respectively.

9. The system as recited in claim 1 further comprising optical image combiner positioning apparatus connected to said optical image combiner for moving said combined first and second IR frequency light signals with respect to the detector module to be tested.

10. The system as recited in claim 9 wherein the image combiner is moveable to simulate satellite jitter.

11. The system as recited in claim 9 wherein the image combiner is moveable to simulate satellite drift.

* * * * *